(12) United States Patent
Wu et al.

(10) Patent No.: US 10,491,748 B1
(45) Date of Patent: Nov. 26, 2019

(54) INTELLIGENT COMMUNICATION ROUTING SYSTEM AND METHOD

(71) Applicants: Wai Wu, Massapequa, NY (US); Steven M. Hoffberg, West Harrison, NY (US)

(72) Inventors: Wai Wu, Massapequa, NY (US); Steven M. Hoffberg, West Harrison, NY (US)

(*) Notice: Subject to any disclaimer, the term of this patent is extended or adjusted under 35 U.S.C. 154(b) by 51 days.

(21) Appl. No.: 15/797,070

(22) Filed: Oct. 30, 2017

Related U.S. Application Data

(60) Division of application No. 14/968,114, filed on Dec. 14, 2015, now Pat. No. 9,807,239, which is a
(Continued)

(51) Int. Cl.
*H04M 3/00* (2006.01)
*H04M 5/00* (2006.01)
(Continued)

(52) U.S. Cl.
CPC ..... *H04M 3/5233* (2013.01); *H04L 29/06027* (2013.01)

(58) Field of Classification Search
CPC ............ H04M 3/5191; H04M 3/5232; H04M 3/5183; H04M 3/5175; H04M 3/5233; H04M 3/5166; H04M 3/24; H04M 3/5235; H04M 3/5141; H04M 2201/42; H04M 3/5133; H04M 3/28; H04M 2203/402; H04M 3/523; H04M 2203/408; H04M 2203/556; G06Q 10/067; G06Q 10/04; G06Q 10/06; G06Q 10/0631; G06Q 10/06312; G06Q 10/06313; G06Q 30/0201; G06Q 30/0202; H04L 43/06; H04L 43/50; H04L 51/046; H04L 41/14
USPC ............ 379/265.11, 265.01, 265.02, 265.09, 379/265.03, 265.06, 265.13, 265.05, 272, 379/10.01, 265.1, 265.12, 265.14
See application file for complete search history.

(56) References Cited

U.S. PATENT DOCUMENTS 2,906,027 A 9/1959 Gundersen et al.
3,974,275 A 8/1976 Bossert et al.
(Continued)

FOREIGN PATENT DOCUMENTS

WO WO 20050290297 9/2018

OTHER PUBLICATIONS

US 5,415,368 A, 05/1995, Horstein et al. (withdrawn)

Primary Examiner — Quynh H Nguyen
Assistant Examiner — Kharye Pope
(74) Attorney, Agent, or Firm — Tully Rinckey PLLC; Steven M. Hoffberg; Steven Hoffberg

(57) ABSTRACT

A communications routing system, and method, for representing a plurality of predicted characteristics of a plurality of communications sources, each having an economic utility; representing a plurality of predicted characteristics of a plurality of communications targets each having an economic utility; and determining an optimal routing between the plurality of communications sources and the plurality of communications targets, by maximizing an aggregate utility with respect to the respective predicted characteristics of communications source and communications destination represented by linkages.

20 Claims, 9 Drawing Sheets

Related U.S. Application Data continuation of application No. 13/661,293, filed on Oct. 26, 2012, now Pat. No. 9,215,322, which is a continuation of application No. 11/695,691, filed on Apr. 3, 2007, now Pat. No. 8,300,798.

(60) Provisional application No. 60/744,190, filed on Apr. 3, 2006.

(51) Int. Cl.
*H04M 3/523* (2006.01)
*H04L 29/06* (2006.01)
*H04L 12/66* (2006.01)

(56) References Cited

U.S. PATENT DOCUMENTS

| | | |
|---|---|---|
| 4,048,452 A | 9/1977 | Oehring et al. |
| 4,068,298 A | 1/1978 | Dechant et al. |
| 4,112,488 A | 9/1978 | Smith, III |
| 4,286,118 A | 8/1981 | Mehaffey et al. |
| 4,337,376 A | 6/1982 | Gruenberg |
| 4,345,116 A | 8/1982 | Ash et al. |
| 4,399,531 A | 8/1983 | Grande et al. |
| 4,484,292 A | 11/1984 | Hong et al. |
| 4,593,351 A | 6/1986 | Hong et al. |
| 4,617,674 A | 10/1986 | Mangulis et al. |
| 4,648,023 A | 3/1987 | Powell |
| 4,669,113 A | 5/1987 | Ash et al. |
| 4,677,663 A | 6/1987 | Szlam |
| 4,679,187 A | 7/1987 | Irvin |
| 4,710,944 A | 12/1987 | Nossen |
| 4,736,363 A | 4/1988 | Aubin et al. |
| 4,737,983 A | 4/1988 | Frauenthal et al. |
| 4,744,028 A | 5/1988 | Karmarkar |
| 4,757,529 A | 7/1988 | Glapa et al. |
| 4,768,221 A | 8/1988 | Green et al. |
| 4,788,721 A | 11/1988 | Krishnan et al. |
| 4,797,911 A | 1/1989 | Szlam et al. |
| 4,807,279 A | 2/1989 | McClure et al. |
| 4,811,210 A | 3/1989 | McAulay |
| 4,839,892 A | 6/1989 | Sasaki |
| 4,847,755 A | 7/1989 | Morrison et al. |
| 4,852,149 A | 7/1989 | Zwick et al. |
| 4,866,754 A | 9/1989 | Hashimoto |
| 4,878,243 A | 10/1989 | Hashimoto |
| 4,893,301 A | 1/1990 | Andrews et al. |
| 4,894,857 A | 1/1990 | Szlam et al. |
| 4,901,307 A | 2/1990 | Gilhousen et al. |
| 4,905,233 A | 2/1990 | Cain et al. |
| 4,924,501 A | 5/1990 | Cheeseman et al. |
| 4,930,150 A | 5/1990 | Katz |
| 4,933,964 A | 6/1990 | Girgis |
| 4,935,956 A | 6/1990 | Hellwarth et al. |
| 4,941,168 A | 7/1990 | Kelly, Jr. |
| 4,953,204 A | 8/1990 | Cuschleg, Jr. et al. |
| 4,956,835 A | 9/1990 | Grover |
| 4,958,371 A | 9/1990 | Damoci et al. |
| 4,974,224 A | 11/1990 | Boone |
| 4,975,841 A | 12/1990 | Kehnemuyi et al. |
| 4,977,595 A | 12/1990 | Ohta et al. |
| 4,979,171 A | 12/1990 | Ashley |
| 4,985,830 A | 1/1991 | Atac et al. |
| 4,987,536 A | 1/1991 | Humblet |
| 4,987,587 A | 1/1991 | Jolissaint |
| 4,991,204 A | 2/1991 | Yamamoto et al. |
| 4,998,272 A | 3/1991 | Hawkins, Jr. et al. |
| 4,999,829 A | 3/1991 | Fite, Jr. et al. |
| 5,007,000 A | 4/1991 | Baldi |
| 5,007,078 A | 4/1991 | Masson et al. |
| 5,010,317 A | 4/1991 | Schwendeman et al. |
| 5,014,298 A | 5/1991 | Katz |
| 5,016,270 A | 5/1991 | Katz |
| 5,017,926 A | 5/1991 | Ames et al. |
| 5,020,095 A | 5/1991 | Morganstein et al. |
| 5,020,097 A | 5/1991 | Tanaka et al. |
| 5,021,945 A | 6/1991 | Morrison et al. |
| 5,036,535 A | 7/1991 | Gechter et al. |
| 5,040,208 A | 8/1991 | Jolissaint |
| 5,048,075 A | 9/1991 | Katz |
| 5,051,984 A | 9/1991 | Mostafa et al. |
| 5,056,085 A | 10/1991 | Vu |
| 5,058,105 A | 10/1991 | Mansour et al. |
| 5,063,522 A | 11/1991 | Winters |
| 5,065,399 A | 11/1991 | Hasegawa et al. |
| 5,070,498 A | 12/1991 | Kakuma et al. |
| 5,070,525 A | 12/1991 | Szlam et al. |
| 5,070,526 A | 12/1991 | Richmond et al. |
| 5,073,890 A | 12/1991 | Danielsen |
| 5,073,900 A | 12/1991 | Mallinckrodt |
| 5,073,929 A | 12/1991 | Katz |
| 5,077,789 A | 12/1991 | Clark, Jr. et al. |
| 5,081,703 A | 1/1992 | Lee |
| 5,081,711 A | 1/1992 | Rickman, Jr. |
| 5,088,032 A | 2/1992 | Bosack |
| 5,093,794 A | 3/1992 | Howie et al. |
| 5,097,528 A | 3/1992 | Gursahaney et al. |
| 5,103,449 A | 4/1992 | Jolissaint |
| 5,109,390 A | 4/1992 | Gilhousen et al. |
| 5,115,495 A | 5/1992 | Tsuchiya et al. |
| 5,119,225 A | 6/1992 | Grant et al. |
| 5,121,325 A | 6/1992 | DeJonge |
| 5,121,422 A | 6/1992 | Kudo |
| 5,126,748 A | 6/1992 | Ames et al. |
| 5,128,926 A | 7/1992 | Perlman et al. |
| 5,128,984 A | 7/1992 | Katz |
| 5,134,715 A | 7/1992 | Parl et al. |
| 5,146,452 A | 9/1992 | Pekarske |
| 5,161,181 A | 11/1992 | Zwick |
| 5,163,083 A | 11/1992 | Dowden et al. |
| 5,163,087 A | 11/1992 | Kaplan |
| 5,164,981 A | 11/1992 | Mitchell et al. |
| 5,166,974 A | 11/1992 | Morganstein et al. |
| 5,168,517 A | 12/1992 | Waldman |
| 5,173,689 A | 12/1992 | Kusano |
| 5,175,800 A | 12/1992 | Galis et al. |
| 5,175,866 A | 12/1992 | Childress et al. |
| 5,179,329 A | 1/1993 | Nishikawa et al. |
| 5,179,527 A | 1/1993 | Lawrenz |
| 5,179,556 A | 1/1993 | Turner |
| 5,182,744 A | 1/1993 | Askew et al. |
| 5,185,786 A | 2/1993 | Zwick |
| 5,193,110 A | 3/1993 | Jones et al. |
| 5,199,027 A | 3/1993 | Barri |
| 5,206,903 A | 4/1993 | Kohler et al. |
| 5,214,688 A | 5/1993 | Szlam et al. |
| 5,216,427 A | 6/1993 | Yan et al. |
| 5,218,601 A | 6/1993 | Chujo et al. |
| 5,218,635 A | 6/1993 | Bonvallet et al. |
| 5,218,676 A | 6/1993 | Ben-Ayed et al. |
| 5,224,153 A | 6/1993 | Katz |
| 5,224,162 A | 6/1993 | Okamoto et al. |
| 5,228,025 A | 7/1993 | Le Floch et al. |
| 5,233,600 A | 8/1993 | Pekarske |
| 5,233,604 A | 8/1993 | Ahmadi et al. |
| 5,233,626 A | 8/1993 | Ames |
| 5,235,599 A | 8/1993 | Nishimura et al. |
| 5,237,159 A | 8/1993 | Stephens et al. |
| 5,237,514 A | 8/1993 | Curtin |
| 5,239,574 A | 8/1993 | Brandman et al. |
| 5,239,671 A | 8/1993 | Linguist et al. |
| 5,251,147 A | 10/1993 | Finnerty |
| 5,251,252 A | 10/1993 | Katz |
| 5,253,248 A | 10/1993 | Dravida et al. |
| 5,253,289 A | 10/1993 | Tanaka |
| 5,255,349 A | 10/1993 | Thakoor et al. |
| 5,263,080 A | 11/1993 | Jones et al. |
| 5,265,092 A | 11/1993 | Soloway et al. |
| 5,265,119 A | 11/1993 | Gilhousen et al. |
| 5,267,232 A | 11/1993 | Katsube et al. |
| 5,270,919 A | 12/1993 | Blake et al. |
| 5,271,005 A | 12/1993 | Takase et al. |
| 5,272,638 A | 12/1993 | Martin et al. |
| 5,274,643 A | 12/1993 | Fisk |

(56) References Cited

U.S. PATENT DOCUMENTS

| | | |
|---|---|---|
| 5,276,732 A | 1/1994 | Stent et al. |
| 5,278,898 A | 1/1994 | Cambray et al. |
| 5,283,818 A | 2/1994 | Klausner et al. |
| 5,287,541 A | 2/1994 | Davis et al. |
| 5,289,303 A | 2/1994 | Cloonan et al. |
| 5,289,530 A | 2/1994 | Reese |
| 5,289,536 A | 2/1994 | Hokari |
| 5,291,550 A | 3/1994 | Levy et al. |
| 5,297,146 A | 3/1994 | Ogawa |
| 5,297,195 A | 3/1994 | Thorne et al. |
| 5,303,286 A | 4/1994 | Wiedeman |
| 5,309,504 A | 5/1994 | Morganstein |
| 5,309,505 A | 5/1994 | Szlam et al. |
| 5,309,513 A | 5/1994 | Rose |
| 5,311,502 A | 5/1994 | Mueller et al. |
| 5,311,574 A | 5/1994 | Livanos |
| 5,311,577 A | 5/1994 | Madrid et al. |
| 5,313,516 A | 5/1994 | Afshar et al. |
| 5,315,584 A | 5/1994 | Savary et al. |
| 5,319,703 A | 6/1994 | Drory |
| 5,321,745 A | 6/1994 | Drory et al. |
| 5,321,815 A | 6/1994 | Bartolanzo, Jr. et al. |
| 5,325,292 A | 6/1994 | Crockett |
| 5,325,472 A | 6/1994 | Horiuchi et al. |
| 5,327,490 A | 7/1994 | Cave |
| 5,329,579 A | 7/1994 | Brunson |
| 5,333,190 A | 7/1994 | Eyster |
| 5,339,330 A | 8/1994 | Mallinckrodt |
| 5,341,412 A | 8/1994 | Ramot et al. |
| 5,341,414 A | 8/1994 | Popke |
| 5,345,444 A | 9/1994 | Cloonan et al. |
| 5,345,599 A | 9/1994 | Paulraj et al. |
| 5,351,285 A | 9/1994 | Katz |
| 5,357,507 A | 10/1994 | Hughes et al. |
| 5,359,593 A | 10/1994 | Derby et al. |
| 5,359,645 A | 10/1994 | Katz |
| 5,359,649 A | 10/1994 | Rosu et al. |
| 5,365,575 A | 11/1994 | Katz |
| 5,369,695 A | 11/1994 | Chakravarti et al. |
| 5,377,262 A | 12/1994 | Bales et al. |
| 5,381,404 A | 1/1995 | Sugano et al. |
| 5,381,470 A | 1/1995 | Cambray et al. |
| 5,390,170 A | 2/1995 | Sawant et al. |
| 5,390,236 A | 2/1995 | Klausner et al. |
| 5,392,353 A | 2/1995 | Morales |
| 5,394,324 A | 2/1995 | Clearwater |
| 5,400,393 A | 3/1995 | Knuth et al. |
| 5,402,474 A | 3/1995 | Miller et al. |
| 5,408,663 A | 4/1995 | Miller |
| 5,410,586 A | 4/1995 | Davies |
| 5,410,728 A | 4/1995 | Bertiger et al. |
| 5,420,852 A | 5/1995 | Anderson et al. |
| 5,420,919 A | 5/1995 | Arnaud et al. |
| 5,422,647 A | 6/1995 | Hirshfield et al. |
| 5,425,093 A | 6/1995 | Trefzger |
| 5,430,729 A | 7/1995 | Rahnema |
| 5,430,792 A | 7/1995 | Jesurum et al. |
| 5,432,835 A | 7/1995 | Hashimoto |
| 5,433,726 A | 7/1995 | Horstein et al. |
| 5,434,906 A | 7/1995 | Robinson et al. |
| 5,436,967 A | 7/1995 | Hanson |
| 5,439,190 A | 8/1995 | Horstein et al. |
| 5,442,693 A | 8/1995 | Hays et al. |
| 5,446,756 A | 8/1995 | Mallinckrodt |
| 5,448,623 A | 9/1995 | Wiedeman et al. |
| 5,448,624 A | 9/1995 | Hardy et al. |
| 5,448,631 A | 9/1995 | Cain |
| 5,452,294 A | 9/1995 | Natarajan |
| 5,459,716 A | 10/1995 | Fahim et al. |
| 5,459,781 A | 10/1995 | Kaplan et al. |
| 5,463,686 A | 10/1995 | Lebourges |
| 5,465,204 A | 11/1995 | Sekine et al. |
| 5,465,286 A | 11/1995 | Clare et al. |
| 5,467,391 A | 11/1995 | Donaghue, Jr. et al. |
| 5,471,467 A | 11/1995 | Johann |
| 5,471,647 A | 11/1995 | Gerlach et al. |
| 5,479,444 A | 12/1995 | Malkamaki et al. |
| 5,479,447 A | 12/1995 | Chow et al. |
| 5,479,487 A | 12/1995 | Hammond |
| 5,479,501 A | 12/1995 | Lai |
| 5,481,596 A | 1/1996 | Comerford |
| 5,485,506 A | 1/1996 | Recht et al. |
| 5,491,690 A | 2/1996 | Alfonsi et al. |
| 5,493,690 A | 2/1996 | Shimazaki |
| 5,495,426 A | 2/1996 | Waclawsky et al. |
| 5,495,479 A | 2/1996 | Galaand et al. |
| 5,495,523 A | 2/1996 | Stent et al. |
| 5,495,528 A | 2/1996 | Dunn et al. |
| 5,502,762 A | 3/1996 | Andrew et al. |
| 5,502,816 A | 3/1996 | Gawlick et al. |
| 5,504,837 A | 4/1996 | Griffeth et al. |
| 5,506,898 A | 4/1996 | Costantini et al. |
| 5,510,779 A | 4/1996 | Maltby et al. |
| 5,510,799 A | 4/1996 | Wishart |
| 5,511,112 A | 4/1996 | Szlam |
| 5,511,117 A | 4/1996 | Zazzera |
| 5,511,121 A | 4/1996 | Yacobi |
| 5,515,367 A | 5/1996 | Cox, Jr. et al. |
| 5,515,378 A | 5/1996 | Roy, III et al. |
| 5,515,421 A | 5/1996 | Sikand et al. |
| 5,517,566 A | 5/1996 | Smith et al. |
| 5,517,628 A | 5/1996 | Morrison et al. |
| 5,519,773 A | 5/1996 | Dumas et al. |
| 5,519,836 A | 5/1996 | Gawlick et al. |
| 5,521,591 A | 5/1996 | Arora et al. |
| 5,521,616 A | 5/1996 | Capper et al. |
| 5,524,140 A | 6/1996 | Klausner et al. |
| 5,524,147 A | 6/1996 | Bean |
| 5,526,414 A | 6/1996 | Bedard et al. |
| 5,526,417 A | 6/1996 | Dezonno |
| 5,528,666 A | 6/1996 | Weigand et al. |
| 5,530,931 A | 6/1996 | Cook-Hellberg et al. |
| 5,532,939 A | 7/1996 | Psinakis et al. |
| 5,533,103 A | 7/1996 | Peavey et al. |
| 5,533,107 A | 7/1996 | Irwin et al. |
| 5,533,108 A | 7/1996 | Harris et al. |
| 5,533,109 A | 7/1996 | Baker |
| 5,535,257 A | 7/1996 | Goldberg et al. |
| 5,537,435 A | 7/1996 | Carney et al. |
| 5,537,470 A | 7/1996 | Lee |
| 5,539,815 A | 7/1996 | Samba |
| 5,539,884 A | 7/1996 | Robrock, II |
| 5,544,220 A | 8/1996 | Trefzger |
| 5,544,232 A | 8/1996 | Baker et al. |
| 5,546,452 A | 8/1996 | Andrews et al. |
| 5,546,456 A | 8/1996 | Vilsoet et al. |
| 5,548,639 A | 8/1996 | Ogura et al. |
| 5,548,801 A | 8/1996 | Araki et al. |
| 5,548,819 A | 8/1996 | Robb |
| 5,551,624 A | 9/1996 | Horstein et al. |
| 5,555,290 A | 9/1996 | McLeod et al. |
| 5,555,295 A | 9/1996 | Bhusri |
| 5,557,668 A | 9/1996 | Brady |
| 5,559,707 A | 9/1996 | DeLorme et al. |
| 5,559,867 A | 9/1996 | Langsenkamp et al. |
| 5,559,877 A | 9/1996 | Ash et al. |
| 5,559,878 A | 9/1996 | Keys et al. |
| 5,560,011 A | 9/1996 | Uyama |
| 5,561,711 A | 10/1996 | Muller |
| 5,566,209 A | 10/1996 | Forssen et al. |
| 5,566,283 A | 10/1996 | Modegi et al. |
| 5,568,540 A | 10/1996 | Greco et al. |
| 5,570,419 A | 10/1996 | Cave et al. |
| 5,572,430 A | 11/1996 | Akasaka et al. |
| 5,572,576 A | 11/1996 | Klausner et al. |
| 5,572,586 A | 11/1996 | Ouchi |
| 5,574,784 A | 11/1996 | LaPadula et al. |
| 5,577,112 A | 11/1996 | Cambray et al. |
| 5,579,377 A | 11/1996 | Rogers |
| 5,579,383 A | 11/1996 | Bales et al. |
| 5,581,602 A | 12/1996 | Szlam et al. |
| 5,581,604 A | 12/1996 | Robinson et al. |
| 5,581,607 A | 12/1996 | Richardson, Jr. et al. |
| 5,586,179 A | 12/1996 | Stent et al. |

(56) References Cited

U.S. PATENT DOCUMENTS

| | | | |
|---|---|---|---|
| 5,586,267 | A | 12/1996 | Chatwani et al. |
| 5,588,049 | A | 12/1996 | Detering et al. |
| 5,590,171 | A | 12/1996 | Howe et al. |
| 5,590,188 | A | 12/1996 | Crockett |
| 5,592,469 | A | 1/1997 | Szabo |
| 5,592,490 | A | 1/1997 | Barratt et al. |
| 5,592,543 | A | 1/1997 | Smith et al. |
| 5,594,790 | A | 1/1997 | Curreri et al. |
| 5,594,791 | A | 1/1997 | Szlam et al. |
| 5,596,722 | A | 1/1997 | Rahnema |
| 5,598,532 | A | 1/1997 | Liron |
| 5,600,638 | A | 2/1997 | Bertin et al. |
| 5,600,710 | A | 2/1997 | Weisser, Jr. et al. |
| 5,608,721 | A | 3/1997 | Natarajan et al. |
| 5,610,774 | A | 3/1997 | Hayashi et al. |
| 5,610,908 | A | 3/1997 | Shelswell et al. |
| 5,610,978 | A | 3/1997 | Purits |
| 5,612,701 | A | 3/1997 | Diekelman |
| 5,616,078 | A | 4/1997 | Oh |
| 5,617,514 | A | 4/1997 | Dolby et al. |
| 5,619,557 | A | 4/1997 | Van Berkum |
| 5,619,695 | A | 4/1997 | Arbabi et al. |
| 5,621,201 | A | 4/1997 | Langhans et al. |
| 5,623,413 | A | 4/1997 | Matheson et al. |
| 5,623,547 | A | 4/1997 | Jones et al. |
| 5,625,676 | A | 4/1997 | Greco et al. |
| 5,625,682 | A | 4/1997 | Gray et al. |
| 5,625,867 | A | 4/1997 | Rouffet et al. |
| 5,625,868 | A | 4/1997 | Jan et al. |
| 5,627,889 | A | 5/1997 | Eslambolchi |
| 5,629,838 | A | 5/1997 | Knight et al. |
| 5,633,917 | A | 5/1997 | Rogers |
| 5,633,922 | A | 5/1997 | August et al. |
| 5,633,924 | A | 5/1997 | Kaish et al. |
| 5,634,199 | A | 5/1997 | Gerlach et al. |
| 5,636,267 | A | 6/1997 | Utsumi et al. |
| 5,636,268 | A | 6/1997 | Dijkstra et al. |
| 5,638,436 | A | 6/1997 | Hamilton et al. |
| 5,642,353 | A | 6/1997 | Roy, III et al. |
| 5,646,986 | A | 7/1997 | Sahni et al. |
| 5,646,988 | A | 7/1997 | Hikawa |
| 5,649,287 | A | 7/1997 | Forssen et al. |
| 5,652,788 | A | 7/1997 | Hara |
| 5,655,013 | A | 8/1997 | Gainsboro |
| 5,655,014 | A | 8/1997 | Walsh et al. |
| 5,657,074 | A | 8/1997 | Ishibe et al. |
| 5,661,283 | A | 8/1997 | Gallacher et al. |
| 5,663,891 | A | 9/1997 | Bamji et al. |
| 5,664,006 | A | 9/1997 | Monte et al. |
| 5,666,416 | A | 9/1997 | Micali |
| 5,675,637 | A | 10/1997 | Szlam et al. |
| 5,677,955 | A | 10/1997 | Doggett et al. |
| 5,679,940 | A | 10/1997 | Templeton et al. |
| 5,684,863 | A | 11/1997 | Katz |
| 5,684,997 | A | 11/1997 | Kau et al. |
| 5,687,225 | A | 11/1997 | Jorgensen |
| 5,691,727 | A | 11/1997 | Cyzs |
| 5,692,033 | A | 11/1997 | Farris |
| 5,692,034 | A | 11/1997 | Richardson, Jr. et al. |
| 5,696,809 | A | 12/1997 | Voit |
| 5,696,818 | A | 12/1997 | Doremus et al. |
| 5,696,908 | A | 12/1997 | Muehlberger et al. |
| 5,697,056 | A | 12/1997 | Tayloe |
| 5,699,418 | A | 12/1997 | Jones |
| 5,701,295 | A | 12/1997 | Bales et al. |
| 5,703,935 | A | 12/1997 | Raissyan et al. |
| 5,710,911 | A | 1/1998 | Walsh et al. |
| 5,713,075 | A | 1/1998 | Threadgill et al. |
| 5,715,307 | A | 2/1998 | Zazzera |
| 5,717,741 | A | 2/1998 | Yue et al. |
| 5,717,757 | A | 2/1998 | Micali |
| 5,719,861 | A | 2/1998 | Okanoue |
| 5,721,916 | A | 2/1998 | Pardikar |
| 5,721,933 | A | 2/1998 | Walsh et al. |
| RE35,758 | E | 3/1998 | Winter et al. |
| 5,724,418 | A | 3/1998 | Brady |
| 5,727,051 | A | 3/1998 | Holender |
| 5,727,154 | A | 3/1998 | Fry et al. |
| 5,727,221 | A | 3/1998 | Walsh et al. |
| 5,729,600 | A | 3/1998 | Blaha et al. |
| 5,729,720 | A | 3/1998 | Kau et al. |
| 5,734,919 | A | 3/1998 | Walsh et al. |
| 5,737,685 | A | 4/1998 | Locascio et al. |
| 5,740,164 | A | 4/1998 | Liron |
| 5,740,233 | A | 4/1998 | Cave et al. |
| 5,740,240 | A | 4/1998 | Jolissaint |
| 5,740,366 | A | 4/1998 | Mahany et al. |
| 5,742,675 | A | 4/1998 | Kilander et al. |
| 5,748,611 | A | 5/1998 | Allen et al. |
| 5,748,711 | A | 5/1998 | Scherer |
| 5,751,987 | A | 5/1998 | Mahant-Shetti et al. |
| 5,752,173 | A | 5/1998 | Tsujimoto |
| 5,754,436 | A | 5/1998 | Walsh et al. |
| 5,754,790 | A | 5/1998 | France et al. |
| 5,754,837 | A | 5/1998 | Walsh et al. |
| 5,754,939 | A | 5/1998 | Herz et al. |
| 5,761,285 | A | 6/1998 | Stent |
| 5,764,740 | A | 6/1998 | Holender |
| 5,765,037 | A | 6/1998 | Morrison et al. |
| 5,768,355 | A | 6/1998 | Salibrici et al. |
| 5,768,360 | A | 6/1998 | Reynolds et al. |
| 5,768,385 | A | 6/1998 | Simon |
| 5,771,373 | A | 6/1998 | Kau et al. |
| 5,774,357 | A | 6/1998 | Hoffberg et al. |
| 5,774,526 | A | 6/1998 | Propp et al. |
| 5,774,537 | A | 6/1998 | Kim |
| 5,781,780 | A | 7/1998 | Walsh et al. |
| 5,784,291 | A | 7/1998 | Chen et al. |
| 5,784,636 | A | 7/1998 | Rupp |
| 5,787,156 | A | 7/1998 | Katz |
| 5,787,159 | A | 7/1998 | Hamilton et al. |
| 5,787,271 | A | 7/1998 | Box et al. |
| 5,787,470 | A | 7/1998 | DeSimone et al. |
| 5,790,541 | A | 8/1998 | Patrick et al. |
| 5,790,935 | A | 8/1998 | Payton |
| 5,793,846 | A | 8/1998 | Katz |
| 5,793,868 | A | 8/1998 | Micali |
| 5,796,791 | A | 8/1998 | Polcyn |
| 5,796,816 | A | 8/1998 | Utsumi |
| 5,799,077 | A | 8/1998 | Yoshii |
| 5,799,087 | A | 8/1998 | Rosen |
| 5,802,503 | A | 9/1998 | Sansone |
| 5,806,071 | A | 9/1998 | Balderrama et al. |
| 5,809,019 | A | 9/1998 | Ichihara et al. |
| 5,812,642 | A | 9/1998 | Leroy |
| 5,812,668 | A | 9/1998 | Weber |
| 5,815,551 | A | 9/1998 | Katz |
| 5,815,554 | A | 9/1998 | Burgess et al. |
| 5,815,566 | A | 9/1998 | Ramot et al. |
| 5,815,657 | A | 9/1998 | Williams et al. |
| 5,822,400 | A | 10/1998 | Smith |
| 5,822,401 | A | 10/1998 | Cave et al. |
| 5,822,410 | A | 10/1998 | McCausland et al. |
| 5,822,550 | A | 10/1998 | Milhaupt et al. |
| 5,825,869 | A | 10/1998 | Brooks et al. |
| 5,828,731 | A | 10/1998 | Szlam et al. |
| 5,828,734 | A | 10/1998 | Katz |
| 5,828,840 | A | 10/1998 | Cowan et al. |
| 5,832,089 | A | 11/1998 | Kravitz et al. |
| 5,835,572 | A | 11/1998 | Richardson, Jr. et al. |
| 5,835,733 | A | 11/1998 | Walsh et al. |
| 5,835,896 | A | 11/1998 | Fisher et al. |
| 5,838,663 | A | 11/1998 | Elwalid et al. |
| 5,838,772 | A | 11/1998 | Wilson et al. |
| 5,838,779 | A | 11/1998 | Fuller et al. |
| 5,839,119 | A | 11/1998 | Krsul et al. |
| 5,841,758 | A | 11/1998 | Chen et al. |
| 5,841,852 | A | 11/1998 | He |
| 5,842,005 | A | 11/1998 | Walsh et al. |
| 5,844,900 | A | 12/1998 | Hong et al. |
| 5,845,132 | A | 12/1998 | Walsh et al. |
| 5,848,143 | A | 12/1998 | Andrews et al. |
| 5,848,253 | A | 12/1998 | Walsh et al. |
| 5,848,266 | A | 12/1998 | Scheurich |

(56) References Cited

U.S. PATENT DOCUMENTS

| | | |
|---|---|---|
| 5,850,385 A | 12/1998 | Esaki |
| 5,850,428 A | 12/1998 | Day |
| 5,850,446 A | 12/1998 | Berger et al. |
| 5,850,617 A | 12/1998 | Libby |
| 5,852,370 A | 12/1998 | Ko |
| 5,854,832 A | 12/1998 | Dezonno |
| 5,854,899 A | 12/1998 | Callon et al. |
| 5,854,903 A | 12/1998 | Morrison et al. |
| 5,857,013 A | 1/1999 | Yue et al. |
| 5,857,023 A | 1/1999 | Demers et al. |
| 5,864,702 A | 1/1999 | Walsh et al. |
| 5,867,386 A | 2/1999 | Hoffberg et al. |
| 5,867,559 A | 2/1999 | Jorgensen et al. |
| 5,867,564 A | 2/1999 | Bhusri |
| 5,867,572 A | 2/1999 | MacDonald et al. |
| 5,867,717 A | 2/1999 | Milhaupt et al. |
| 5,867,799 A | 2/1999 | Lang et al. |
| 5,870,464 A | 2/1999 | Brewster et al. |
| 5,870,617 A | 2/1999 | Walsh et al. |
| 5,870,621 A | 2/1999 | Walsh et al. |
| 5,870,771 A | 2/1999 | Oberg |
| 5,872,833 A | 2/1999 | Scherer |
| 5,872,918 A | 2/1999 | Malomsoky et al. |
| 5,872,983 A | 2/1999 | Walsh et al. |
| 5,873,071 A | 2/1999 | Ferstenberg et al. |
| 5,875,108 A | 2/1999 | Hoffberg et al. |
| 5,875,312 A | 2/1999 | Walsh et al. |
| 5,878,126 A | 3/1999 | Velamuri et al. |
| 5,878,130 A | 3/1999 | Andrews et al. |
| 5,880,958 A | 3/1999 | Helms et al. |
| 5,881,048 A | 3/1999 | Croslin |
| 5,884,142 A | 3/1999 | Wiedeman et al. |
| 5,884,277 A | 3/1999 | Khosla |
| 5,886,988 A | 3/1999 | Yun et al. |
| 5,889,505 A | 3/1999 | Toyama et al. |
| 5,889,862 A | 3/1999 | Ohta et al. |
| 5,889,863 A | 3/1999 | Weber |
| 5,890,138 A | 3/1999 | Godin et al. |
| 5,893,902 A | 4/1999 | Transue et al. |
| 5,894,505 A | 4/1999 | Koyama |
| 5,896,446 A | 4/1999 | Sagady et al. |
| 5,898,154 A | 4/1999 | Rosen |
| 5,898,759 A | 4/1999 | Huang |
| 5,898,762 A | 4/1999 | Katz |
| 5,901,209 A | 5/1999 | Tannenbaum et al. |
| 5,901,214 A | 5/1999 | Shaffer et al. |
| 5,901,229 A | 5/1999 | Fujisaki et al. |
| 5,901,246 A | 5/1999 | Hoffberg et al. |
| 5,903,454 A | 5/1999 | Hoffberg et al. |
| 5,903,641 A * | 5/1999 | Tonisson ............ H04M 3/5233 379/265.12 |
| 5,903,651 A | 5/1999 | Kocher |
| 5,903,880 A | 5/1999 | Biffar |
| 5,905,721 A | 5/1999 | Liu et al. |
| 5,905,792 A | 5/1999 | Miloslaysky |
| 5,905,975 A | 5/1999 | Ausubel |
| 5,905,979 A | 5/1999 | Barrows |
| 5,907,601 A | 5/1999 | David et al. |
| 5,907,608 A | 5/1999 | Shaffer et al. |
| 5,910,982 A | 6/1999 | Shaffer et al. |
| 5,912,947 A | 6/1999 | Langsenkamp et al. |
| 5,913,195 A | 6/1999 | Weeren et al. |
| 5,913,727 A | 6/1999 | Ahdoot |
| 5,914,951 A | 6/1999 | Bentley et al. |
| 5,915,011 A | 6/1999 | Miloslaysky |
| 5,915,093 A | 6/1999 | Berlin et al. |
| 5,917,893 A | 6/1999 | Katz |
| 5,917,903 A | 6/1999 | Jolissaint |
| 5,918,021 A | 6/1999 | Aditya |
| 5,918,213 A | 6/1999 | Bernard et al. |
| 5,920,477 A | 7/1999 | Hoffberg et al. |
| 5,920,629 A | 7/1999 | Rosen |
| 5,922,049 A | 7/1999 | Radia et al. |
| 5,923,745 A | 7/1999 | Hurd |
| 5,923,746 A | 7/1999 | Baker et al. |
| 5,924,016 A | 7/1999 | Fuller et al. |
| 5,926,528 A | 7/1999 | David |
| 5,926,539 A | 7/1999 | Shtivelman |
| 5,926,548 A | 7/1999 | Okamoto |
| 5,930,339 A | 7/1999 | Nepustil |
| 5,930,777 A | 7/1999 | Barber |
| 5,933,480 A | 8/1999 | Felger |
| 5,933,492 A | 8/1999 | Turovski |
| 5,933,498 A | 8/1999 | Schneck et al. |
| 5,937,042 A | 8/1999 | Sofman |
| 5,937,055 A | 8/1999 | Kaplan |
| 5,937,390 A | 8/1999 | Hyodo |
| 5,937,394 A | 8/1999 | Wong et al. |
| 5,940,493 A | 8/1999 | Desai et al. |
| 5,940,496 A | 8/1999 | Gisby et al. |
| 5,940,497 A | 8/1999 | Miloslaysky |
| 5,940,813 A | 8/1999 | Hutchings |
| 5,940,947 A | 8/1999 | Takeuchi et al. |
| 5,941,813 A | 8/1999 | Sievers et al. |
| 5,943,403 A | 8/1999 | Richardson, Jr. et al. |
| 5,943,424 A | 8/1999 | Berger et al. |
| 5,943,507 A | 8/1999 | Cornish et al. |
| 5,946,387 A | 8/1999 | Miloslaysky |
| 5,946,388 A | 8/1999 | Walker et al. |
| 5,946,394 A | 8/1999 | Gambuzza |
| 5,946,669 A | 8/1999 | Polk |
| 5,949,045 A | 9/1999 | Ezawa et al. |
| 5,949,852 A | 9/1999 | Duncan |
| 5,949,854 A | 9/1999 | Sato |
| 5,949,863 A | 9/1999 | Tansky |
| 5,952,638 A | 9/1999 | Demers et al. |
| 5,953,229 A | 9/1999 | Clark et al. |
| 5,953,332 A | 9/1999 | Miloslaysky |
| 5,953,338 A | 9/1999 | Ma et al. |
| 5,953,405 A | 9/1999 | Miloslaysky |
| 5,956,392 A | 9/1999 | Tanigawa et al. |
| 5,956,397 A | 9/1999 | Shaffer et al. |
| 5,960,073 A | 9/1999 | Kikinis et al. |
| 5,960,083 A | 9/1999 | Micali |
| 5,963,632 A | 10/1999 | Miloslaysky |
| 5,963,635 A | 10/1999 | Szlam et al. |
| 5,963,648 A | 10/1999 | Rosen |
| 5,963,924 A | 10/1999 | Williams et al. |
| 5,966,094 A | 10/1999 | Ward et al. |
| 5,966,310 A | 10/1999 | Maeda et al. |
| 5,966,429 A | 10/1999 | Scherer |
| 5,970,132 A | 10/1999 | Brady |
| 5,970,134 A | 10/1999 | Highland et al. |
| 5,974,120 A | 10/1999 | Katz |
| 5,974,135 A | 10/1999 | Breneman et al. |
| RE36,416 E | 11/1999 | Szlam et al. |
| 5,978,465 A | 11/1999 | Corduroy et al. |
| 5,978,467 A | 11/1999 | Walker et al. |
| 5,978,471 A | 11/1999 | Bokinge |
| 5,978,840 A | 11/1999 | Nguyen et al. |
| 5,982,352 A | 11/1999 | Pryor |
| 5,982,857 A | 11/1999 | Brady |
| 5,982,868 A | 11/1999 | Shaffer et al. |
| 5,983,208 A | 11/1999 | Haller et al. |
| 5,983,214 A | 11/1999 | Lang et al. |
| 5,987,011 A | 11/1999 | Toh |
| 5,987,115 A | 11/1999 | Petrunka et al. |
| 5,987,116 A | 11/1999 | Petrunka et al. |
| 5,987,118 A | 11/1999 | Dickerman et al. |
| 5,987,132 A | 11/1999 | Rowney |
| 5,987,140 A | 11/1999 | Rowney et al. |
| 5,987,244 A | 11/1999 | Kau et al. |
| 5,987,328 A | 11/1999 | Ephremides et al. |
| 5,991,391 A | 11/1999 | Miloslaysky |
| 5,991,392 A | 11/1999 | Miloslaysky |
| 5,991,393 A | 11/1999 | Kamen |
| 5,991,395 A | 11/1999 | Miloslaysky |
| 5,991,604 A | 11/1999 | Yi |
| 5,991,761 A | 11/1999 | Mahoney et al. |
| 5,995,080 A | 11/1999 | Biro et al. |
| 5,995,614 A | 11/1999 | Miloslaysky |
| 5,995,615 A | 11/1999 | Miloslaysky |
| 5,995,948 A | 11/1999 | Whitford et al. |
| 5,996,076 A | 11/1999 | Rowney et al. |

(56) References Cited

U.S. PATENT DOCUMENTS

| | | |
|---|---|---|
| 5,999,908 A | 12/1999 | Abelow |
| 5,999,919 A | 12/1999 | Jarecki et al. |
| 5,999,965 A | 12/1999 | Kelly |
| 6,002,760 A | 12/1999 | Gisby |
| 6,002,767 A | 12/1999 | Kramer |
| 6,003,765 A | 12/1999 | Okamoto |
| 6,005,534 A | 12/1999 | Hylin et al. |
| 6,005,928 A | 12/1999 | Johnson |
| 6,005,931 A | 12/1999 | Neyman et al. |
| 6,005,939 A | 12/1999 | Fortenberry et al. |
| 6,006,218 A | 12/1999 | Breese et al. |
| 6,009,149 A | 12/1999 | Langsenkamp |
| 6,011,845 A | 1/2000 | Nabkel et al. |
| 6,014,439 A | 1/2000 | Walker et al. |
| 6,016,307 A | 1/2000 | Kaplan et al. |
| 6,016,344 A | 1/2000 | Katz |
| 6,016,475 A | 1/2000 | Miller et al. |
| 6,016,484 A | 1/2000 | Williams et al. |
| 6,018,579 A | 1/2000 | Petrunka |
| 6,018,659 A | 1/2000 | Ayyagari et al. |
| 6,018,724 A | 1/2000 | Arent |
| 6,018,738 A | 1/2000 | Breese et al. |
| 6,021,114 A | 2/2000 | Shaffer et al. |
| 6,021,190 A | 2/2000 | Fuller et al. |
| 6,021,202 A | 2/2000 | Anderson et al. |
| 6,021,399 A | 2/2000 | Demers et al. |
| 6,021,428 A | 2/2000 | Miloslaysky |
| 6,026,149 A | 2/2000 | Fuller et al. |
| 6,026,156 A | 2/2000 | Epler et al. |
| 6,026,379 A | 2/2000 | Haller et al. |
| 6,029,150 A | 2/2000 | Kravitz |
| 6,029,151 A | 2/2000 | Nikander |
| 6,029,161 A | 2/2000 | Lang et al. |
| 6,031,899 A | 2/2000 | Wu |
| 6,035,021 A | 3/2000 | Katz |
| 6,035,402 A | 3/2000 | Vaeth et al. |
| 6,041,116 A | 3/2000 | Meyers |
| 6,041,118 A | 3/2000 | Michel et al. |
| 6,044,135 A | 3/2000 | Katz |
| 6,044,146 A | 3/2000 | Gisby et al. |
| 6,044,149 A | 3/2000 | Shaham et al. |
| 6,044,355 A | 3/2000 | Crockett et al. |
| 6,044,368 A | 3/2000 | Powers |
| 6,047,067 A | 4/2000 | Rosen |
| 6,047,269 A | 4/2000 | Biffar |
| 6,047,887 A | 4/2000 | Rosen |
| 6,049,327 A | 4/2000 | Walker et al. |
| 6,049,599 A | 4/2000 | McCausland et al. |
| 6,049,786 A | 4/2000 | Smorodinsky |
| 6,049,787 A | 4/2000 | Takahashi et al. |
| 6,052,453 A | 4/2000 | Sagady et al. |
| 6,055,307 A | 4/2000 | Behnke et al. |
| 6,055,508 A | 4/2000 | Naor et al. |
| 6,055,571 A | 4/2000 | Fulp et al. |
| 6,057,872 A | 5/2000 | Candelore |
| 6,058,381 A | 5/2000 | Nelson |
| 6,058,435 A * | 5/2000 | Sassin ............... H04M 3/51 379/265.12 |
| 6,061,347 A | 5/2000 | Hollatz et al. |
| 6,061,448 A | 5/2000 | Smith et al. |
| 6,061,665 A | 5/2000 | Bahreman |
| 6,064,667 A | 5/2000 | Gisby et al. |
| 6,064,730 A | 5/2000 | Ginsberg |
| 6,064,731 A | 5/2000 | Flockhart et al. |
| 6,064,973 A | 5/2000 | Smith et al. |
| 6,065,675 A | 5/2000 | Teicher |
| 6,067,348 A | 5/2000 | Hibbeler |
| 6,069,894 A | 5/2000 | Holender et al. |
| 6,070,142 A | 5/2000 | McDonough et al. |
| 6,072,864 A | 6/2000 | Shtivelman et al. |
| 6,072,870 A | 6/2000 | Nguyen et al. |
| 6,078,928 A | 6/2000 | Schnase et al. |
| 6,081,750 A | 6/2000 | Hoffberg et al. |
| 6,084,864 A | 7/2000 | Liron |
| 6,084,943 A | 7/2000 | Sunderman et al. |
| 6,084,955 A | 7/2000 | Key et al. |
| 6,084,979 A | 7/2000 | Kanade et al. |
| 6,097,369 A | 8/2000 | Wambach |
| 6,097,771 A | 8/2000 | Foschini |
| 6,097,806 A | 8/2000 | Baker et al. |
| 6,098,069 A | 8/2000 | Yamaguchi |
| 6,101,180 A | 8/2000 | Donahue et al. |
| 6,102,970 A | 8/2000 | Kneipp |
| 6,104,801 A | 8/2000 | Miloslaysky |
| 6,112,181 A | 8/2000 | Shear et al. |
| 6,112,186 A | 8/2000 | Bergh et al. |
| 6,112,273 A | 8/2000 | Kau et al. |
| 6,115,462 A | 9/2000 | Servi et al. |
| 6,115,693 A | 9/2000 | McDonough et al. |
| 6,118,865 A | 9/2000 | Gisby |
| 6,122,291 A | 9/2000 | Robinson et al. |
| 6,122,358 A | 9/2000 | Shoji et al. |
| 6,122,360 A | 9/2000 | Neyman et al. |
| 6,122,364 A | 9/2000 | Petrunka et al. |
| 6,122,484 A | 9/2000 | Fuller et al. |
| 6,125,178 A | 9/2000 | Walker et al. |
| 6,128,376 A | 10/2000 | Smith |
| 6,128,380 A | 10/2000 | Shaffer et al. |
| 6,130,937 A | 10/2000 | Fotta |
| 6,134,235 A | 10/2000 | Goldman et al. |
| 6,134,530 A | 10/2000 | Bunting et al. |
| 6,137,862 A | 10/2000 | Atkinson et al. |
| 6,137,870 A | 10/2000 | Scherer |
| 6,138,119 A | 10/2000 | Hall et al. |
| 6,141,325 A | 10/2000 | Gerstel |
| 6,144,711 A | 11/2000 | Raleigh et al. |
| 6,144,737 A | 11/2000 | Maruyama et al. |
| 6,144,964 A | 11/2000 | Breese et al. |
| 6,146,026 A | 11/2000 | Ushiku |
| 6,147,975 A | 11/2000 | Bowman-Amuah |
| 6,148,065 A | 11/2000 | Katz |
| 6,151,387 A | 11/2000 | Katz |
| 6,154,528 A | 11/2000 | Bennett, III et al. |
| 6,154,535 A | 11/2000 | Velamuri et al. |
| RE37,001 E | 12/2000 | Morganstein et al. |
| 6,157,655 A | 12/2000 | Shtivelman |
| 6,157,711 A | 12/2000 | Katz |
| 6,163,607 A * | 12/2000 | Bogart ............... H04M 3/5233 379/265.02 |
| 6,170,011 B1 | 1/2001 | Macleod Beck et al. |
| 6,170,742 B1 | 1/2001 | Yacoob |
| 6,173,052 B1 | 1/2001 | Brady |
| 6,173,053 B1 | 1/2001 | Bogart et al. |
| 6,175,563 B1 | 1/2001 | Miloslaysky |
| 6,175,564 B1 | 1/2001 | Miloslaysky et al. |
| 6,177,932 B1 | 1/2001 | Galdes et al. |
| 6,178,240 B1 | 1/2001 | Walker et al. |
| 6,185,283 B1 | 2/2001 | Fuller et al. |
| 6,185,292 B1 | 2/2001 | Miloslaysky |
| 6,185,598 B1 | 2/2001 | Farber et al. |
| 6,185,683 B1 | 2/2001 | Ginter et al. |
| 6,192,121 B1 | 2/2001 | Atkinson et al. |
| 6,192,413 B1 | 2/2001 | Lee et al. |
| 6,198,487 B1 | 3/2001 | Fortenberry et al. |
| 6,201,950 B1 | 3/2001 | Fuller et al. |
| 6,205,207 B1 | 3/2001 | Scherer |
| 6,208,970 B1 | 3/2001 | Ramanan |
| 6,212,178 B1 | 4/2001 | Beck et al. |
| 6,215,263 B1 | 4/2001 | Berkowitz et al. |
| 6,223,165 B1 | 4/2001 | Lauffer |
| 6,226,287 B1 | 5/2001 | Brady |
| 6,226,289 B1 | 5/2001 | Williams et al. |
| 6,226,360 B1 | 5/2001 | Goldberg et al. |
| 6,229,888 B1 | 5/2001 | Miloslaysky |
| 6,230,197 B1 | 5/2001 | Beck et al. |
| 6,230,203 B1 | 5/2001 | Koperda et al. |
| 6,233,332 B1 | 5/2001 | Anderson et al. |
| 6,236,978 B1 | 5/2001 | Tuzhilin |
| 6,236,980 B1 | 5/2001 | Reese |
| 6,243,684 B1 | 6/2001 | Stuart et al. |
| 6,249,241 B1 | 6/2001 | Jordan et al. |
| 6,253,080 B1 | 6/2001 | Wiedeman et al. |
| 6,253,193 B1 | 6/2001 | Ginter et al. |
| 6,253,313 B1 | 6/2001 | Morrison et al. |

(56) References Cited

U.S. PATENT DOCUMENTS

| | | |
|---|---|---|
| 6,256,648 B1 | 7/2001 | Hill et al. |
| 6,266,649 B1 | 7/2001 | Linden et al. |
| 6,272,483 B1 | 8/2001 | Joslin et al. |
| 6,275,470 B1 | 8/2001 | Ricciulli |
| 6,304,556 B1 | 10/2001 | Haas |
| 6,304,639 B1 | 10/2001 | Malomsoky et al. |
| 6,308,175 B1 | 10/2001 | Lang et al. |
| 6,314,420 B1 | 11/2001 | Lang et al. |
| 6,317,718 B1 | 11/2001 | Fano |
| 6,317,722 B1 | 11/2001 | Jacobi et al. |
| 6,321,179 B1 | 11/2001 | Glance et al. |
| 6,321,221 B1 | 11/2001 | Bieganski |
| 6,327,590 B1 | 12/2001 | Chidlovskii et al. |
| 6,331,986 B1 | 12/2001 | Mitra et al. |
| 6,333,979 B1 | 12/2001 | Bondi et al. |
| 6,333,980 B1 | 12/2001 | Hollatz et al. |
| 6,334,127 B1 | 12/2001 | Bieganski et al. |
| 6,334,131 B2 | 12/2001 | Chakrabarti et al. |
| 6,345,264 B1 | 2/2002 | Breese et al. |
| 6,347,139 B1 | 2/2002 | Fisher et al. |
| 6,353,813 B1 | 3/2002 | Breese et al. |
| 6,356,899 B1 | 3/2002 | Chakrabarti et al. |
| 6,363,334 B1 | 3/2002 | Andrews et al. |
| 6,374,227 B1 | 4/2002 | Ye |
| 6,377,631 B1 | 4/2002 | Raleigh |
| 6,377,805 B1 | 4/2002 | Anvekar et al. |
| 6,389,372 B1 | 5/2002 | Glance et al. |
| 6,400,996 B1 | 6/2002 | Hoffberg et al. |
| 6,405,922 B1 | 6/2002 | Kroll |
| 6,411,603 B1 | 6/2002 | Ahuja et al. |
| 6,412,012 B1 | 6/2002 | Bieganski et al. |
| 6,418,148 B1 | 7/2002 | Kumar et al. |
| 6,418,424 B1 | 7/2002 | Hoffberg et al. |
| 6,421,709 B1 | 7/2002 | McCormick et al. |
| 6,421,754 B1 | 7/2002 | Kau et al. |
| 6,430,558 B1 | 8/2002 | Delano |
| 6,446,035 B1 | 9/2002 | Grefenstette et al. |
| 6,449,367 B2 | 9/2002 | Van Wie et al. |
| 6,452,981 B1 | 9/2002 | Raleigh et al. |
| 6,453,038 B1 | 9/2002 | McFarlane et al. |
| 6,456,025 B2 | 9/2002 | Berkowitz et al. |
| 6,459,784 B1 | 10/2002 | Humphrey et al. |
| 6,463,299 B1 | 10/2002 | Macor |
| 6,466,654 B1 | 10/2002 | Cooper et al. |
| 6,466,909 B1 | 10/2002 | Didcock |
| 6,466,970 B1 | 10/2002 | Lee et al. |
| 6,470,077 B1 | 10/2002 | Chan |
| 6,473,405 B2 | 10/2002 | Ricciulli |
| 6,477,245 B1 | 11/2002 | Chevet et al. |
| 6,477,246 B1 | 11/2002 | Dolan et al. |
| 6,477,494 B2 | 11/2002 | Hyde-Thomson et al. |
| 6,480,844 B1 | 11/2002 | Cortes et al. |
| 6,484,123 B2 | 11/2002 | Srivastava |
| 6,487,289 B1 | 11/2002 | Phan et al. |
| 6,487,533 B2 | 11/2002 | Hyde-Thomson et al. |
| 6,493,432 B1 | 12/2002 | Blum et al. |
| 6,493,696 B1 | 12/2002 | Chazin |
| 6,496,568 B1 | 12/2002 | Nelson |
| 6,510,221 B1 | 1/2003 | Fisher et al. |
| 6,519,259 B1 | 2/2003 | Baker et al. |
| 6,519,459 B1 | 2/2003 | Chavez, Jr. et al. |
| 6,522,726 B1 | 2/2003 | Hunt et al. |
| 6,529,870 B1 | 3/2003 | Mikkilineni |
| 6,529,891 B1 | 3/2003 | Heckerman |
| 6,536,935 B2 | 3/2003 | Parunak et al. |
| 6,553,114 B1 | 4/2003 | Fisher et al. |
| 6,553,355 B1 | 4/2003 | Arnoux et al. |
| 6,577,600 B1 | 6/2003 | Bare |
| 6,577,613 B1 | 6/2003 | Ramanathan |
| 6,636,840 B1 | 10/2003 | Goray et al. |
| 6,650,655 B2 | 11/2003 | Alvesalo et al. |
| 6,650,871 B1 | 11/2003 | Cannon et al. |
| 6,661,889 B1 * | 12/2003 | Flockhart ............ H04M 3/5232 379/265.05 |
| 6,678,252 B1 | 1/2004 | Cansever |
| 6,691,173 B2 | 2/2004 | Morris et al. |
| 6,697,858 B1 | 2/2004 | Ezerzer et al. |
| 6,720,949 B1 | 4/2004 | Pryor et al. |
| 6,728,113 B1 | 4/2004 | Knight et al. |
| 6,735,440 B2 | 5/2004 | Wiedeman et al. |
| 6,735,630 B1 | 5/2004 | Gelvin et al. |
| 6,737,958 B1 | 5/2004 | Satyanarayana |
| 6,757,268 B1 | 6/2004 | Zendle |
| 6,778,502 B2 | 8/2004 | Ricciulli |
| 6,826,549 B1 | 11/2004 | Marks et al. |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,865,170 B1 | 3/2005 | Zendle |
| 6,888,899 B2 | 5/2005 | Raleigh et al. |
| 6,898,205 B1 | 5/2005 | Chaskar et al. |
| 6,904,421 B2 | 6/2005 | Shetty |
| 6,916,719 B1 | 7/2005 | Knight et al. |
| 6,938,099 B2 | 8/2005 | Morton et al. |
| 6,975,613 B1 | 12/2005 | Johansson |
| 6,981,055 B1 | 12/2005 | Ahuja et al. |
| 7,020,086 B2 | 3/2006 | Juttner et al. |
| 7,020,701 B1 | 3/2006 | Gelvin et al. |
| 7,023,979 B1 | 4/2006 | Wu et al. |
| 7,042,440 B2 | 5/2006 | Pryor et al. |
| 7,054,850 B2 | 5/2006 | Matsugu |
| 7,058,296 B2 | 6/2006 | Saniee et al. |
| 7,070,110 B2 | 7/2006 | Lapstun et al. |
| 7,075,892 B2 | 7/2006 | Grover et al. |
| 7,079,529 B1 | 7/2006 | Khuc |
| 7,085,249 B2 | 8/2006 | Lohtia et al. |
| 7,097,106 B2 | 8/2006 | Silverbrook et al. |
| 7,110,525 B1 | 9/2006 | Heller et al. |
| 7,128,265 B2 | 10/2006 | Silverbrook et al. |
| 7,128,270 B2 | 10/2006 | Silverbrook et al. |
| 7,131,596 B2 | 11/2006 | Lapstun et al. |
| 7,136,448 B1 | 11/2006 | Venkataperumal et al. |
| 7,137,566 B2 | 11/2006 | Silverbrook et al. |
| 7,145,971 B2 | 12/2006 | Raleigh et al. |
| 7,150,398 B2 | 12/2006 | Silverbrook et al. |
| 7,159,777 B2 | 1/2007 | Silverbrook et al. |
| 7,175,089 B2 | 2/2007 | Silverbrook et al. |
| 7,178,719 B2 | 2/2007 | Silverbrook et al. |
| 7,188,769 B2 | 3/2007 | Silverbrook et al. |
| 7,197,374 B2 | 3/2007 | Silverbrook et al. |
| 7,203,249 B2 | 4/2007 | Raleigh et al. |
| 7,207,483 B2 | 4/2007 | Silverbrook et al. |
| 7,207,485 B2 | 4/2007 | Silverbrook et al. |
| 7,221,287 B2 | 5/2007 | Gueziec et al. |
| 7,243,849 B2 | 7/2007 | Lapstun et al. |
| 7,267,273 B2 | 9/2007 | Silverbrook et al. |
| 7,269,253 B1 | 9/2007 | Wu et al. |
| 7,270,266 B2 | 9/2007 | Silverbrook et al. |
| 7,295,568 B2 | 11/2007 | Kossi et al. |
| 7,296,737 B2 | 11/2007 | Silverbrook et al. |
| 7,314,177 B2 | 1/2008 | Lapstun et al. |
| 7,314,181 B2 | 1/2008 | Lapstun et al. |
| 7,346,865 B2 | 3/2008 | Su et al. |
| 7,356,224 B2 | 4/2008 | Levner et al. |
| 7,357,323 B2 | 4/2008 | Silverbrook et al. |
| 7,358,929 B2 | 4/2008 | Mueller et al. |
| 7,365,674 B2 | 4/2008 | Tillotson et al. |
| 7,372,952 B1 | 5/2008 | Wu et al. |
| 7,375,649 B2 | 5/2008 | Gueziec |
| 7,383,984 B2 | 6/2008 | Silverbrook et al. |
| 7,383,991 B2 | 6/2008 | Silverbrook et al. |
| 7,400,903 B2 | 7/2008 | Shoemake et al. |
| 7,421,678 B2 | 9/2008 | Barnes et al. |
| 7,441,225 B2 | 10/2008 | Boutin et al. |
| 7,450,273 B2 | 11/2008 | Silverbrook et al. |
| 7,451,449 B2 | 11/2008 | Thompson et al. |
| 7,457,007 B2 | 11/2008 | Silverbrook et al. |
| 7,463,726 B2 | 12/2008 | Jensen et al. |
| 7,464,156 B2 | 12/2008 | Amir et al. |
| 7,466,913 B2 | 12/2008 | Saniee et al. |
| 7,469,836 B2 | 12/2008 | Silverbrook et al. |
| 7,480,248 B2 | 1/2009 | Duggi et al. |
| 7,496,257 B2 | 2/2009 | Levner et al. |
| 7,506,808 B2 | 3/2009 | Silverbrook et al. |

(56) References Cited

U.S. PATENT DOCUMENTS

| | | | |
|---|---|---|---|
| 7,508,321 B2 | 3/2009 | Gueziec et al. |
| 7,537,160 B2 | 5/2009 | Silverbrook et al. |
| 7,542,426 B1 | 6/2009 | Connors et al. |
| 7,555,060 B2 | 6/2009 | Raleigh et al. |
| 7,555,542 B1 | 6/2009 | Ayers et al. |
| 7,557,730 B2 | 7/2009 | Gueziec |
| 7,561,532 B2 | 7/2009 | Bossi et al. |
| 7,566,009 B2 | 7/2009 | Lapstun et al. |
| 7,568,629 B2 | 8/2009 | Lapstun et al. |
| 7,590,589 B2 | 9/2009 | Hoffberg |
| 7,605,940 B2 | 10/2009 | Silverbrook et al. |
| 7,609,614 B2 | 10/2009 | Fonseka et al. |
| 7,610,151 B2 | 10/2009 | Letchner et al. |
| 7,612,923 B2 | 11/2009 | Rusman et al. |
| 7,617,976 B2 | 11/2009 | Silverbrook et al. |
| 7,624,337 B2 | 11/2009 | Sull et al. |
| 7,630,948 B2 | 12/2009 | Friedlander et al. |
| 7,637,437 B2 | 12/2009 | Lapstun et al. |
| 7,647,286 B2 | 1/2010 | Friedlander et al. |
| 7,647,288 B2 | 1/2010 | Friedlander et al. |
| 7,648,068 B2 | 1/2010 | Silverbrook et al. |
| 7,653,609 B2 | 1/2010 | Friedlander et al. |
| 7,653,884 B2 | 1/2010 | Furnish et al. |
| 7,654,454 B2 | 2/2010 | Silverbrook et al. |
| 7,664,188 B2 | 2/2010 | Raleigh et al. |
| 7,669,160 B2 | 2/2010 | Furnish et al. |
| 7,676,034 B1 | 3/2010 | Wu et al. |
| 7,688,807 B2 | 3/2010 | Yegoshin |
| 7,698,246 B2 | 4/2010 | Friedlander et al. |
| 7,702,187 B2 | 4/2010 | Rusman et al. |
| 7,721,961 B2 | 5/2010 | Silverbrook et al. |
| 7,734,783 B1 * | 6/2010 | Bourke .................. H04M 3/51 |
| | | | 379/265.01 |
| 7,739,040 B2 | 6/2010 | Horvitz |
| 7,752,150 B2 | 7/2010 | Ye et al. |
| 7,752,588 B2 | 7/2010 | Bose |
| 7,756,008 B2 | 7/2010 | Bellovin |
| 7,773,740 B2 * | 8/2010 | Beckstrom .......... H04M 3/5235 |
| | | | 370/352 |
| 7,797,367 B1 | 9/2010 | Gelvin et al. |
| 7,801,490 B1 | 9/2010 | Scherzer |
| 7,814,451 B2 | 10/2010 | Furnish et al. |
| 7,817,796 B1 | 10/2010 | Clippinger et al. |
| 7,819,323 B2 | 10/2010 | Silverbrook et al. |
| 7,823,055 B2 | 10/2010 | Sull et al. |
| 7,826,560 B2 | 11/2010 | Raleigh et al. |
| 7,840,133 B2 | 11/2010 | Zaacks et al. |
| 7,843,429 B2 | 11/2010 | Pryor |
| 7,844,687 B1 | 11/2010 | Gelvin et al. |
| 7,852,786 B2 | 12/2010 | Wang et al. |
| 7,869,221 B2 | 1/2011 | Knight et al. |
| 7,874,481 B2 | 1/2011 | Silverbrook et al. |
| 7,877,304 B1 | 1/2011 | Coulter |
| 7,878,408 B2 | 2/2011 | Lapstun et al. |
| 7,878,416 B2 | 2/2011 | Lapstun et al. |
| 7,880,642 B2 | 2/2011 | Gueziec |
| 7,890,857 B1 | 2/2011 | Jouppi |
| 7,894,595 B1 | 2/2011 | Wu et al. |
| 7,900,841 B2 | 3/2011 | Lapstun et al. |
| 7,907,517 B2 | 3/2011 | Steven |
| 7,912,791 B2 | 3/2011 | Boutin et al. |
| 7,916,858 B1 | 3/2011 | Heller et al. |
| 7,918,399 B2 | 4/2011 | Silverbrook et al. |
| 7,921,392 B2 | 4/2011 | Furnish et al. |
| 7,921,393 B2 | 4/2011 | Furnish et al. |
| 7,934,650 B2 | 5/2011 | Silverbrook et al. |
| 7,946,485 B2 | 5/2011 | Silverbrook et al. |
| 7,953,888 B2 | 5/2011 | Ricciulli |
| 7,961,360 B2 | 6/2011 | Rusman et al. |
| 7,962,873 B2 | 6/2011 | Su et al. |
| 7,962,882 B2 | 6/2011 | Su et al. |
| 8,000,988 B1 | 8/2011 | Bezanson et al. |
| 8,005,111 B2 | 8/2011 | Lauther |
| 8,005,654 B2 | 8/2011 | Boldyrev et al. |
| 8,022,943 B2 | 9/2011 | Silverbrook et al. |
| 8,023,425 B2 | 9/2011 | Raleigh |
| 8,036,307 B2 | 10/2011 | Raleigh et al. |
| 8,041,163 B2 | 10/2011 | Levner et al. |
| 8,046,319 B2 | 10/2011 | Satir et al. |
| 8,054,965 B1 | 11/2011 | Wu et al. |
| 8,060,017 B2 | 11/2011 | Schlicht et al. |
| 8,068,095 B2 | 11/2011 | Pryor |
| 8,079,517 B2 | 12/2011 | Silverbrook et al. |
| 8,090,530 B2 | 1/2012 | Horvitz |
| 8,103,797 B2 | 1/2012 | Day |
| 8,111,239 B2 | 2/2012 | Pryor et al. |
| 8,112,300 B2 | 2/2012 | Harper |
| 8,122,392 B2 | 2/2012 | White et al. |
| 8,130,758 B2 | 3/2012 | Cohen |
| 8,132,729 B2 | 3/2012 | Silverbrook et al. |
| 8,140,658 B1 | 3/2012 | Gelvin et al. |
| 8,144,619 B2 | 3/2012 | Hoffberg |
| 8,149,707 B2 | 4/2012 | Steer et al. |
| 8,205,179 B2 | 6/2012 | Su et al. |
| 8,205,185 B2 | 6/2012 | Su et al. |
| 8,212,688 B2 | 7/2012 | Morioka et al. |
| 8,223,726 B2 | 7/2012 | Zendle |
| 8,225,319 B2 | 7/2012 | Laithwaite et al. |
| 8,228,839 B2 | 7/2012 | Fonseka et al. |
| 8,229,812 B2 | 7/2012 | Raleigh |
| 8,229,834 B2 | 7/2012 | Borkovec et al. |
| 8,238,541 B1 * | 8/2012 | Kalavar ............... H04M 3/5233 |
| | | | 379/265.06 |
| 8,250,207 B2 | 8/2012 | Raleigh |
| 8,260,652 B1 | 9/2012 | Silver et al. |
| 8,270,310 B2 | 9/2012 | Raleigh |
| 8,270,952 B2 | 9/2012 | Raleigh |
| 8,284,461 B2 | 10/2012 | Rusman et al. |
| 8,285,681 B2 | 10/2012 | Prahlad et al. |
| 8,296,221 B1 | 10/2012 | Waelbroeck et al. |
| 8,300,798 B1 | 10/2012 | Wu et al. |
| 8,311,377 B2 | 11/2012 | Levner et al. |
| 8,321,526 B2 | 11/2012 | Raleigh |
| 8,322,612 B2 | 12/2012 | Silverbrook et al. |
| 8,323,189 B2 | 12/2012 | Tran et al. |
| 8,326,958 B1 | 12/2012 | Raleigh |
| 8,331,901 B2 | 12/2012 | Raleigh |
| 8,332,247 B1 | 12/2012 | Bailey et al. |
| 8,332,793 B2 | 12/2012 | Bose |
| 8,335,704 B2 | 12/2012 | Trefler et al. |
| 8,347,243 B2 | 1/2013 | Bruneel |
| 8,351,898 B2 | 1/2013 | Raleigh |
| 8,352,587 B2 | 1/2013 | Day |
| 8,355,337 B2 | 1/2013 | Raleigh |
| 8,358,222 B2 | 1/2013 | Gueziec |
| 8,364,515 B1 | 1/2013 | Procopiuc |
| 8,385,916 B2 | 2/2013 | Raleigh |
| 8,396,458 B2 | 3/2013 | Raleigh |
| 8,405,604 B2 | 3/2013 | Pryor et al. |
| 8,406,733 B2 | 3/2013 | Raleigh |
| 8,407,190 B2 | 3/2013 | Prahlad et al. |
| 8,411,842 B1 | 4/2013 | Wu et al. |
| 8,416,468 B2 | 4/2013 | Underwood et al. |
| 8,433,645 B1 | 4/2013 | Waelbroeck et al. |
| 8,437,271 B2 | 5/2013 | Raleigh |
| 8,441,989 B2 | 5/2013 | Raleigh |
| 8,442,030 B2 | 5/2013 | Dennison |
| 8,442,152 B2 | 5/2013 | Raleigh et al. |
| 8,447,231 B2 | 5/2013 | Bai et al. |
| 8,467,312 B2 | 6/2013 | Raleigh |
| 8,473,197 B2 | 6/2013 | Horvitz |
| 8,475,368 B2 | 7/2013 | Tran et al. |
| 8,478,667 B2 | 7/2013 | Raleigh |
| 8,479,157 B2 | 7/2013 | Trefler et al. |
| 8,509,032 B2 | 8/2013 | Rakib |
| 8,516,552 B2 | 8/2013 | Raleigh |
| 8,531,312 B2 | 9/2013 | Gueziec |
| 8,531,986 B2 | 9/2013 | Raleigh |
| 8,532,209 B2 | 9/2013 | Fonseka et al. |
| 8,537,033 B2 | 9/2013 | Gueziec |
| 8,547,872 B2 | 10/2013 | Raleigh |
| 8,554,458 B2 | 10/2013 | Sawhill et al. |
| 8,564,455 B2 | 10/2013 | Gueziec |
| 8,566,447 B2 | 10/2013 | Cohen et al. |

(56) References Cited

U.S. PATENT DOCUMENTS

| | | |
|---|---|---|
| 8,570,908 B2 | 10/2013 | Raleigh |
| 8,578,348 B2 | 11/2013 | Fliess et al. |
| 8,583,781 B2 | 11/2013 | Raleigh |
| 8,588,110 B2 | 11/2013 | Raleigh |
| 8,594,917 B2 | 11/2013 | Sawhill et al. |
| 8,599,697 B2 | 12/2013 | Ricciulli |
| 8,600,830 B2 | 12/2013 | Hoffberg |
| 8,612,107 B2 | 12/2013 | Malikopoulos |
| 8,612,439 B2 | 12/2013 | Prahlad et al. |
| 8,614,668 B2 | 12/2013 | Pryor |
| 8,626,540 B2 | 1/2014 | Peterkofsky et al. |
| 8,630,192 B2 | 1/2014 | Raleigh |
| 8,630,284 B2 | 1/2014 | Yegoshin |
| 8,630,611 B2 | 1/2014 | Raleigh |
| 8,631,102 B2 | 1/2014 | Raleigh |
| 8,635,147 B2 | 1/2014 | Borkovec et al. |
| 8,635,678 B2 | 1/2014 | Raleigh |
| 8,639,811 B2 | 1/2014 | Raleigh |
| 8,639,935 B2 | 1/2014 | Raleigh |
| 8,640,198 B2 | 1/2014 | Raleigh |
| 8,650,432 B2 | 2/2014 | Nakata |
| 8,652,038 B2 | 2/2014 | Tran et al. |
| 8,666,364 B2 | 3/2014 | Raleigh |
| 8,667,571 B2 | 3/2014 | Raleigh |
| 8,670,548 B2 | 3/2014 | Xie et al. |
| 8,675,507 B2 | 3/2014 | Raleigh |
| 8,688,099 B2 | 4/2014 | Raleigh |
| 8,695,073 B2 | 4/2014 | Raleigh |
| 8,699,674 B2 | 4/2014 | Bouzid et al. |
| 8,699,694 B2 | 4/2014 | Chishti et al. |
| 8,700,548 B2 | 4/2014 | Bhandari et al. |
| 8,706,120 B2 | 4/2014 | Hwang et al. |
| 8,706,914 B2 | 4/2014 | Duchesneau |
| 8,706,915 B2 | 4/2014 | Duchesneau |
| 8,713,630 B2 | 4/2014 | Raleigh |
| 8,718,271 B2 | 5/2014 | Spottiswoode |
| 8,718,925 B2 | 5/2014 | Letchner et al. |
| 8,724,554 B2 | 5/2014 | Raleigh |
| 8,724,797 B2 | 5/2014 | Chishti et al. |
| 8,727,978 B2 | 5/2014 | Tran et al. |
| 8,731,178 B2 | 5/2014 | Chishti et al. |
| 8,736,548 B2 | 5/2014 | Pryor |
| 8,737,595 B2 | 5/2014 | Chishti et al. |
| 8,737,957 B2 | 5/2014 | Raleigh |
| 8,743,291 B2 | 6/2014 | Li et al. |
| 8,744,937 B2 | 6/2014 | Seubert et al. |
| 8,745,191 B2 | 6/2014 | Raleigh et al. |
| 8,745,220 B2 | 6/2014 | Raleigh et al. |
| 8,747,313 B2 | 6/2014 | Tran et al. |
| 8,750,161 B1 | 6/2014 | Matthews et al. |
| 8,750,488 B2 | 6/2014 | Spottiswoode et al. |
| 8,755,458 B2 | 6/2014 | Raleigh et al. |
| 8,760,398 B2 | 6/2014 | Pryor |
| 8,762,188 B2 | 6/2014 | Abercrombie et al. |
| 8,768,313 B2 | 7/2014 | Rodriguez |
| 8,769,077 B2 | 7/2014 | Day |
| 8,775,645 B2 | 7/2014 | Solotorevsky et al. |
| 8,781,100 B2 | 7/2014 | Spottiswoode et al. |
| 8,781,106 B2 | 7/2014 | Afzal |
| 8,782,570 B1 | 7/2014 | Li et al. |
| 8,786,464 B2 | 7/2014 | Gueziec |
| 8,788,314 B2 | 7/2014 | Procopiuc |
| 8,792,630 B2 | 7/2014 | Chishti et al. |
| 8,797,908 B2 | 8/2014 | Raleigh |
| 8,798,613 B2 | 8/2014 | MacNaughtan et al. |
| 8,799,451 B2 | 8/2014 | Raleigh |
| 8,799,830 B2 | 8/2014 | Robles |
| 8,805,110 B2 | 8/2014 | Rhoads et al. |
| 8,812,654 B2 | 8/2014 | Gelvin et al. |
| 8,824,658 B2 | 9/2014 | Chishti |
| 8,830,873 B2 | 9/2014 | Tomic et al. |
| 8,831,205 B1 | 9/2014 | Wu et al. |
| 8,832,244 B2 | 9/2014 | Gelvin et al. |
| 8,836,503 B2 | 9/2014 | Gelvin et al. |
| 8,839,387 B2 | 9/2014 | Raleigh |
| 8,839,388 B2 | 9/2014 | Raleigh |
| 8,847,887 B2 | 9/2014 | Pryor |
| 8,849,761 B2 | 9/2014 | Prahlad et al. |
| 8,849,860 B2 | 9/2014 | Ilyas et al. |
| 8,849,955 B2 | 9/2014 | Prahlad et al. |
| 8,856,846 B2 | 10/2014 | Applegate et al. |
| 8,862,386 B2 | 10/2014 | Griffiths |
| 8,874,477 B2 | 10/2014 | Hoffberg |
| 8,879,715 B2 | 11/2014 | Spottiswoode et al. |
| 8,886,162 B2 | 11/2014 | Raleigh |
| 8,897,743 B2 | 11/2014 | Raleigh |
| 8,897,744 B2 | 11/2014 | Raleigh |
| 8,898,079 B2 | 11/2014 | Raleigh |
| 8,898,232 B2 | 11/2014 | Magharei et al. |
| 8,898,617 B2 | 11/2014 | White et al. |
| 8,903,079 B2 | 12/2014 | Xie et al. |
| 8,903,452 B2 | 12/2014 | Raleigh |
| 8,913,590 B2 | 12/2014 | Fantini et al. |
| 8,922,829 B2 | 12/2014 | Fu et al. |
| 8,924,269 B2 | 12/2014 | Seubert et al. |
| 8,924,527 B2 | 12/2014 | Ramankutty et al. |
| 8,924,549 B2 | 12/2014 | Raleigh |
| 8,929,537 B2 | 1/2015 | Chishti et al. |
| 8,929,877 B2 | 1/2015 | Rhoads et al. |
| 8,954,262 B2 | 2/2015 | Sawhill et al. |
| 8,958,988 B2 | 2/2015 | Gueziec |
| 8,959,480 B2 | 2/2015 | Trefler et al. |
| 8,965,587 B2 | 2/2015 | Modi et al. |
| 8,965,672 B2 | 2/2015 | Sawhill et al. |
| 8,977,619 B2 | 3/2015 | Mann et al. |
| 8,983,874 B2 | 3/2015 | Micali et al. |
| 8,990,740 B2 | 3/2015 | Zhang et al. |
| 9,003,346 B1 | 4/2015 | Dutta et al. |
| 9,008,960 B2 | 4/2015 | Horvitz |
| 9,009,056 B2 | 4/2015 | Markefka et al. |
| 9,009,318 B2 | 4/2015 | Rangarajan et al. |
| 9,014,026 B2 | 4/2015 | Raleigh |
| 9,020,137 B2 | 4/2015 | Chishti et al. |
| 9,025,757 B2 | 5/2015 | Spottiswoode et al. |
| 9,037,127 B2 | 5/2015 | Raleigh |
| 9,046,379 B2 | 6/2015 | Mineta |
| 9,070,291 B2 | 6/2015 | Gueziec |
| 9,071,547 B2 | 6/2015 | McCord et al. |
| 9,082,303 B2 | 7/2015 | Gueziec |
| 9,094,416 B2 | 7/2015 | Magharei et al. |
| 9,112,534 B2 | 8/2015 | Fonseka et al. |
| 9,116,007 B2 | 8/2015 | Griffiths |
| 9,118,350 B2 | 8/2015 | Fonseka et al. |
| 9,121,710 B2 | 9/2015 | Gusikhin et al. |
| 9,122,567 B2 | 9/2015 | MacNeille et al. |
| 9,131,053 B1 | 9/2015 | Tan et al. |
| 9,131,433 B2 | 9/2015 | Steer et al. |
| 9,137,739 B2 | 9/2015 | Raleigh |
| 9,143,392 B2 | 9/2015 | Duchesneau |
| 9,148,216 B2 | 9/2015 | Spreizer |
| 9,157,751 B2 | 10/2015 | Pfeifle |
| 9,160,405 B1 | 10/2015 | Vareljian et al. |
| 9,171,008 B2 | 10/2015 | Prahlad et al. |
| 9,171,151 B2 | 10/2015 | Behrendt et al. |
| 9,173,104 B2 | 10/2015 | Raleigh |
| 9,177,248 B2 | 11/2015 | Sweeney et al. |
| 9,179,308 B2 | 11/2015 | Raleigh |
| 9,179,315 B2 | 11/2015 | Raleigh |
| 9,179,316 B2 | 11/2015 | Raleigh |
| 9,184,820 B2 | 11/2015 | Raleigh et al. |
| 9,185,232 B2 | 11/2015 | Yegoshin |
| 9,198,117 B2 | 11/2015 | Raleigh |
| 9,202,184 B2 | 12/2015 | Friedlander et al. |
| 9,204,374 B2 | 12/2015 | Raleigh |
| 9,212,848 B2 | 12/2015 | Kendall et al. |
| 9,215,322 B1 | 12/2015 | Wu et al. |
| 9,215,323 B1 | 12/2015 | Chishti |
| 9,215,644 B2 | 12/2015 | Kohli |
| 9,215,980 B2 | 12/2015 | Tran et al. |
| 9,232,403 B2 | 1/2016 | Raleigh |
| 9,240,808 B2 | 1/2016 | Fonseka et al. |
| 9,253,663 B2 | 2/2016 | Raleigh et al. |
| 9,262,734 B2 | 2/2016 | Augenstein et al. |
| 9,271,133 B2 | 2/2016 | Rodriguez |

(56) References Cited

U.S. PATENT DOCUMENTS

| | | |
|---|---|---|
| 9,277,055 B2 | 3/2016 | Spottiswoode et al. |
| 9,277,480 B2 | 3/2016 | Kohli |
| 9,288,176 B2 | 3/2016 | Day |
| 9,288,325 B2 | 3/2016 | Chishti et al. |
| 9,288,326 B2 | 3/2016 | Chishti et al. |
| 9,292,493 B2 | 3/2016 | Chandramouli et al. |
| 9,294,624 B2 | 3/2016 | Williams et al. |
| 9,300,802 B1 | 3/2016 | Chishti |
| 9,304,801 B2 | 4/2016 | Koorevaar et al. |
| 9,307,080 B1 | 4/2016 | Fernandez et al. |
| 9,311,670 B2 | 4/2016 | Hoffberg |
| 9,325,282 B2 | 4/2016 | Bowers et al. |
| 9,336,677 B2 | 5/2016 | Rakib |
| 9,338,299 B2 | 5/2016 | McCord et al. |
| 9,351,193 B2 | 5/2016 | Raleigh et al. |
| 9,361,424 B2 | 6/2016 | Robles |
| 9,361,793 B2 | 6/2016 | Curtis et al. |
| 9,368,029 B2 | 6/2016 | Gueziec |
| 9,371,099 B2 | 6/2016 | Lagassey |
| 9,373,960 B2 | 6/2016 | Pande et al. |
| 9,378,065 B2 | 6/2016 | Shear et al. |
| 9,386,165 B2 | 7/2016 | Raleigh et al. |
| 9,396,421 B2 | 7/2016 | Rujan |
| 9,401,088 B2 | 7/2016 | Gueziec |
| 9,401,992 B2 | 7/2016 | Srinivas et al. |
| 9,406,010 B2 | 8/2016 | Rujan |
| 9,413,894 B2 | 8/2016 | Chishti et al. |
| 9,419,981 B2 | 8/2016 | Stolfo et al. |
| 9,426,296 B2 | 8/2016 | Chishti et al. |
| 9,454,537 B2 | 9/2016 | Prahlad et al. |
| 9,456,086 B1 | 9/2016 | Wu et al. |
| 9,460,557 B1 | 10/2016 | Tran et al. |
| 9,460,629 B2 | 10/2016 | Chircop et al. |
| 9,462,127 B2 | 10/2016 | Kan et al. |
| 9,468,040 B2 | 10/2016 | Bouzid et al. |
| 9,473,221 B2 | 10/2016 | Kohli |
| 9,489,701 B2 | 11/2016 | Emadi et al. |
| 9,489,842 B2 | 11/2016 | Gueziec |
| 9,491,564 B1 | 11/2016 | Raleigh |
| 9,503,388 B2 | 11/2016 | Ramankutty et al. |
| 9,531,599 B2 | 12/2016 | Prasad et al. |
| 9,532,161 B2 | 12/2016 | Raleigh |
| 9,537,545 B2 | 1/2017 | Kohli |
| 9,557,889 B2 | 1/2017 | Raleigh et al. |
| 9,561,860 B2 | 2/2017 | Knapp et al. |
| 9,565,512 B2 | 2/2017 | Rhoads et al. |
| 9,565,543 B2 | 2/2017 | Raleigh |
| 9,578,182 B2 | 2/2017 | Raleigh et al. |
| 9,581,452 B2 | 2/2017 | Pfeifle |
| 9,602,977 B2 | 3/2017 | Gueziec |
| 9,607,023 B1 | 3/2017 | Swamy |
| 9,609,459 B2 | 3/2017 | Raleigh |
| 9,615,192 B2 | 4/2017 | Raleigh |
| 9,615,264 B2 | 4/2017 | Hoffberg |
| 9,628,365 B2 | 4/2017 | Gelvin et al. |
| 9,628,879 B2 | 4/2017 | Bouda |
| 9,635,177 B1 | 4/2017 | Hoffberg |
| 9,635,181 B1 | 4/2017 | McGann et al. |
| 9,640,073 B2 | 5/2017 | Gueziec |
| 9,641,957 B2 | 5/2017 | Raleigh |
| 9,645,579 B2 | 5/2017 | Switkes et al. |
| 9,654,478 B2 | 5/2017 | Stolfo et al. |
| 9,654,633 B2 | 5/2017 | McCord et al. |
| 9,654,641 B1 | 5/2017 | Chishti et al. |
| 9,680,855 B2 | 6/2017 | Schultz et al. |
| 9,680,997 B2 | 6/2017 | Chishti et al. |
| 9,686,411 B2 | 6/2017 | Spottiswoode et al. |
| 9,690,264 B2 | 6/2017 | Hellstrom et al. |
| 9,692,490 B2 | 6/2017 | Kohli |
| 9,692,898 B1 | 6/2017 | Chishti |
| 9,692,899 B1 | 6/2017 | Rizvi |
| 9,699,314 B2 | 7/2017 | Spottiswoode et al. |
| 9,702,349 B2 | 7/2017 | Anderson et al. |
| 9,712,676 B1 | 7/2017 | Chishti |
| 9,712,679 B2 | 7/2017 | Chishti et al. |
| 9,716,792 B2 | 7/2017 | McGann et al. |
| 9,721,384 B1 | 8/2017 | Tran et al. |
| 9,723,151 B2 | 8/2017 | McGann et al. |
| 9,723,343 B2 | 8/2017 | Applegate et al. |
| 9,736,308 B1 | 8/2017 | Wu et al. |
| 9,741,183 B2 | 8/2017 | Matos et al. |
| 9,762,531 B2 | 9/2017 | Day |
| 9,772,906 B2 | 9/2017 | Lee et al. |
| 9,774,740 B2 | 9/2017 | Chishti |
| 9,779,029 B2 | 10/2017 | Frachtenberg et al. |
| 9,780,907 B2 | 10/2017 | Bouda |
| 9,781,269 B2 | 10/2017 | Chishti et al. |
| 9,787,372 B2 | 10/2017 | Kohli |
| 9,787,841 B2 | 10/2017 | Chishti et al. |
| 9,788,282 B2 | 10/2017 | Neves et al. |
| 9,792,160 B2 | 10/2017 | Shear et al. |
| 9,794,797 B2 | 10/2017 | Hoffberg |
| 9,801,542 B2 | 10/2017 | Tran et al. |
| 9,807,239 B1 | 10/2017 | Wu et al. |
| 9,818,136 B1 | 11/2017 | Hoffberg |
| 9,830,827 B2 | 11/2017 | Sawhill et al. |
| 9,836,883 B2 | 12/2017 | Tran et al. |
| 9,857,187 B2 | 1/2018 | Profous et al. |
| 9,860,380 B2 | 1/2018 | Shaffer et al. |
| 9,860,391 B1 | 1/2018 | Wu et al. |
| 9,866,698 B2 | 1/2018 | Fernandez et al. |
| 9,870,629 B2 | 1/2018 | Cardno et al. |
| 9,871,924 B1 | 1/2018 | Chishti |
| 9,886,845 B2 | 2/2018 | Rhoads et al. |
| 9,888,120 B1 | 2/2018 | Chishti |
| 9,888,121 B1 | 2/2018 | Chishti |
| 9,904,579 B2 | 2/2018 | Shear et al. |
| 9,906,647 B2 | 2/2018 | Tendick et al. |
| 9,917,949 B1 | 3/2018 | Chishti |
| 9,918,183 B2 | 3/2018 | Rhoads et al. |
| 9,924,041 B2 | 3/2018 | Kan et al. |
| 9,930,180 B1 | 3/2018 | Kan et al. |
| 9,939,193 B2 | 4/2018 | Kendall et al. |
| 9,942,395 B2 | 4/2018 | Lee |
| 9,942,405 B1 | 4/2018 | Kan et al. |
| 9,946,231 B2 | 4/2018 | Sargolzaei et al. |
| 9,948,361 B2 | 4/2018 | Kohli |
| 9,955,013 B1 | 4/2018 | Chishti |
| 9,955,332 B2 | 4/2018 | Raleigh et al. |
| 9,955,436 B2 | 4/2018 | Neves et al. |
| 9,958,288 B2 | 5/2018 | Horvitz et al. |
| 9,977,856 B2 | 5/2018 | Robles |
| 9,996,810 B2 | 6/2018 | Augenstein et al. |
| 9,996,981 B1 | 6/2018 | Tran et al. |
| RE46,986 E | 8/2018 | Chishti et al. |
| 2001/0000458 A1 | 4/2001 | Shtivelman et al. |
| 2001/0011228 A1 | 8/2001 | Shenkman |
| 2001/0020834 A1 | 9/2001 | Berkowitz et al. |
| 2001/0024497 A1 | 9/2001 | Campbell et al. |
| 2001/0034578 A1 | 10/2001 | Ugajin |
| 2001/0037409 A1 | 11/2001 | Ricciulli |
| 2001/0044788 A1 | 11/2001 | Demir et al. |
| 2002/0006191 A1 | 1/2002 | Weiss |
| 2002/0009190 A1 | 1/2002 | McIllwaine et al. |
| 2002/0018449 A1 | 2/2002 | Ricciulli |
| 2002/0019846 A1 | 2/2002 | Miloslavsky et al. |
| 2002/0021693 A1 | 2/2002 | Bruno et al. |
| 2002/0032018 A1 | 3/2002 | Morton et al. |
| 2002/0036617 A1 | 3/2002 | Pryor |
| 2002/0038233 A1 | 3/2002 | Shubov et al. |
| 2002/0038294 A1 | 3/2002 | Matsugu |
| 2002/0039900 A1 | 4/2002 | Wiedeman et al. |
| 2002/0045453 A1 | 4/2002 | Juttner et al. |
| 2002/0069218 A1 | 6/2002 | Sull et al. |
| 2002/0087696 A1 | 7/2002 | Byrnes |
| 2002/0093942 A1 | 7/2002 | Yegoshin |
| 2002/0112435 A1 | 8/2002 | Hartman |
| 2002/0114278 A1 | 8/2002 | Coussement |
| 2002/0116239 A1 | 8/2002 | Reinsma et al. |
| 2002/0131399 A1 | 9/2002 | Philonenko |
| 2002/0133392 A1 | 9/2002 | Angel et al. |
| 2002/0187770 A1 | 12/2002 | Grover et al. |
| 2003/0002646 A1 | 1/2003 | Gutta et al. |
| 2003/0009582 A1 | 1/2003 | Qiao et al. |

(56) References Cited

U.S. PATENT DOCUMENTS

| | | |
|---|---|---|
| 2003/0014326 A1 | 1/2003 | Ben-Meir et al. |
| 2003/0033237 A1 | 2/2003 | Bawri |
| 2003/0055729 A1 | 3/2003 | Bezos et al. |
| 2003/0055743 A1 | 3/2003 | Murcko |
| 2003/0072382 A1 | 4/2003 | Raleigh et al. |
| 2003/0099343 A1* | 5/2003 | Dezonno ............ H04M 3/5191 379/265.11 |
| 2003/0112784 A1 | 6/2003 | Lohtia et al. |
| 2003/0151513 A1 | 8/2003 | Herrmann et al. |
| 2003/0174651 A1 | 9/2003 | Morton |
| 2003/0195832 A1 | 10/2003 | Cao et al. |
| 2004/0019650 A1 | 1/2004 | Auvenshine |
| 2004/0022194 A1 | 2/2004 | Ricciulli |
| 2004/0046736 A1 | 3/2004 | Pryor et al. |
| 2004/0049479 A1 | 3/2004 | Dorne et al. |
| 2004/0059646 A1 | 3/2004 | Harrington et al. |
| 2004/0081183 A1 | 4/2004 | Monza et al. |
| 2004/0083195 A1 | 4/2004 | McCord et al. |
| 2004/0138958 A1 | 7/2004 | Watarai et al. |
| 2004/0141508 A1 | 7/2004 | Schoeneberger et al. |
| 2004/0156345 A1 | 8/2004 | Steer et al. |
| 2004/0190085 A1 | 9/2004 | Silverbrook et al. |
| 2004/0190092 A1 | 9/2004 | Silverbrook et al. |
| 2004/0195310 A1 | 10/2004 | Silverbrook et al. |
| 2004/0195317 A1 | 10/2004 | Silverbrook et al. |
| 2004/0195318 A1 | 10/2004 | Silverbrook et al. |
| 2004/0195321 A1 | 10/2004 | Silverbrook et al. |
| 2004/0195329 A1 | 10/2004 | Silverbrook et al. |
| 2004/0195330 A1 | 10/2004 | Silverbrook et al. |
| 2004/0195333 A1 | 10/2004 | Silverbrook et al. |
| 2004/0195334 A1 | 10/2004 | Silverbrook et al. |
| 2004/0195336 A1 | 10/2004 | Silverbrook et al. |
| 2004/0195337 A1 | 10/2004 | Silverbrook et al. |
| 2004/0195341 A1 | 10/2004 | Lapstun et al. |
| 2004/0195342 A1 | 10/2004 | Silverbrook et al. |
| 2004/0196501 A1 | 10/2004 | Silverbrook et al. |
| 2004/0199280 A1 | 10/2004 | Silverbrook et al. |
| 2004/0199428 A1 | 10/2004 | Silverbrook et al. |
| 2004/0203815 A1 | 10/2004 | Shoemake et al. |
| 2004/0206824 A1 | 10/2004 | Lapstun et al. |
| 2004/0206827 A1 | 10/2004 | Silverbrook et al. |
| 2004/0210319 A1 | 10/2004 | Lapstun et al. |
| 2004/0212848 A1 | 10/2004 | Lapstun et al. |
| 2004/0213400 A1 | 10/2004 | Golitsin et al. |
| 2004/0232243 A1 | 11/2004 | Silverbrook et al. |
| 2004/0238627 A1 | 12/2004 | Silverbrook et al. |
| 2004/0245332 A1 | 12/2004 | Silverbrook et al. |
| 2004/0252025 A1 | 12/2004 | Silverbrook et al. |
| 2004/0264677 A1 | 12/2004 | Horvitz et al. |
| 2005/0002448 A1 | 1/2005 | Knight et al. |
| 2005/0010571 A1 | 1/2005 | Solotorevsky et al. |
| 2005/0034159 A1 | 2/2005 | Ophir et al. |
| 2005/0041591 A1 | 2/2005 | Duggi et al. |
| 2005/0063004 A1 | 3/2005 | Silverbrook et al. |
| 2005/0065837 A1 | 3/2005 | Kosiba et al. |
| 2005/0071241 A1* | 3/2005 | Flockhart ............ G06Q 30/0601 705/26.1 |
| 2005/0080817 A1 | 4/2005 | Janow |
| 2005/0102221 A1 | 5/2005 | Sulkowski et al. |
| 2005/0116667 A1 | 6/2005 | Mueller et al. |
| 2005/0129217 A1 | 6/2005 | McPartlan et al. |
| 2005/0130701 A1 | 6/2005 | Zendle |
| 2005/0135231 A1 | 6/2005 | Bellovin |
| 2005/0136832 A1 | 6/2005 | Spreizer |
| 2005/0157810 A1 | 7/2005 | Raleigh et al. |
| 2005/0159824 A1 | 7/2005 | Childress |
| 2005/0172016 A1 | 8/2005 | Kossi et al. |
| 2005/0174975 A1 | 8/2005 | Mgrdechian et al. |
| 2005/0195915 A1 | 9/2005 | Raleigh et al. |
| 2005/0195960 A1 | 9/2005 | Shaffer et al. |
| 2005/0225365 A1 | 10/2005 | Wood |
| 2005/0240427 A1 | 10/2005 | Crichlow |
| 2005/0251434 A1 | 11/2005 | Ouimet |
| 2005/0251771 A1 | 11/2005 | Robles |
| 2005/0254106 A9 | 11/2005 | Silverbrook et al. |
| 2005/0281270 A1 | 12/2005 | Kossi et al. |
| 2005/0289612 A1 | 12/2005 | Morton et al. |
| 2006/0033713 A1 | 2/2006 | Pryor |
| 2006/0039362 A1 | 2/2006 | Yegoshin |
| 2006/0039696 A1 | 2/2006 | Saniee et al. |
| 2006/0051022 A1 | 3/2006 | Levner et al. |
| 2006/0051090 A1 | 3/2006 | Saniee et al. |
| 2006/0062376 A1 | 3/2006 | Pickford |
| 2006/0067234 A1 | 3/2006 | Bossi et al. |
| 2006/0095877 A1 | 5/2006 | Su et al. |
| 2006/0136310 A1 | 6/2006 | Gonen et al. |
| 2006/0143587 A1 | 6/2006 | Boutin et al. |
| 2006/0153356 A1 | 7/2006 | Sisselman et al. |
| 2006/0158330 A1 | 7/2006 | Gueziec |
| 2006/0167784 A1 | 7/2006 | Hoffberg |
| 2006/0202953 A1 | 9/2006 | Pryor et al. |
| 2006/0206854 A1 | 9/2006 | Barnes et al. |
| 2006/0214000 A1 | 9/2006 | Lapstun et al. |
| 2006/0215825 A1 | 9/2006 | Boutin et al. |
| 2006/0229742 A1 | 10/2006 | Boutin et al. |
| 2006/0237546 A1 | 10/2006 | Lapstun et al. |
| 2006/0241990 A1 | 10/2006 | Sun et al. |
| 2006/0242017 A1 | 10/2006 | Libes et al. |
| 2006/0249577 A1 | 11/2006 | Silverbrook et al. |
| 2006/0262922 A1* | 11/2006 | Margulies ............ G06Q 30/02 379/265.12 |
| 2006/0265234 A1 | 11/2006 | Peterkofsky et al. |
| 2006/0266828 A1 | 11/2006 | Silverbrook et al. |
| 2006/0293951 A1 | 12/2006 | Patel et al. |
| 2007/0005808 A1 | 1/2007 | Day |
| 2007/0013551 A1 | 1/2007 | Gueziec |
| 2007/0019754 A1 | 1/2007 | Raleigh et al. |
| 2007/0021998 A1 | 1/2007 | Laithwaite et al. |
| 2007/0025351 A1 | 2/2007 | Cohen |
| 2007/0033170 A1 | 2/2007 | Sull et al. |
| 2007/0033292 A1 | 2/2007 | Sull et al. |
| 2007/0033515 A1 | 2/2007 | Sull et al. |
| 2007/0033521 A1 | 2/2007 | Sull et al. |
| 2007/0033533 A1 | 2/2007 | Sull |
| 2007/0038362 A1 | 2/2007 | Gueziec |
| 2007/0038612 A1 | 2/2007 | Sull et al. |
| 2007/0044010 A1 | 2/2007 | Sull et al. |
| 2007/0064912 A1 | 3/2007 | Kagan et al. |
| 2007/0071222 A1 | 3/2007 | Flockhart et al. |
| 2007/0073486 A1 | 3/2007 | Tillotson et al. |
| 2007/0087756 A1 | 4/2007 | Hoffberg |
| 2007/0115800 A1 | 5/2007 | Fonseka et al. |
| 2007/0140374 A1 | 6/2007 | Raleigh et al. |
| 2007/0150387 A1 | 6/2007 | Seubert et al. |
| 2007/0150846 A1 | 6/2007 | Furnish et al. |
| 2007/0174180 A1 | 7/2007 | Shin |
| 2007/0196047 A9 | 8/2007 | Levner et al. |
| 2007/0204252 A1 | 8/2007 | Furnish et al. |
| 2007/0235532 A1 | 10/2007 | Lapstun et al. |
| 2007/0260723 A1 | 11/2007 | Cohen et al. |
| 2007/0264008 A1 | 11/2007 | Zaacks et al. |
| 2007/0272735 A1 | 11/2007 | Silverbrook et al. |
| 2007/0272748 A1 | 11/2007 | Silverbrook et al. |
| 2008/0040254 A1 | 2/2008 | Waelbroeck et al. |
| 2008/0043634 A1 | 2/2008 | Wang et al. |
| 2008/0065576 A1 | 3/2008 | Friedlander et al. |
| 2008/0071946 A1 | 3/2008 | Lapstun et al. |
| 2008/0077463 A1 | 3/2008 | Friedlander et al. |
| 2008/0093459 A1 | 4/2008 | Lapstun et al. |
| 2008/0109153 A1 | 5/2008 | Gueziec |
| 2008/0112053 A1 | 5/2008 | Levner et al. |
| 2008/0120129 A1 | 5/2008 | Seubert et al. |
| 2008/0122786 A1 | 5/2008 | Pryor et al. |
| 2008/0140597 A1 | 6/2008 | Satir et al. |
| 2008/0147655 A1 | 6/2008 | Sinha et al. |
| 2008/0148196 A1 | 6/2008 | Su et al. |
| 2008/0149710 A1 | 6/2008 | Silverbrook et al. |
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0189306 A1 | 8/2008 | Hewett et al. |
| 2008/0204429 A1 | 8/2008 | Silverbrook et al. |
| 2008/0205501 A1 | 8/2008 | Cioffi et al. |
| 2008/0216025 A1 | 9/2008 | Furnish et al. |

(56) References Cited

U.S. PATENT DOCUMENTS

| | | |
|---|---|---|
| 2008/0216028 A1 | 9/2008 | Su et al. |
| 2008/0216038 A1 | 9/2008 | Bose |
| 2008/0216039 A1 | 9/2008 | Furnish et al. |
| 2008/0216040 A1 | 9/2008 | Furnish et al. |
| 2008/0219268 A1 | 9/2008 | Dennison |
| 2008/0251585 A1 | 10/2008 | Silverbrook et al. |
| 2008/0262893 A1 | 10/2008 | Hoffberg |
| 2008/0265026 A1 | 10/2008 | Silverbrook et al. |
| 2008/0265027 A1 | 10/2008 | Silverbrook et al. |
| 2008/0265028 A1 | 10/2008 | Silverbrook et al. |
| 2008/0270259 A1 | 10/2008 | Silverbrook et al. |
| 2008/0272193 A1 | 11/2008 | Silverbrook et al. |
| 2008/0315978 A1 | 12/2008 | Knight et al. |
| 2009/0010189 A1 | 1/2009 | Nagra et al. |
| 2009/0014526 A1 | 1/2009 | Rusman et al. |
| 2009/0031271 A1 | 1/2009 | White et al. |
| 2009/0032599 A1 | 2/2009 | Rusman et al. |
| 2009/0034972 A1 | 2/2009 | Fiaschi et al. |
| 2009/0083211 A1 | 3/2009 | Sinha et al. |
| 2009/0084850 A1 | 4/2009 | Silverbrook et al. |
| 2009/0084857 A1 | 4/2009 | Silverbrook et al. |
| 2009/0125448 A1 | 5/2009 | Borkovec et al. |
| 2009/0129771 A1 | 5/2009 | Saniee et al. |
| 2009/0145966 A1 | 6/2009 | Silverbrook et al. |
| 2009/0180736 A1 | 7/2009 | Levner et al. |
| 2009/0216910 A1 | 8/2009 | Duchesneau |
| 2009/0231996 A1 | 9/2009 | Lauther |
| 2009/0234917 A1 | 9/2009 | Despotovic et al. |
| 2009/0252134 A1 | 10/2009 | Schlicht et al. |
| 2009/0254874 A1 | 10/2009 | Bose |
| 2009/0261171 A1 | 10/2009 | Lapstun et al. |
| 2009/0265206 A1 | 10/2009 | Friedlander et al. |
| 2009/0281864 A1 | 11/2009 | Abercrombie et al. |
| 2009/0299853 A1 | 12/2009 | Jones et al. |
| 2009/0306866 A1 | 12/2009 | Malikopoulos |
| 2009/0307641 A1 | 12/2009 | Su et al. |
| 2009/0307644 A1 | 12/2009 | Su et al. |
| 2009/0309758 A1 | 12/2009 | Gueziec |
| 2009/0314834 A1 | 12/2009 | Lapstun et al. |
| 2009/0316627 A1 | 12/2009 | Fonseka et al. |
| 2009/0322561 A1 | 12/2009 | Morioka et al. |
| 2009/0327148 A1 | 12/2009 | Kamar et al. |
| 2010/0014784 A1 | 1/2010 | Silverbrook et al. |
| 2010/0042726 A1 | 2/2010 | Luzon et al. |
| 2010/0046040 A1 | 2/2010 | Rusman et al. |
| 2010/0072275 A1 | 3/2010 | Lapstun et al. |
| 2010/0091906 A1 | 4/2010 | Raleigh et al. |
| 2010/0096450 A1 | 4/2010 | Silverbrook et al. |
| 2010/0140352 A1 | 6/2010 | Silverbrook et al. |
| 2010/0142421 A1 | 6/2010 | Schlicht et al. |
| 2010/0142445 A1 | 6/2010 | Schlicht et al. |
| 2010/0142446 A1 | 6/2010 | Schlicht et al. |
| 2010/0142447 A1 | 6/2010 | Schlicht et al. |
| 2010/0142448 A1 | 6/2010 | Schlicht et al. |
| 2010/0148940 A1 | 6/2010 | Gelvin et al. |
| 2010/0150120 A1 | 6/2010 | Schlicht et al. |
| 2010/0165982 A1 | 7/2010 | Yegoshin |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2010/0201516 A1 | 8/2010 | Gelvin et al. |
| 2010/0219244 A1 | 9/2010 | Silverbrook et al. |
| 2010/0232445 A1 | 9/2010 | Bellovin |
| 2010/0235285 A1 | 9/2010 | Hoffberg |
| 2010/0238521 A1 | 9/2010 | Rusman et al. |
| 2010/0268447 A1 | 10/2010 | Griffiths |
| 2010/0281151 A1 | 11/2010 | Ramankutty et al. |
| 2010/0284388 A1 | 11/2010 | Fantini et al. |
| 2010/0291907 A1 | 11/2010 | MacNaughtan et al. |
| 2010/0317420 A1 | 12/2010 | Hoffberg |
| 2010/0332401 A1 | 12/2010 | Prahlad et al. |
| 2010/0332454 A1 | 12/2010 | Prahlad et al. |
| 2010/0332456 A1 | 12/2010 | Prahlad et al. |
| 2010/0332479 A1 | 12/2010 | Prahlad et al. |
| 2010/0332818 A1 | 12/2010 | Prahlad et al. |
| 2010/0333116 A1 | 12/2010 | Prahlad et al. |
| 2011/0004513 A1 | 1/2011 | Hoffberg |
| 2011/0019771 A1 | 1/2011 | Raleigh et al. |
| 2011/0022881 A1 | 1/2011 | Nakata |
| 2011/0035491 A1 | 2/2011 | Gelvin et al. |
| 2011/0059798 A1 | 3/2011 | Pryor |
| 2011/0078640 A1 | 3/2011 | Bruneel |
| 2011/0093492 A1 | 4/2011 | Sull et al. |
| 2011/0106617 A1 | 5/2011 | Cooper et al. |
| 2011/0132424 A1 | 6/2011 | Rakib |
| 2011/0143811 A1 | 6/2011 | Rodriguez |
| 2011/0169660 A1 | 7/2011 | Gueziec |
| 2011/0212717 A1 | 9/2011 | Rhoads et al. |
| 2011/0228678 A1 | 9/2011 | Ricciulli |
| 2011/0261049 A1 | 10/2011 | Cardno et al. |
| 2011/0310996 A1 | 12/2011 | Raleigh et al. |
| 2012/0033217 A1 | 2/2012 | Levner et al. |
| 2012/0039529 A1 | 2/2012 | Rujan |
| 2012/0040755 A1 | 2/2012 | Pryor |
| 2012/0088470 A1 | 4/2012 | Raleigh |
| 2012/0089721 A1 | 4/2012 | Day |
| 2012/0089845 A1 | 4/2012 | Raleigh |
| 2012/0101952 A1 | 4/2012 | Raleigh et al. |
| 2012/0106428 A1 | 5/2012 | Schlicht et al. |
| 2012/0108163 A1 | 5/2012 | Bai et al. |
| 2012/0123980 A1 | 5/2012 | Bhandari et al. |
| 2012/0134291 A1 | 5/2012 | Raleigh |
| 2012/0137336 A1 | 5/2012 | Applegate et al. |
| 2012/0151422 A1 | 6/2012 | White et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2012/0176900 A1 | 7/2012 | Steer et al. |
| 2012/0191332 A1 | 7/2012 | Sawhill et al. |
| 2012/0191333 A1 | 7/2012 | Sawhill et al. |
| 2012/0192249 A1 | 7/2012 | Raleigh |
| 2012/0195206 A1 | 8/2012 | Raleigh |
| 2012/0195222 A1 | 8/2012 | Raleigh |
| 2012/0195223 A1 | 8/2012 | Raleigh |
| 2012/0196565 A1 | 8/2012 | Raleigh |
| 2012/0197686 A1 | 8/2012 | Abu El Ata |
| 2012/0197792 A1 | 8/2012 | Raleigh |
| 2012/0201133 A1 | 8/2012 | Raleigh |
| 2012/0203677 A1 | 8/2012 | Raleigh |
| 2012/0208496 A1 | 8/2012 | Raleigh |
| 2012/0209750 A1 | 8/2012 | Raleigh |
| 2012/0210391 A1 | 8/2012 | Raleigh |
| 2012/0214441 A1 | 8/2012 | Raleigh |
| 2012/0232679 A1 | 9/2012 | Abercrombie et al. |
| 2012/0238272 A1 | 9/2012 | Hwang et al. |
| 2012/0242501 A1 | 9/2012 | Tran et al. |
| 2012/0254333 A1 | 10/2012 | Chandramouli et al. |
| 2012/0290202 A1 | 11/2012 | Gueziec |
| 2012/0290204 A1 | 11/2012 | Gueziec |
| 2012/0290464 A1 | 11/2012 | Borkovec et al. |
| 2012/0294195 A1 | 11/2012 | Raleigh |
| 2013/0003613 A1 | 1/2013 | Raleigh |
| 2013/0005299 A1 | 1/2013 | Raleigh |
| 2013/0005322 A1 | 1/2013 | Raleigh |
| 2013/0006729 A1 | 1/2013 | Raleigh |
| 2013/0006780 A1 | 1/2013 | Raleigh |
| 2013/0024424 A1 | 1/2013 | Prahlad et al. |
| 2013/0033385 A1 | 2/2013 | Gueziec |

(56) References Cited

U.S. PATENT DOCUMENTS

| | | |
|---|---|---|
| 2013/0040703 A1 | 2/2013 | Raleigh |
| 2013/0045710 A1 | 2/2013 | Raleigh |
| 2013/0046723 A1 | 2/2013 | Sweeney et al. |
| 2013/0058431 A1 | 3/2013 | Fonseka et al. |
| 2013/0060785 A1 | 3/2013 | Sweeney et al. |
| 2013/0066823 A1 | 3/2013 | Sweeney et al. |
| 2013/0069780 A1 | 3/2013 | Tran et al. |
| 2013/0072149 A1 | 3/2013 | Raleigh |
| 2013/0080307 A1 | 3/2013 | Hoffberg |
| 2013/0080607 A1 | 3/2013 | Raleigh |
| 2013/0083701 A1 | 4/2013 | Tomic et al. |
| 2013/0096998 A1 | 4/2013 | Raleigh |
| 2013/0097301 A1 | 4/2013 | Day |
| 2013/0125219 A1 | 5/2013 | Raleigh |
| 2013/0132578 A1 | 5/2013 | Raleigh |
| 2013/0132854 A1 | 5/2013 | Raleigh et al. |
| 2013/0133028 A1 | 5/2013 | Raleigh |
| 2013/0135008 A1 | 5/2013 | Zhang et al. |
| 2013/0138428 A1 | 5/2013 | Chandramouli et al. |
| 2013/0169527 A1 | 7/2013 | Pryor |
| 2013/0178718 A1 | 7/2013 | Tran et al. |
| 2013/0179034 A1 | 7/2013 | Pryor |
| 2013/0207817 A1 | 8/2013 | Gueziec |
| 2013/0208823 A1 | 8/2013 | Raleigh et al. |
| 2013/0215795 A1 | 8/2013 | Raleigh |
| 2013/0227659 A1 | 8/2013 | Raleigh |
| 2013/0229951 A1 | 9/2013 | Raleigh |
| 2013/0231084 A1 | 9/2013 | Raleigh |
| 2013/0235766 A1 | 9/2013 | Raleigh |
| 2013/0238572 A1 | 9/2013 | Prahlad et al. |
| 2013/0239194 A1 | 9/2013 | Raleigh |
| 2013/0249791 A1 | 9/2013 | Pryor |
| 2013/0250768 A1 | 9/2013 | Raleigh |
| 2013/0267318 A1 | 10/2013 | Pryor et al. |
| 2013/0305322 A1 | 11/2013 | Raleigh et al. |
| 2013/0306276 A1 | 11/2013 | Duchesneau |
| 2013/0329526 A1 | 12/2013 | Rakib |
| 2013/0332983 A1 | 12/2013 | Koorevaar et al. |
| 2014/0022460 A1 | 1/2014 | Li et al. |
| 2014/0024340 A1 | 1/2014 | Raleigh |
| 2014/0039963 A1 | 2/2014 | Augenstein et al. |
| 2014/0040282 A1 | 2/2014 | Mann et al. |
| 2014/0055284 A1 | 2/2014 | Tran et al. |
| 2014/0080428 A1 | 3/2014 | Rhoads et al. |
| 2014/0081793 A1 | 3/2014 | Hoffberg |
| 2014/0088871 A1 | 3/2014 | Gueziec |
| 2014/0091950 A1 | 4/2014 | Gueziec |
| 2014/0094159 A1 | 4/2014 | Raleigh et al. |
| 2014/0098671 A1 | 4/2014 | Raleigh et al. |
| 2014/0107923 A1 | 4/2014 | Gueziec |
| 2014/0113583 A1 | 4/2014 | Raleigh |
| 2014/0121476 A1 | 5/2014 | Tran et al. |
| 2014/0129040 A1 | 5/2014 | Emadi et al. |
| 2014/0129779 A1 | 5/2014 | Frachtenberg et al. |
| 2014/0136107 A1 | 5/2014 | Pfeifle |
| 2014/0163850 A1 | 6/2014 | Sawhill et al. |
| 2014/0173078 A1 | 6/2014 | McCord et al. |
| 2014/0188378 A1 | 7/2014 | Sawhill et al. |
| 2014/0195406 A1 | 7/2014 | Borkovec et al. |
| 2014/0198687 A1 | 7/2014 | Raleigh |
| 2014/0211786 A1 | 7/2014 | Yegoshin |
| 2014/0235230 A1 | 8/2014 | Raleigh |
| 2014/0241314 A1 | 8/2014 | Raleigh et al. |
| 2014/0248852 A1 | 9/2014 | Raleigh et al. |
| 2014/0258557 A1 | 9/2014 | Day |
| 2014/0265808 A1 | 9/2014 | Kendall et al. |
| 2014/0277599 A1 | 9/2014 | Pande et al. |
| 2014/0277872 A1 | 9/2014 | MacNeille et al. |
| 2014/0278089 A1 | 9/2014 | Gusikhin et al. |
| 2014/0278091 A1 | 9/2014 | Horvitz et al. |
| 2014/0280952 A1 | 9/2014 | Shear et al. |
| 2014/0282586 A1 | 9/2014 | Shear et al. |
| 2014/0286156 A1 | 9/2014 | Kohli |
| 2014/0286251 A1 | 9/2014 | Kohli |
| 2014/0288995 A1 | 9/2014 | Huff et al. |
| 2014/0310243 A1 | 10/2014 | McGee et al. |
| 2014/0317315 A1 | 10/2014 | Duchesneau |
| 2014/0320315 A1 | 10/2014 | Gueziec |
| 2014/0354350 A1 | 12/2014 | Bowers et al. |
| 2014/0359683 A1 | 12/2014 | Applegate et al. |
| 2014/0379588 A1 | 12/2014 | Gates et al. |
| 2015/0011194 A1 | 1/2015 | Rodriguez |
| 2015/0012210 A1 | 1/2015 | Griffiths |
| 2015/0012495 A1 | 1/2015 | Prahlad et al. |
| 2015/0039962 A1 | 2/2015 | Fonseka et al. |
| 2015/0039964 A1 | 2/2015 | Fonseka et al. |
| 2015/0039965 A1 | 2/2015 | Fonseka et al. |
| 2015/0046582 A1 | 2/2015 | Gelvin et al. |
| 2015/0067618 A1 | 3/2015 | Robles |
| 2015/0072641 A1 | 3/2015 | Raleigh et al. |
| 2015/0089399 A1 | 3/2015 | Megill et al. |
| 2015/0105631 A1 | 4/2015 | Tran et al. |
| 2015/0111591 A1 | 4/2015 | Hoffberg |
| 2015/0120706 A1 | 4/2015 | Hoffman et al. |
| 2015/0120941 A1 | 4/2015 | Ramankutty et al. |
| 2015/0142807 A1 | 5/2015 | Hofmann et al. |
| 2015/0146592 A1 | 5/2015 | Zendle |
| 2015/0149078 A1 | 5/2015 | Profous et al. |
| 2015/0154873 A1 | 6/2015 | Sawhill et al. |
| 2015/0163694 A1 | 6/2015 | Raleigh |
| 2015/0180509 A9 | 6/2015 | Fonseka et al. |
| 2015/0195414 A1 | 7/2015 | Raleigh |
| 2015/0195714 A1 | 7/2015 | Raleigh |
| 2015/0200882 A1 | 7/2015 | Raleigh |
| 2015/0201331 A1 | 7/2015 | Raleigh |
| 2015/0201333 A1 | 7/2015 | Raleigh |
| 2015/0215786 A1 | 7/2015 | Raleigh |
| 2015/0224845 A1 | 8/2015 | Anderson et al. |
| 2015/0254566 A1 | 9/2015 | Chandramouli et al. |
| 2015/0268055 A1 | 9/2015 | Gueziec |
| 2015/0268056 A1 | 9/2015 | Gueziec |
| 2015/0286915 A1 | 10/2015 | Rujan |
| 2015/0295772 A1 | 10/2015 | Bouda |
| 2015/0296279 A1 | 10/2015 | Bouda |
| 2015/0304498 A1 | 10/2015 | McCord et al. |
| 2015/0304797 A1 | 10/2015 | Rhoads et al. |
| 2015/0325123 A1 | 11/2015 | Gueziec |
| 2015/0331972 A1 | 11/2015 | McClure et al. |
| 2015/0377632 A1 | 12/2015 | Pfeifle |
| 2015/0381649 A1 | 12/2015 | Schultz et al. |
| 2016/0019795 A1 | 1/2016 | Chircop et al. |
| 2016/0028610 A1 | 1/2016 | Kohli |
| 2016/0034305 A1 | 2/2016 | Shear et al. |
| 2016/0036500 A1 | 2/2016 | Kohli |
| 2016/0037431 A1 | 2/2016 | Kohli |
| 2016/0054137 A1 | 2/2016 | Wheatman et al. |
| 2016/0054735 A1 | 2/2016 | Switkes et al. |
| 2016/0066788 A1 | 3/2016 | Tran et al. |
| 2016/0087846 A1 | 3/2016 | Prasad et al. |
| 2016/0112821 A1 | 4/2016 | Raleigh |
| 2016/0119001 A1 | 4/2016 | Fonseka et al. |
| 2016/0127977 A1 | 5/2016 | Kohli |
| 2016/0155073 A1 | 6/2016 | Augenstein et al. |
| 2016/0156587 A1 | 6/2016 | Day |
| 2016/0171412 A1 | 6/2016 | McHugh et al. |
| 2016/0224951 A1 | 8/2016 | Hoffberg |
| 2016/0226563 A1 | 8/2016 | Kohli |
| 2016/0226569 A1 | 8/2016 | Kohli |
| 2016/0231047 A1 | 8/2016 | Kendall et al. |
| 2016/0236790 A1 | 8/2016 | Knapp et al. |
| 2016/0239851 A1 | 8/2016 | Tanner, Jr. et al. |
| 2016/0248631 A1 | 8/2016 | Duchesneau |
| 2016/0255199 A1 | 9/2016 | McCord et al. |
| 2016/0266939 A1 | 9/2016 | Shear et al. |
| 2016/0302047 A1 | 10/2016 | Gueziec |
| 2016/0321529 A1 | 11/2016 | Rujan |
| 2016/0323279 A1 | 11/2016 | Raleigh |
| 2016/0330567 A1 | 11/2016 | Raleigh |
| 2016/0335893 A1 | 11/2016 | Gueziec |
| 2016/0359665 A1 | 12/2016 | Raleigh |
| 2016/0373588 A1 | 12/2016 | Raleigh et al. |
| 2016/0379168 A1 | 12/2016 | Foerster et al. |
| 2017/0004250 A1 | 1/2017 | Robles |
| 2017/0006135 A1 | 1/2017 | Siebel et al. |

(56) References Cited

U.S. PATENT DOCUMENTS

| | | |
|---|---|---|
| 2017/0015312 A1 | 1/2017 | Latotzki |
| 2017/0031613 A1 | 2/2017 | Lee et al. |
| 2017/0031784 A1 | 2/2017 | Lee et al. |
| 2017/0039218 A1 | 2/2017 | Prahlad et al. |
| 2017/0055132 A9 | 2/2017 | Gueziec |
| 2017/0060102 A1 | 3/2017 | Sargolzaei et al. |
| 2017/0078922 A1 | 3/2017 | Raleigh et al. |
| 2017/0089635 A9 | 3/2017 | Kendall et al. |
| 2017/0109841 A1 | 4/2017 | Sadikovic |
| 2017/0111223 A1 | 4/2017 | Matni et al. |
| 2017/0116566 A1 | 4/2017 | Walton |
| 2017/0132853 A1 | 5/2017 | Matos et al. |
| 2017/0156119 A1 | 6/2017 | Neves et al. |
| 2017/0171580 A1 | 6/2017 | Hirsch et al. |
| 2017/0171834 A1 | 6/2017 | Neves et al. |
| 2017/0182859 A1 | 6/2017 | Anderson et al. |
| 2017/0201850 A1 | 7/2017 | Raleigh et al. |
| 2017/0206512 A1 | 7/2017 | Hoffberg |
| 2017/0206529 A1 | 7/2017 | Raleigh |
| 2017/0215028 A1 | 7/2017 | Rhoads et al. |
| 2017/0215073 A1 | 7/2017 | Raleigh |
| 2017/0223516 A1 | 8/2017 | Raleigh |
| 2017/0236407 A1 | 8/2017 | Rhoads et al. |
| 2017/0270709 A1 | 9/2017 | Tran et al. |
| 2017/0272349 A1 | 9/2017 | Hopkins et al. |
| 2017/0279843 A1 | 9/2017 | Schultz et al. |
| 2017/0279971 A1 | 9/2017 | Raleigh et al. |
| 2017/0287212 A1 | 10/2017 | Tran et al. |
| 2017/0289323 A1 | 10/2017 | Gelvin et al. |
| 2017/0308097 A1 | 10/2017 | Switkes et al. |
| 2017/0309092 A1 | 10/2017 | Rosenbaum |
| 2017/0314944 A1 | 11/2017 | Konig et al. |
| 2017/0314945 A1 | 11/2017 | Konig et al. |
| 2017/0322578 A1 | 11/2017 | Baone et al. |
| 2017/0332240 A1 | 11/2017 | Raleigh |
| 2017/0337711 A1 | 11/2017 | Ratner et al. |
| 2017/0347026 A1 | 11/2017 | Hannuksela |
| 2017/0352202 A1 | 12/2017 | Matos et al. |
| 2017/0374013 A1 | 12/2017 | Day |
| 2018/0011180 A1 | 1/2018 | Warnick et al. |
| 2018/0011766 A1 | 1/2018 | Lee et al. |
| 2018/0027473 A1 | 1/2018 | Kalogridis et al. |
| 2018/0035391 A1 | 2/2018 | Neves et al. |
| 2018/0040250 A1 | 2/2018 | Sawhill et al. |
| 2018/0049043 A1 | 2/2018 | Hoffberg |
| 2018/0064402 A1 | 3/2018 | Leydon |
| 2018/0068358 A1 | 3/2018 | Hoffberg |
| 2018/0069786 A1 | 3/2018 | Lokman et al. |
| 2018/0101802 A1 | 4/2018 | Fox et al. |
| 2018/0134106 A9 | 5/2018 | Anderson et al. |
| 2018/0134400 A1 | 5/2018 | Knapp et al. |
| 2018/0141363 A1 | 5/2018 | Pandey |
| 2018/0145725 A1 | 5/2018 | Pandey |
| 2018/0150777 A1 | 5/2018 | Han et al. |
| 2018/0167309 A1 | 6/2018 | Teboulle et al. |
| 2018/0189990 A1 | 7/2018 | Cardno et al. |
| 2018/0191867 A1 | 7/2018 | Siebel et al. |
| 2018/0231487 A1 | 8/2018 | Miled et al. |
| 2018/0233028 A1 | 8/2018 | Rhoads et al. |
| 2018/0246766 A1 | 8/2018 | Holmberg et al. |
| 2018/0247191 A1 | 8/2018 | Katz et al. |
| 2018/0253906 A1 | 9/2018 | Tran et al. |
| 2018/0260512 A1 | 9/2018 | Robles |
| 2018/0260892 A1 | 9/2018 | Mueller et al. |
| 2018/0261020 A1 | 9/2018 | Petousis et al. |

\* cited by examiner

| Rule vector | | Agent 1 | Agent 2 | Agent 3 | Agent 4 | Agent 5 |
|---|---|---|---|---|---|---|
| 20% | Skill 1 | 20 | 5 | 3 | 5 | 4 |
| 5% | Skill 2 | 3 | 3 | 3 | 3 | 3 |
| 10% | Skill 3 | 10 | 6 | 9 | 10 | 10 |
| 15% | Skill 4 | 43 | 50 | 33 | 46 | 25 |
| 3% | Skill 5 | 7 | 2 | 9 | 2 | 8 |
| 7% | Skill 6 | 5 | 8 | 5 | 8 | 9 |
| 20% | Skill 7 | 2 | 3 | 4 | 2 | 2 |
| 8% | Skill 8 | 64 | 80 | 29 | 45 | 77 |
| 5% | Skill 9 | 4 | 5 | 4 | 1 | 2 |
| 7% | Skill 10 | 9 | 3 | 8 | 3 | 6 |
| 100% | Score | 18.51 | 17.33 | 11.1 | 13.93 | 13.65 |

Fig. 3

| Rule Vector | | Agent 1 | Agent 2 | Agent 3 | Agent 4 | Agent 5 |
|---|---|---|---|---|---|---|
| | Ac1 | 0.4 | 0.55 | 0.45 | 0.7 | 0.6 |
| | Ac2 | 6 | 3 | 6.8 | 2 | 5.5 |
| 20% | Skill 1 | 20 | 5 | 3 | 5 | 4 |
| 5% | Skill 2 | 3 | 3 | 3 | 3 | 3 |
| 10% | Skill 3 | 10 | 6 | 9 | 10 | 10 |
| 15% | Skill 4 | 43 | 50 | 33 | 46 | 25 |
| 3% | Skill 5 | 7 | 2 | 9 | 2 | 8 |
| 7% | Skill 6 | 5 | 8 | 5 | 8 | 9 |
| 20% | Skill 7 | 2 | 3 | 4 | 2 | 2 |
| 8% | Skill 8 | 64 | 80 | 29 | 45 | 77 |
| 5% | Skill 9 | 4 | 5 | 4 | 1 | 2 |
| 7% | Skill 10 | 9 | 3 | 8 | 3 | 6 |
| 100% | Prelim Score | 18.51 | 17.33 | 11.1 | 13.93 | 13.65 |
| | Final Score | 13.40 | 12.53 | 11.80 | 11.75 | 13.69 |

Fig. 4

| Rule Vector | | | | Agent 1 | Agent 2 | Agent 3 | Agent 4 | Agent 5 |
|---|---|---|---|---|---|---|---|---|
| | Min Skill | Max Skill | Exclude Agent | | | | | |
| | | | | Ac1 | 0.4 | 0.55 | 0.45 | 0.7 | 0.6 |
| | | | | Ac2 | 6 | 3 | 6.8 | 2 | 5.5 |
| 20% | 0% | 25% | | Skill 1 | 20 | 5 | 3 | 5 | 4 |
| 5% | | | | Skill 2 | 3 | 3 | 3 | 3 | 3 |
| 10% | | | | Skill 3 | 10 | 6 | 9 | 10 | 10 |
| 15% | 40% | 100% | 3, 5 | Skill 4 | 43 | 50 | 33 | 46 | 25 |
| 3% | | | | Skill 5 | 7 | 2 | 9 | 2 | 8 |
| 7% | | | | Skill 6 | 5 | 8 | 5 | 8 | 9 |
| 20% | | | | Skill 7 | 2 | 3 | 4 | 2 | 2 |
| 8% | 30% | 75% | 2, 3, 5 | Skill 8 | 64 | 80 | 29 | 45 | 77 |
| 5% | | | | Skill 9 | 4 | 5 | 4 | 1 | 2 |
| 7% | | | | Skill 10 | 9 | 3 | 8 | 3 | 6 |
| | | | | 2, 3, 5 excluded | | | | | |
| | | | | 1, 4 available | | | | | |
| 100% | | | | Prelim Score | 18.51 | 17.33 | 11.1 | 13.93 | 13.65 |
| | | | | Final Score | 13.40 | 12.53 | 11.80 | 11.75 | 13.69 |

Fig. 5

| SKILL | Rule Vector 1 | Rule Vector 2 | Rule Vector 3 | Rule Vector 4 | Rule Vector 5 | | Agent 1 | Agent 2 | Agent 3 | Agent 4 | Agent 5 |
|---|---|---|---|---|---|---|---|---|---|---|---|
| 1 | 20% | 25% | 17% | 20% | 14% | | 20 | 5 | 3 | 5 | 4 |
| 2 | 5% | 10% | 5% | 5% | 3% | | 3 | 3 | 3 | 3 | 3 |
| 3 | 10% | 15% | 20% | 10% | 8% | | 10 | 6 | 9 | 10 | 10 |
| 4 | 15% | 10% | 5% | 5% | 5% | | 43 | 50 | 33 | 46 | 25 |
| 5 | 3% | 0% | 5% | 8% | 1% | | 7 | 2 | 9 | 2 | 8 |
| 6 | 7% | 10% | 13% | 10% | 7% | | 5 | 8 | 5 | 8 | 9 |
| 7 | 20% | 10% | 5% | 10% | 20% | | 2 | 3 | 4 | 2 | 2 |
| 8 | 8% | 4% | 8% | 4% | 8% | | 64 | 80 | 29 | 45 | 77 |
| 9 | 5% | 8% | 13% | 18% | 23% | | 4 | 5 | 4 | 1 | 2 |
| 10 | 7% | 8% | 9% | 10% | 11% | | 9 | 3 | 8 | 3 | 6 |
| | 100% | 100% | 100% | 100% | 100% | Rule 1 | 18.51 | 17.33 | 11.1 | 13.93 | 13.65 |
| | | | | | | Rule 2 | 15.4 | 12.39 | 8.72 | 10.77 | 10.12 |
| | | | | | | Rule 3 | 15.25 | 13.31 | 8.97 | 10.54 | 12.71 |
| | | | | | | Rule 4 | 12.74 | 9.91 | 7.6 | 7.89 | 8.98 |
| | | | | | | Rule 5 | 13.69 | 12.83 | 8.24 | 9.03 | 11.09 |

Fig. 6

Combinatorial analysis of agents vs. callers

| 58.85 | 59.52 | 58.77 | 59.58 | 60.68 | 58.79 | 58.04 | 58.85 | 60.28 | 57.72 | 58.12 | 58.93 | 60.42 | 57.86 | 59.01 | 60.15 | 59.26 | 56.7 | 59.96 | 58.18 |
| --- | --- | --- | --- | --- | --- | --- | --- | --- | --- | --- | --- | --- | --- | --- | --- | --- | --- | --- | --- |
| 57.88 | 58.55 | 58.88 | 60.66 | 59.71 | 57.82 | 58.15 | 59.93 | 59.31 | 56.75 | 55.4 | 57.19 | 60.53 | 57.97 | 56.3 | 57.33 | 60.34 | 57.78 | 57.25 | 55.36 |
| 60.13 | 61.28 | 59.25 | 60.06 | 61.96 | 61.33 | 59.3 | 60.11 | 62.04 | 60.26 | 58.9 | 59.71 | 60.9 | 59.12 | 59.79 | 60.93 | 59.74 | 57.96 | 58.63 | 58.96 |
| 60.24 | 49.54 | 56.54 | 58.32 | 62.07 | 58.99 | 56.96 | 58.74 | 59.33 | 57.92 | 56.56 | 58.34 | 58.19 | 56.78 | 57.45 | 58.48 | 58 | 56.59 | 57.26 | 56.51 |
| 58.66 | 59.81 | 60.14 | 62.42 | 60.49 | 59.86 | 60.19 | 62.47 | 60.57 | 58.79 | 57.45 | 59.73 | 61.79 | 60.01 | 58.34 | 58.59 | 62.1 | 60.32 | 58.65 | 56.62 |
| 59.74 | 58.07 | 57.32 | 59.6 | 61.57 | 58.49 | 57.74 | 60.02 | 58.83 | 57.42 | 57.82 | 60.1 | 58.97 | 57.56 | 58.71 | 58.96 | 59.28 | 57.87 | 59.02 | 56.99 |

Fig. 7

| SKILL | Rule Vector 1 | Rule Vector 2 | Rule Vector 3 | Rule Vector 4 | Rule Vector 5 | | Agent | Agent | Agent | Agent | Agent |
|---|---|---|---|---|---|---|---|---|---|---|---|
| Caller time factor | 3 | 3.5 | 2.75 | 4 | 10 | Agent | 1 | 2 | 3 | 4 | 5 |
| | | | | | | Agent Cost | 0.59 | 0.68 | 1 | 0.86 | 0.79 |
| | | | | | | Agent time factor | 1.3 | 1.3 | 1 | 1.1 | 1.2 |
| 1 | 20% | 25% | 17% | 20% | 14% | | 20 | 5 | 3 | 5 | 4 |
| 2 | 5% | 10% | 5% | 5% | 3% | | 3 | 3 | 3 | 3 | 3 |
| 3 | 10% | 15% | 20% | 10% | 8% | | 10 | 6 | 9 | 10 | 10 |
| 4 | 15% | 10% | 5% | 5% | 5% | | 43 | 50 | 33 | 46 | 25 |
| 5 | 3% | 0% | 5% | 8% | 1% | | 7 | 2 | 9 | 2 | 8 |
| 6 | 7% | 10% | 13% | 10% | 7% | | 5 | 8 | 5 | 8 | 9 |
| 7 | 20% | 10% | 5% | 10% | 20% | | 2 | 3 | 4 | 2 | 2 |
| 8 | 8% | 4% | 8% | 4% | 8% | | 64 | 80 | 29 | 45 | 77 |
| 9 | 5% | 8% | 13% | 18% | 23% | | 4 | 5 | 4 | 1 | 2 |
| 10 | 7% | 8% | 9% | 10% | 11% | | 9 | 3 | 8 | 3 | 6 |
| | 100% | 100% | 100% | 100% | 100% | Rule 1 | 72.189 | 58.80069 | 19.647 | 31.71861 | 36.855 |
| | | | | | | Rule 2 | 70.07 | 49.045815 | 18.0068 | 28.610505 | 31.878 |
| | | | | | | Rule 3 | 54.51875 | 41.3974275 | 14.553825 | 21.999615 | 31.45725 |
| | | | | | | Rule 4 | 66.248 | 44.83284 | 17.936 | 23.95404 | 32.328 |
| | | | | | | Rule 5 | 177.97 | 145.1073 | 48.616 | 68.5377 | 99.81 |

Fig. 8

Combinatorial Analysis

| | | | | | | | | | | | | |
|---|---|---|---|---|---|---|---|---|---|---|---|---|
| 259.5527 | 255.3573 | 256.8383 | 289.6307 | 267.1886 | 254.8785 | 256.3595 | 289.1519 | 255.0903 | 246.9756 | 247.4191 | 280.2116 | 264.8651 | 256.7504 | 255.7129 | 291.0701 | 309.1051 | 300.9904 | 367.4349 | 302.5176 |
| 236.6543 | 232.4589 | 235.0236 | 290.7144 | 244.2902 | 231.9801 | 234.5448 | 290.2356 | 232.1919 | 224.0773 | 219.4443 | 275.1051 | 243.0504 | 234.9358 | 227.7081 | 284.8799 | 310.1888 | 302.074 | 339.4301 | 296.3275 |
| 260.9804 | 259.9429 | 259.9862 | 292.7886 | 268.6163 | 260.9322 | 260.9853 | 293.7777 | 259.6759 | 253.0292 | 248.887 | 281.6795 | 268.023 | 261.3763 | 257.1808 | 292.538 | 312.263 | 305.6163 | 301.4208 | 303.9855 |
| 239.1658 | 163.4004 | 231.9914 | 287.6822 | 246.8016 | 234.7961 | 234.8494 | 290.5402 | 231.5711 | 226.8933 | 222.7511 | 278.4419 | 240.0182 | 235.2403 | 231.0449 | 288.2167 | 307.1566 | 302.3787 | 298.1833 | 299.6643 |
| 224.1784 | 223.1409 | 225.7056 | 295.3001 | 231.8143 | 224.13 | 226.6947 | 296.2892 | 222.8739 | 216.2272 | 211.5642 | 281.1587 | 233.7324 | 227.0851 | 219.858 | 289.5057 | 314.7744 | 308.1277 | 300.9300 | 9533 |
| 225.2621 | 218.0345 | 289.1099 | 232.898 | 220.8925 | 222.3735 | 281.9679 | 217.7675 | 212.9896 | 213.4331 | 283.0276 | 227.5423 | 222.7644 | 221.7269 | 291.3746 | 308.5843 | 303.8064 | 302.7689 | 302.8222 |

Fig. 9

INTELLIGENT COMMUNICATION ROUTING SYSTEM AND METHOD

RELATED APPLICATIONS

The present application is a Continuation of U.S. patent application Ser. No. 14/968,114, filed Dec. 14, 2015, now U.S. Pat. No. 9,807,239, issued Oct. 31, 2017, which is a Continuation of U.S. patent application Ser. No. 13,661,293, filed Oct. 26, 2012, now U.S. Pat. No. 9,215,322, issued Dec. 15, 2015, which is a Continuation of U.S. patent application Ser. No. 11/695,691, filed Apr. 3, 2007, now U.S. Pat. No. 8,300,798, issued Oct. 30, 2012, which is a non-provisional of U.S. Provisional Patent Application 60/744, 190, filed Apr. 3, 2006, the entirety of which are expressly incorporated herein by reference.

FIELD OF THE INVENTION

The present invention relates generally to computer integrated telecommunications systems and more particularly to a system and method employing an intelligent switching architecture.

BACKGROUND ART

The description of the invention herein is intended to provide information for one skilled in the art to understand and practice the full scope of the invention, but is not intended to be limiting as to the scope of available knowledge, nor admit that any particular reference, nor the combinations and analysis of this information as presented herein, is itself a part of the prior art. It is, in fact, a part of the present invention to aggregate the below cited information as a part of the disclosure, without limiting the scope thereof. All of the below-identified references are therefore expressly incorporated herein by reference, as if the entirety thereof was recited completely herein. It is particularly noted that the present invention is not limited by a narrow or precise discussion herein, nor is it intended that any disclaimer, limitation, or mandatory language as applied to any embodiment or embodiments be considered to limit the scope of the invention as a whole. The scope of the invention is therefore to be construed as the entire literal scope of the claims, as well as any equivalents thereof as provided by law. It is also understood that the title, abstract, field of the invention, and dependent claims are not intended to, and do not, limit the scope of the independent claims.

Real-time communications are typically handled by dedicated systems which assure that the management and control operations are handled in a manner to keep up with the communications process, and to avoid imposing inordinate delays. In order to provide cost-effective performance, complex processes incidental to the management or control of the communication are typically externalized. Thus, the communications process is generally unburdened from tasks requiring a high degree of intelligence, for example the evaluation of complex algorithms and real time optimizations. One possible exception is least cost routing (LCR), which seeks to employ a communications channel which is anticipated to have a lowest cost per unit. In fact, LCR schemes, when implemented in conjunction with a communications switch, either employ simple predetermined rules, or externalize the analysis.

Modern computer telephone integrated systems typically employ a general purpose computer with dedicated voice-communication hardware peripherals, for example boards made by Dialogic, Inc. (Intel Corp.). The voice communication peripherals execute the low level processing and switching of the voice channels, under control from the general purpose processor. Therefore, the voice-information is generally not communicated on the computer bus. This architecture typically allows the computing platform to run a modern, non-deterministic operating system, such as Windows 2000, without impairing the real-time performance of the system as a whole, since the communications control functions are not as time critical as the voice processing functions. However, as is well known, non-deterministic operating systems, such as Windows 2000, are subject to significant latencies, especially when multiple tasks are executing, and when contention exists between resources, especially hard disk access and virtual memory. Therefore, in order to assure that system operation is unimpeded by inconsistent demands on the platform, typically the host computer system for the telephony peripherals is 'dedicated', and attempts are made to eliminate extraneous software tasks. On the other hand, externalizing essential functions imposes potential latencies due to communications and external processing.

The Call Center

A 'call center' is an organization of people, telecommunications equipment and management software, with a mission of efficiently handling electronic customer contact. A typical call center must balance competing goals. Customers should experience high quality and consistent service as measured, for example, by how long the customer's call must wait in queue before being answered and receiving satisfactory service. At the same time, this service should be provided to make efficient use of call center resources.

Strategies for Call Center Management

'Workforce management' systems provide important tools for meeting the goals of the call center. These systems generate forecasts of call volumes and call handling times based on historical data, to predict how much staff will be needed at different times of the day and week. The systems then create schedules that match the staffing to anticipated needs. Typically, an Automatic Call Distribution (ACD) function is provided in conjunction with a computerized Private Branch Exchange (PBX). This ACD function enables a group of agents, termed ACD agents, to handle a high volume of inbound calls and simultaneously allows a queued caller to listen to recordings when waiting for an available ACD agent. The ACD function typically informs inbound callers of their status while they wait and the ACD function routes callers to an appropriate ACD agent on a first-come-first-served basis. Today, all full-featured PBXs provide the ACD function and there are even vendors who provide switches specifically designed to support the ACD function. The ACD function has been expanded to provide statistical reporting tools, in addition to the call queuing and call routing functions mentioned above, which statistical reporting tools are used to manage the call center. For example, ACD historical reports enable a manager to identify times: (a) when inbound callers abandon calls after long waits in a queue because, for example, the call center is staffed by too few ACD agents and (b) when many ACD agents are idle. In addition, ACD forecasting reports, based on the historical reports, allow the manager to determine appropriate staffing levels for specific weeks and months in the future.

Queue Management

ACD systems experience high traffic periods and low traffic periods. Consequently, ACD systems must be capable of automating two major decisions. The first major decision may be referred to as the 'agent selection decision,' i.e., when more than one agent is available to handle the next transaction, which agent should be chosen? The second major decision may be referred to as the 'transaction selection decision,' i.e., when more than one transaction is waiting for the next available agent and an agent becomes available, which transaction should the agent handle? One approach to the agent selection decision is to set up a sequencing scheme, so that the switch of the ACD system follows the same sequence of agents until the first available agent in the sequence is found. The concern with this approach is that it creates 'hot seats,' i.e. an inequitable distribution of inbound calls to ACD agents who are high in the sequence. Most current ACD systems solve the agent selection decision by using a longest-idle-eligible-agent approach to provide a more equitable distribution of transactions.

There are also different approaches to the transaction selection decision in which there are more available transactions than there are ACD agents. One approach is to create one or more first-in, first-out (FIFO) queues. Under this approach, each transaction may be marked with a priority level by the switch of the ACD system. When an agent becomes available, the transaction with the highest priority is routed to the agent. If several calls of equal priority are waiting in a queue, the call which has been waiting the longest is routed to the available agent. If the call center conducts outbound transactions, each transaction is similarly submitted to a FIFO queue with a priority designation, with the switch routing transactions from the queue to the agents.

Queue/Team Management

Calls that arrive at a call center generally are classified into 'call types' based on the dialed number and possibly other information such as calling number or caller responses to prompts from the network. The call center is typically served by an automatic call distributor (ACD), which identifies the call type of each incoming call and either delivers or queues it. Each call type may have a separate first-in-first-out queue in the ACD. In most existing call centers, the agents answering calls are organized into one or more 'teams,' with each team having primary responsibility of the calls in one or more queues. This paradigm is sometimes referred to as 'queue/team.' In the queue/team model, scheduling for each team can be done independently. Suppose, for example, that the call center handles calls for sales, service, and billing, and that each of these call types is served by a separate team. The schedule for sales agents will depend on the forecast for sales call volume and on various constraints and preferences applicable to the agents being scheduled, but this schedule is not affected by the call volume forecast for service or billing. Further, within the sales team, agents are typically considered interchangeable from a call handling viewpoint. Thus, within a team, schedule start times, break times and the like, may be traded freely among agents in the team to satisfy agent preferences without affecting scheduled call coverage. See, U.S. Pat. No. 5,325,292, expressly incorporated herein by reference. In a queue/team environment, when a new call arrived, the ACD determines the call type and places it in the queue, if all agents are busy, or allocates this call to the team member who had been available the longest.

Skill-Based Routing

Skill-based routing of agents is a well known principle, in which the agent with the best match of skills to the problem presented is selected for handling the matter. Typically, these matters involve handling of telephone calls in a call center, and the technology may be applied to both inbound and outbound calling, or a combination of each. The skill-based routing algorithms may also be used to anticipate call center needs, and therefore be used to optimally schedule agents for greatest efficiency, lowest cost, or other optimized variable.

In the case of multi-skill criteria, the optimality of selection may be based on a global minimization of the cost function or the like.

The longest-idle-agent approach and the FIFO approach function well in applications having little variation in the types of transactions being handled by the ACD agents. If all agents can handle any transaction, these approaches provide a sufficiently high level of transactional throughput, i.e., the number of transactions handled by the call center in a particular time interval. However, in many call center environments, the agents are not equally adept at performing all types of transactions. For example, some transactions of a particular call center may require knowledge of a language other than the native language of the country in which the call center is located. As another example, some transactions may require the expertise of 'specialists' having training in the specific field to which the transaction relates, since training all agents to be knowledgeable in all areas would be cost-prohibitive. For ACD applications in which agents are not equally adept at performing all transactions, there are a number of problems which at least potentially reduce transactional throughput of the call center. Three such problems may be referred to as the 'under-skilled agent' problem, the 'over-skilled agent' problem, and the 'static grouping' problem.

The under-skilled agent problem reduces transactional throughput when the switch routes transactions to ACD agents who do not have sufficient skills to handle the transactions. For example, a call may be routed to an English-only speaking person, even though the caller only speaks Spanish. In another example, the transaction may relate to product support of a particular item for which the agent is not trained. When this occurs, the agent will typically apologize to the customer and transfer the call to another agent who is capable of helping the customer. Consequently, neither the agent's nor the customer's time is efficiently utilized.

Inefficient utilization is also a concern related to the over-skilled agent problem. A call center may have fixed groupings of agents, with each group having highly trained individuals and less-experienced individuals. Call-management may also designate certain agents as 'specialists,' since it would be cost prohibitive to train all agents to be experts in all transactions. Ideally, the highly skilled agents handle only those transactions that require a greater-than-average skill level. However, if a significant time passes without transactions that require highly skilled agents, the agents may be assigned to calls for which they are over-qualified. This places the system in a position in which there is no qualified agent for an incoming call requiring a particular expertise because the agents having the expertise are handling calls that do not require such expertise. Again, the transactional throughput of the call center is reduced.

Current ACD systems allow agents to be grouped according to training. For example, a product support call center may be divided into four fixed, i.e., 'static,' groups, with each group being trained in a different category of products sold by the company. There are a number of potentially negative effects of static grouping. Firstly, the call center management must devise some configuration of agents into groups. This may be a costly process requiring extensive analysis and data entry. Secondly, the configuration that is devised is not likely to be optimal in all situations. The pace and mix of transactions will change during a typical day. At different times, the adverse effects of the under-skilled agent problem and the adverse effects of the over-skilled agent problem will vary with respect to the transactional throughput of the call center. Thirdly, when a new product is released, the devised configuration likely will be less valuable. In response to changes in the size, pace and mix of the transaction load over the course of time, call management must monitor and adjust the performance of the current grouping configuration on an ongoing basis. When trends are detected, the grouping configuration should be changed. This requires the time and attention of call center managers and supervisors. Again, the transactional throughput is reduced.

It is thus known in the prior art to provide ACD systems that depart from the queue/team model described above. Calls are still categorized into call types. In place of queues for the call types, however, queues associated with 'skills' are provided. The ACD's call distribution logic for the call type determines which queue or queues a call will occupy at various times before it is answered. Agents are not organized into teams with exclusive responsibility for specific queues. Instead, each agent has one or more identified 'skills' corresponding to the skills-based queues. Thus, both a given call and a given agent may be connected to multiple queues at the same time. Agent skills designations may be further qualified, for example, as 'primary' or 'secondary' skills, or with some other designation of skill priority or degree of skill attainment. The ACD call distribution logic may take the skill priority levels into account in its call distribution logic.

In a skills-based routing environment, the 'matching' of calls to agents by the ACD becomes more sophisticated and thus complicated. Agents who have more than one skill no longer 'belong' to a well-defined team that handles a restricted set of calls. Instead, the skills definitions form 'implicit' teams that overlap in complex ways. If, for example, a call center has 10 skills defined, then agents could in principle have any of 1024 possible combinations ($2^{10}$) of those skills. Each skill combination could be eligible to handle a different subset of the incoming calls, and the eligible subset might vary with time of day, number of calls in queue, or other factors used by the ACD in its call routing decisions. Today, call center managers want to connect a caller to an ACD agent having exactly the right skills to serve the caller. However, 'skills based' ACD agent groups are often small and, as a result, whenever an inbound call arrives, all such 'skills based' ACD agents may be busy. In such instances, the ACD function can take call back instructions from the caller and the ACD function can manage the call back functions, for example, by assigning such calls, in accordance with the caller instructions, to a 'skills based' ACD agent whenever one becomes available.

Scheduling of agents in a skills-based environment is thus a much more difficult problem than it is in a queue/team environment. In a skills-based environment, call types cannot be considered in isolation. Thus, for example, a heavy volume of Service calls might place higher demands on multi-skilled agents, causing an unforeseen shortage of coverage for Billing calls. Further, agents with different skills cannot be considered interchangeable for call handling. Thus, trading lunch times between a Sales-only agent and a multi-skill agent might lead to over-staffing Sales at noon while under-staffing Service at 1:00 p.m. This would lead to undesirable results. Moreover, with respect to the needs of a particular call type, a multi-skilled agent might provide no help over a given span of time, might be 100% available for calls of that type, or might be available part of the time and handling other call types for another part of time.

All agents having a particular combination of skills may be deemed a 'skill group.' A central problem of skills-based scheduling is then finding a way to predict what fraction of scheduled agents from each skill group will be available to each call type during each time interval being scheduled. If these fractions are known, then the effect of different agent schedules can be generated. Unfortunately, it is difficult or impossible to calculate the skill group availability fractions directly. These functions depend on the relative and absolute call volumes in each call type, on the particulars of the skills-based call distribution algorithms in the ACD, and on the skills profiles of the total scheduled agent population. Particularly as ACD skills-based routing algorithms themselves evolve and become more sophisticated, the factors affecting skill group availability become too complex for direct analysis. One proposed solution provides a feedback mechanism involving call handling simulation and incremental scheduling, to schedule agents in a skills-based routing environment. See, U.S. Pat. No. 6,044,355, expressly incorporated herein in its entirety.

In accordance with this 'skills-based scheduling' method, a computer implemented tool is used to determine an optimum schedule for a plurality of scheduled agents in a telephone call center, each of the plurality of scheduled agents having a combination of defined skills. The plurality of scheduled agents are organized into 'skill groups' with each group including all scheduled agents having a particular combination of skills. The method begins by generating a plurality of net staffing arrays, each net staff array associated with a given call type and defining, for each time interval to be scheduled, an estimate of a difference between a given staffing level and a staffing level needed to meet a current call handling requirement. In addition to the net staffing arrays, the method uses a plurality of skills group availability arrays, each skills group availability array associated with the given call type and defining, for each combination of skill group and time interval to be scheduled, an estimate of a percentage of scheduled agents from each skill group that are available to handle a call. According to the method, the plurality of arrays are used to generate a proposed schedule for each of the plurality of scheduled agents. Thereafter, a call handling simulation is then run against the proposed schedule using a plurality of ACD call distribution algorithms (one for each call type being scheduled). Based on the results of the call handling simulation, the net staffing arrays and the skills availability arrays are refined to more accurately define the net staffing and skills usage requirements. The process of generating a schedule and then testing that schedule through the simulator is then repeated until a given event occurs. The given event may be a determination that the schedule meets some given acceptance criteria, a passage of a predetermined period of time, a predetermined number of iterations of the process, or some combination thereof. A proposed schedule is 'optimized' when it provides an acceptable call handling performance level and an acceptable staffing level in the simulation. Once the proposed schedule is 'optimized,' it may be further adjusted (within a particular skill group) to accommodate agent preferences.

U.S. Pat. No. 5,206,903 to Kohler et al. describes ACD equipment which uses static grouping. Each static group of agents is referred to as a 'split,' and each split is associated with a different queue. The agents are assigned to splits according to skills. Within a single split, the agents may be limited to knowledge of different subtypes of transactions. Preferably, there is at least one agent in each split who is trained to handle calls of any of the subtypes within the particular split. This 'expert' may also be trained to efficiently handle calls of other types, i.e., other splits. Each agent possesses up to four skill numbers that represent various abilities of the agent with respect to handling transactions related to subtypes and types of transactions. The ACD equipment assigns each incoming call three prioritized skill numbers that estimate skill requirements of the incoming call. The skill numbers of the incoming call are considered 'prioritized,' since they are viewed sequentially in searching for a match of the call with an agent, so that the second skill number of the call is unnecessary if a match is found using the first prioritized skill number. The incoming call is assigned the one, two or three prioritized skill numbers and is placed in the appropriate queue of the appropriate static group of agents. A search is made among the available agents for an agent-skill number that matches the first skill number of the call. If no match is found after a predetermined time delay, the second prioritized skill number of the call is used to find a match. If no match is found after a second predetermined time delay, the third prioritized skill number is considered. Then, if no match is still found, the ACD equipment of Kohler et al. expands the search of available agents to other groups of agents.

While the Kohler et al. patent does not directly address the problems associated with static groups, it does consider the skills of the individual agents. The prioritized skill numbers assigned to the incoming calls are logically ordered. The patent refers to the first skill number of a call as the primary call-skill indicator. This primary indicator is used to define the minimal skill level that is required for an agent to competently handle the call. Consequently, if a match is made with the primary indicator, the ACD agent may not be over-skilled or under-skilled. However, if the search is unsuccessful, the secondary call-skill indicator is utilized. The search for a match to the secondary indicator may cause the call to be routed to an agent having more than the minimal required skill. The third prioritized skill number that is assigned to the incoming call is referred to as the 'tertiary' call-skill indicator. The tertiary indicator is yet another skill level beyond what is minimally required to competently handle a call. Since the tertiary indicator is utilized only if a match is not found for either of the primary or secondary indicators, an overly skilled agent of the appropriate group will handle the call only if that agent is the only available capable agent. Thus, more highly skilled agents are assigned only when their skills are required, or no lesser-skilled agent is available to handle the call.

See, U.S. Pat. Nos. 6,529,870; 6,522,726; 6,519,459; 6,519,259; 6,510,221; 6,496,568; 6,493,696; 6,493,432; 6,487,533; 6,477,494; 6,477,245; 6,470,077; 6,466,909; 6,466,654; 6,463,299; 6,459,784; 6,453,038; and U.S. Published Patent Application No. 2003/0002646.

Group Routing

Various types of conventional automatic distributors (ACDs) are available to distribute incoming calls to a group. Reservation and information services may be provided by large companies, such as major airlines, and may consist of geographically separated groups of agents that answer incoming calls distributed to the agents by separate ACDs. Agent communication terminals (ACTs) which are connected to an ACD are utilized by the agents to process incoming calls routed to a particular ACT by the ACD.

A public branch exchange (PBX) type ACD such as a Definity® ACD available from AT&T functions as a conventional PBX and further functions as an ACD to distribute incoming calls to local agents connected to the PBX. Another type of ACD consists of the utilization of an electronic telecommunication switch such as a 5ESS® switch available from AT&T which is capable of providing ACD service when supposed by ACTs coupled to the switch. Both types of ACD typically function as independent systems which handle incoming calls and make internal decisions concerning which agent will receive a given call. Both types of ACD systems are capable of generating statistical reports which can be monitored by a workstation coupled to the ACD system to allow a supervisor to monitor call handling statistics. Such data typically represents an average of statistics for a given system.

Telephone call centers that handle calls to toll-free '800' numbers are well-known in the art. Typically, a company may have many call centers, all answering calls made to the same set of 800 numbers. Each of the company's call centers usually has an automatic call distributor (ACD) or similar equipment capable of queuing calls. ACD management information systems keep statistics on agent and call status, and can report these statistics on frequent intervals. Such capabilities are in use today for centralized reporting and display of multi-location call center status. In such systems, the company will want to distribute the calls to its call centers in a way that will optimally meet its business goals. Those goals might include low cost of call handling, answering most calls within a given amount of time, providing customized handling for certain calls, and many others. It is also known in the prior art that certain call routing criteria and techniques support a broad range of business goals. These include 'load balancing,' 'caller segmentation' and 'geographic routing.' Load balancing refers to distribution of calls so that the expected answer delay for new calls is similar across all the call centers. If other considerations do not dictate otherwise, load balancing is desirable because it provides optimum efficiency in the use of agents and facilities, and it provides the most consistent grade of service to callers. In special situations it might be desirable to unbalance the load in a particular way, but control over the distribution of call load is still desired.

If the caller's identity can be inferred from the calling number, caller-entered digits, or other information, that identity may influence the choice of destination for the call. Call routing based on such information is referred to as caller segmentation. Also, it has been found desirable for particular call centers to handle calls from particular geographic areas. The motivation may be to minimize call transport costs, to support pre-defined call center 'territories', or to take advantage of agents specifically trained to handle calls from given locations. Such techniques are known as geographic routing.

The interexchange carriers who provide 800 service today generally support some form of 'routing plan' to help achieve load balancing, caller segmentation and geographic routing. Typically these routing plans allow 800 call routing based on time of day, day of week, the caller's area code, caller-entered digits, and fixed percentage allocations. Predominately, however, the routing plans supported by the carriers are static in the sense that they do not automatically react to unexpected variations in incoming call volume or distribution, nor to actual call delays being experienced at each destination. Reaction to changing conditions is done via manual modification of the plan, on a time scale of minutes or hours. Recent service offerings from some interexchange carriers offer some degree of automatic reaction to changing conditions. One such offering, called 'alternate termination sequence' or 'ATS' (from AT&T), allows customers to establish maximum numbers of calls to be queued for each destination, with a pre-defined alternative when a primary destination is overloaded. Another offering, referred to as 'intelligent routing control' or 'IRC' (from MCI), allows an ACD to refuse a call from the network, again resulting in pre-defined alternative call handling. A third kind of service, AT&T's Intelligent Call Processing, lets the interexchange network pass call-by-call data to a computer.

In a conventional ACD, phone calls are processed on a first-in, first-out basis: the longest call waiting is answered by the next available agent. Answering calls across multiple automated call distributors (ACD) is typically done on a first-in, first-out basis dependent upon time of receipt of the call by each ACD, whether the call is directly connected or forwarded. Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al, when an incoming call is made to the call router, it decides which agent station should receive the call, establishes a call with that agent station, and then transfers the original call onto the second call to connect the incoming caller directly to the agent station and then drops out of the connection. U.S. Pat. No. 5,193,110 issued to Jones et al discloses an integrated services platform for a telephone communications system which platform includes a plurality of application processing ports for providing different types of information services to callers. In Jones et al's disclosed system, a master control unit and a high speed digital switch are used to control processing of incoming phone calls by recognizing the type of service requested by the caller and then routing the call to the appropriate processing port. The Jones et al system is disclosed as an adjunct to current switching technology in public and private networks.

Intelligent Call Management

Call centers are also used to make outbound calls, for example for telemarketing. Agents making outbound calls, referred to as outbound agents, are typically separate from ACD agents handling inbound calls and call center software separately manages outbound call lists for outbound agents to ensure that each outbound agent wastes little time in dialing or in performing overhead operations. A call center typically has multiple agents for answering incoming calls and placing outgoing calls. A call center may also have agents participating in outgoing call campaigns, typically in conjunction with an outbound call management system. Each agent may be assigned to a particular group, such as an inbound group or an outbound group. Agents can also be assigned to a supervisor team, which represents multiple agents that report to the same supervisor.

In certain situations, it is necessary to restrict an agent's activity to answering calls or handling a particular type of call (e.g., answering only incoming calls). For example, during an outbound campaign, the system placing the outbound calls and controlling the rate at which the calls are placed, e.g., a so-called predictive dialer, relies on the availability of the agent to handle an answered call. If the system places outbound calls expecting the agent to be available, but the agent instead places their own call to another agent or a supervisor, or has an incoming call connected to them, the outbound system may not have an agent available to handle an answered outbound call. Additionally, if an agent is assigned to handle incoming calls, but instead places a call to another agent or listens to voice mail messages, the number of queued incoming calls may increase, thereby increasing the waiting time experienced by the callers. 'ITU-T Recommendation Q.1219, Intelligent Network User's Guide for Capability Set 1', dated April, 1994, expressly incorporated herein by reference, provides considerable information on intelligent networks. One known system proposes a call-management method and system for distributing calls to a plurality of individuals, such as automatic call distribution (ACD) agents, which routes calls to the individuals based upon a correlation of attributes of the individuals with calls that are tagged with identification of abilities that are advantageous to efficiently processing the calls. That is, for each call that is to be distributed, one or more skills that are relevant to efficient handling of the call are determined and then used to route the call to an appropriate individual. In addition, call management preferences may also be accommodated.

Personalization and Collaborative Filtering

Known systems allow personalization or prediction of user type, preferences or desires based on historical data or limited information available. These known systems have been applied to a number of different domains. In a non-collaborative personalization system, the available information about a person is analyzed, and based on this information, conclusions are drawn. In a collaborative system, the available information is used to associate the person with a group of other users having common attributes. By grouping users, the data sets are more dense, permitting more detailed inferences to be drawn. The groups are defined by mapping user attributes in a multidimensional space, and then defining clusters of users having correlated traits. Further, the use of data relating to past transactions of other users allows prediction of outcomes and sequences of actions, without having a true past example of the activity from that particular user.

The following references are expressly incorporated herein by reference: U.S. Pat. Nos. 6,418,424; 6,400,996; 6,081,750; 5,920,477; 5,903,454; 5,901,246; 5,875,108; 5,867,386; 5,774,357; 6,529,891; 6,466,970; 6,449,367; 6,446,035; 6,430,558; 6,412,012; 6,389,372; 6,356,899; 6,334,131; 6,334,127; 6,327,590; 6,321,221; 6,321,179; 6,317,722; 6,317,718; 6,266,649; 6,256,648; 6,253,193; 6,236,980; 6,236,978; 6,185,683; 6,177,932; 6,170,742; 6,146,026; 6,138,119; 6,112,186; 6,112,181; 6,078,928; 6,016,475; 5,999,908; 5,560,011; 6,484,123; 6,480,844; 6,477,246; 6,421,709; 6,405,922; 6,353,813; 6,345,264; 6,314,420; 6,308,175; 6,144,964; 6,029,161; 6,018,738; 6,016,475; 6,006,218; 5,983,214; 5,867,799; and 5,790,935. See also references cited in U.S. patent application Ser. No. 10/385,389. See, U.S. Pat. Nos. 4,048,452; 4,737,983, 4,757,529; 4,893,301; 4,953,204; 5,073,890; 5,278,898; 5,309,513; 5,369,695; 5,506,898; 5,511,117; 5,519,773; 5,524,147; 5,590,188; 5,633,922; 5,633,924; 5,715,307; 5,740,240; 5,768,360; 5,825,869; 5,848,143; 5,870,464; 5,878,130; 5,901,214; 5,905,792; 5,907,608; 5,910,982; 5,915,011; 5,917,903; 5,923,745; 5,926,539; 5,933,492; 5,940,496; 5,940,947; 5,946,387; 5,953,332; 5,953,405; 5,956,397; 5,960,073; 5,963,632; 5,970,134; 5,978,465; 5,982,868; 5,987,116; 5,987,118; 5,991,391; 5,991,392; 5,991,395; 5,995,614; 5,995,615; 5,999,965; 6,002,760;

6,005,931; 6,044,146; 6,058,435; 6,061,347; 6,064,667; 6,072,864; 6,104,801; 6,115,462; 6,118,865; 6,122,358; 6,122,360; 6,122,364; 6,128,380; 6,134,530; 6,147,975; 6,157,655; 6,175,563; 6,175,564; 6,185,292; 6,223,165; 6,226,289; 6,229,888; 6,230,197; 6,233,332; 6,333,979; 6,333,980; 6,347,139; and U.S. Pat. App. Nos. 010000458 A1; 0010024497 A1; 0020006191 A1; 0020009190 A1; 0020019846 A1; and 0020021693 A1, each of which is expressly incorporated herein by reference.

Internet Auctions

On-line electronic auction systems which allow efficient sales of products and services are well known, for example, EBAY.COM, ONSALE.COM, UBID.COM, and the like. Inverse auctions that allow efficient purchases of product are also known, establishing a market price by competition between sellers. The Internet holds the promise of further improving efficiency of auctions by reducing transaction costs and freeing the 'same time-same place' limitations of traditional auctions. This is especially appropriate where the goods may be adequately described by text or images, and thus a physical examination of the goods is not required prior to bidding.

In existing Internet systems, the technological focus has been in providing an auction system that, over the course of hours to days, allow a large number of simultaneous auctions, between a large number of bidders to occur. These systems must be scalable and have high transaction throughput, while assuring database consistency and overall system reliability. Even so, certain users may selectively exploit known technological limitations and artifacts of the auction system, including non-real time updating of bidding information, especially in the final stages of an auction. Because of existing bandwidth and technological hurdles, Internet auctions are quite different from live auctions with respect to psychological factors. Live auctions are often monitored closely by bidders, who strategically make bids, based not only on the 'value' of the goods, but also on an assessment of the competition, timing, psychology, and progress of the auction. It is for this reason that so-called proxy bidding, wherein the bidder creates a preprogrammed 'strategy', usually limited to a maximum price, are disfavored. A maximum price proxy bidding system is somewhat inefficient, in that other bidders may test the proxy, seeking to increase the bid price, without actually intending to purchase, or contrarily, after testing the proxy, a bidder might give up, even below a price he might have been willing to pay. Thus, the proxy imposes inefficiency in the system that effectively increases the transaction cost. In order to address a flurry of activity that often occurs at the end of an auction, an auction may be held open until no further bids are cleared for a period of time, even if advertised to end at a certain time. This is common to both live and automated auctions. However, this lack of determinism may upset coordinated schedules, thus impairing efficient business use of the auction system.

In order to facilitate management of bids and bidding, some of the Internet auction sites have provided non-Hypertext Markup Language (HTML) browser based software 'applet' to track auctions. For example, ONSALE-.COM has made available a Marimba Castanet® applet called Bidwatch to track auction progress for particular items or classes of items, and to facilitate bidding thereon. This system, however, lacks real-time performance under many circumstances, having a stated refresh period of 10 seconds, with a long latency for confirmation of a bid, due to constraints on software execution, quality of service in communications streams, and bid confirmation dialogue. Thus, it is possible to lose a bid even if an attempt was made prior to another bidder. The need to quickly enter the bid, at risk of being too late, makes the process potentially error prone. Proxy bidding, as discussed above, is a known technique for overcoming the constraints of Internet communications and client processing limitations, since it bypasses the client and telecommunications links and may execute solely on the host system or local thereto. However, proxy bidding undermines some of the efficiencies gained by a live market.

A known computer site for auctioning a product on-line comprises at least one web server computer designed for serving a host of computer browsers and providing the browsers with the capability to participate in various auctions, where each auction is of a single product, at a specified time, with a specified number of the product available for sale. The web server cooperates with a separate database computer, separated from the web server computer by a firewall. The database computer is accessible to the web computer server computer to allow selective retrieval of product information, which includes a product description, the quantity of the product to be auctioned, a start price of the product, and an image of the product. The web server computer displays, updated during an auction, the current price of the product, the quantity of the product remaining available for purchase and the measure of the time remaining in the auction. The current price is decreased in a predetermined manner during the auction. Each user is provided with an input instructing the system to purchase the product at a displayed current price, transmitting an identification and required financial authorization for the purchase of the product, which must be confirmed within a predetermined time. In the known system, a certain fall-out rate in the actual purchase confirmation may be assumed, and therefore some overselling allowed. Further, after a purchase is indicate, the user's screen is not updated, obscuring the ultimate lowest selling price from the user. However, if the user maintains a second browser, he can continue to monitor the auction to determine whether the product could have been purchased at a lower price, and if so, fail to confirm the committed purchase and purchase the same goods at a lower price while reserving the goods to avoid risk of loss. Thus, the system is flawed, and may fail to produce an efficient transaction or optimal price. An Internet declining price auction system may provide the ability to track the price demand curve, providing valuable marketing information. For example, in trying to determine the response at different prices, companies normally have to conduct market surveys. In contrast, with a declining price auction, substantial information regarding price and demand is immediately known. The relationship between participating bidders and average purchasers can then be applied to provide a conventional price demand curve for the particular product.

U.S. Pat. No. 5,890,138 to Godin, et al. (Mar. 30, 1999), expressly incorporated herein by reference in its entirety, relates to an Internet auction system. The system implements a declining price auction process, removing a user from the auction process once an indication to purchase has been received. See, Rockoff, T. E., Groves, M.; 'Design of an Internet-based System for Remote Dutch Auctions', Internet Research, v 5, n 4, pp. 10-16, MCB University Press, Jan. 1, 1995. U.S. Pat. No. 5,835,896, Fisher, et al., issued Nov. 10, 1998, expressly incorporated herein by reference in its entirety, provides method and system for processing and transmitting electronic auction information over the Internet, between a central transaction server system and remote bidder terminals. Those bids are recorded by the system and the bidders are updated with the current auction status information. When appropriate, the system closes the auction from further bidding and notifies the winning bidders and losers as to the auction outcome. The transaction server posts information from a database describing a lot available for purchase, receives a plurality of bids, stored in a bid database, in response to the information, and automatically categorizes the bids as successful or unsuccessful. Each bid is validated, and an electronic mail message is sent informing the bidder of the bid status. This system employs HTTP, and thus does not automatically update remote terminal screens, requiring the e-mail notification feature.

The auction rules may be flexible, for example including Dutch-type auctions, for example by implementing a price markdown feature with scheduled price adjustments, and English-type (progressive) auctions, with price increases corresponding to successively higher bids. In the Dutch type auction, the price markdown feature may be responsive to bidding activity over time, amount of bids received, and number of items bid for. Likewise, in the progressive auction, the award price may be dependent on the quantity desired, and typically implements a lowest successful bid price rule. Bids that are below a preset maximum posted selling price are maintained in reserve by the system. If a certain sales volume is not achieved in a specified period of time, the price is reduced to liquidate demand above the price point, with the new price becoming the posted price. On the other hand, if a certain sales volume is exceeded in a specified period of time, the system may automatically increase the price. These automatic price changes allow the seller to respond quickly to market conditions while keeping the price of the merchandise as high as possible, to the seller's benefit. A 'Proxy Bidding' feature allows a bidder to place a bid for the maximum amount they are willing to pay, keeping this value a secret, displaying only the amount necessary to win the item up to the amount of the currently high bids or proxy bids of other bidders. This feature allows bidders to participate in the electronic auction without revealing to the other bidders the extent to which they are willing to increase their bids, while maintaining control of their maximum bid without closely monitoring the bidding. The feature assures proxy bidders the lowest possible price up to a specified maximum without requiring frequent inquiries as to the state of the bidding. A 'Floating Closing Time' feature may also be implemented whereby the auction for a particular item is automatically closed if no new bids are received within a predetermined time interval, assuming an increasing price auction. Bidders thus have an incentive to place bids expeditiously, rather than waiting until near the anticipated close of the auction.

U.S. Pat. No. 5,905,975, Ausubel, issued May 18, 1999, expressly incorporated herein by reference in its entirety, relates to computer implemented methods and apparatus for auctions. The proposed system provides intelligent systems for the auctioneer and for the user. The auctioneer's system contains information from a user system based on bid information entered by the user. With this information, the auctioneer's system determines whether the auction can be concluded or not and appropriate messages are transmitted. At any point in the auction, bidders are provided the opportunity to submit not only their current bids, but also to enter future bids, or bidding rules which may have the opportunity to become relevant at future times or prices, into the auction system's database. Participants may revise their executory bids, by entering updated bids. Thus, at one extreme, a bidder who wishes to economize on his time may choose to enter his entire set of bidding rules into the computerized system at the start of the auction, effectively treating this as a sealed-bid auction. At the opposite extreme, a bidder who wishes to closely participate in the auction may choose to constantly monitor the auction's progress and to submit all of his bids in real time. See also, U.S. patent application Ser. No. 08/582,901 filed Jan. 4, 1996, which provides a method for auctioning multiple, identical objects and close substitutes.

E-Commerce Systems

U.S. Pat. No. 5,946,669 (Polk, Aug. 31, 1999), expressly incorporated herein by reference, relates to a method and apparatus for payment processing using debit-based electronic funds transfer and disbursement processing using addendum-based electronic data interchange. This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

U.S. Pat. No. 6,005,939 (Fortenberry, et al., Dec. 21, 1999), expressly incorporated herein by reference, relates to a method and apparatus for storing an Internet user's identity and access rights to World Wide Web resources. A method and apparatus for obtaining user information to conduct secure transactions on the Internet without having to re-enter the information multiple times is described. The method and apparatus can also provide a technique by which secured access to the data can be achieved over the Internet. A passport containing user-defined information at various security levels is stored in a secure server apparatus, or passport agent, connected to computer network. A user process instructs the passport agent to release all or portions of the passport to a recipient node and forwards a key to the recipient node to unlock the passport information.

U.S. Pat. No. 6,016,484 (Williams, et al., Jan. 18, 2000), expressly incorporated herein by reference, relates to a system, method and apparatus for network electronic payment instrument and certification of payment and credit collection utilizing a payment. An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, the issuing agent for the certificate defines a default bitmap for the instrument associated with a particular certificate, and the default bitmap will be displayed when the certificate definition is completed. Finally, the number associated with a particular certificate will be utilized to determine if a particular party can issue a certificate.

U.S. Pat. No. 6,029,150 (Kravitz, Feb. 22, 2000), expressly incorporated herein by reference, relates to a system and method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information, which the agent knows about the merchant, and/or the customer. The customer forwards a portion of the payment advice to the specific merchant. The specific merchant provides the goods to the customer in response to receiving the portion of the payment advice.

U.S. Pat. No. 6,047,269 (Biffar, Apr. 4, 2000), expressly incorporated herein by reference, relates to a self-contained payment system with creating and facilitating transfer of circulating digital vouchers representing value. A digital voucher has an identifying element and a dynamic log. The identifying element includes information such as the transferable value, a serial number and a digital signature. The dynamic log records the movement of the voucher through the system and accordingly grows over time. This allows the system operator to not only reconcile the vouchers before redeeming them, but also to recreate the history of movement of a voucher should an irregularity like a duplicate voucher be detected. These vouchers are used within a self-contained system including a large number of remote devices that are linked to a central system. The central system can e linked to an external system. The external system, as well as the remote devices, is connected to the central system by any one or a combination of networks. The networks must be able to transport digital information, for example the Internet, cellular networks, telecommunication networks, cable networks or proprietary networks. Vouchers can also be transferred from one remote device to another remote device. These remote devices can communicate through a number of methods with each other. For example, for a non-face-to-face transaction the Internet is a choice, for a face-to-face or close proximity transactions tone signals or light signals are likely methods. In addition, at the time of a transaction a digital receipt can be created which will facilitate a fast replacement of vouchers stored in a lost remote device.

Micropayments

U.S. Pat. No. 5,999,919 (Jarecki, et al., Dec. 7, 1999), expressly incorporated herein by reference, relates to an efficient micropayment system. Existing software proposals for electronic payments can be divided into 'on-line' schemes which require participation of a trusted party (the bank) in every transaction and are secure against overspending, and 'off-line' schemes which do not require a third party and guarantee only that overspending is detected when vendors submit their transaction records to the bank (usually at the end of the day). A new 'hybrid' scheme is proposed which combines the advantages of both 'on-line' and 'off-line' electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs.

The following U.S. Patents, expressly incorporated herein by reference, define aspects of micropayment, digital certificate, and on-line payment systems: U.S. Pat. Nos. 5,930,777; 5,857,023; 5,815,657; 5,793,868; 5,717,757; 5,666,416; 5,677,955; 5,839,119; 5,915,093; 5,937,394; 5,933,498; 5,903,880; 5,903,651; 5,884,277; 5,960,083; 5,963,924; 5,996,076; 6,016,484; 6,018,724; 6,021,202; 6,035,402; 6,049,786; 6,049,787; 6,058,381; 6,061,448; 5,987,132; 6,057,872; and 6,061,665. See also, Rivest and Shamir, TayWord and MicroMint: Two Simple Micropayment Schemes' (May 7, 1996); Micro PAYMENT transfer Protocol (MPTP) Version 0.1 (22 Nov. 1995) et seq., http://www.w3.org/pub/WWW/TR/WD-mptp; Common Markup for web Micropayment Systems, http://www.w3.org/TR/WD-Micropayment-Markup (9 Jun. 1999); 'Distributing Intellectual Property: a Model of Microtransaction Based Upon Metadata and Digital Signatures', Olivia, Maurizio, http://olivia.modlang.denison.edu/~olivia/RFC/09/, all of which are expressly incorporated herein by reference.

See, Game Theory references cited in U.S. patent application Ser. No. 10/385,389. See, also: U.S. Pat. Nos. 4,977,595; 5,237,159; 5,392,353; 5,511,121; 5,621,201; 5,623,547; 5,679,940; 5,696,908; 5,754,939; 5,768,385; 5,799,087; 5,812,668; 5,828,840; 5,832,089; 5,850,446; 5,889,862; 5,889,863; 5,898,154; 5,901,229; 5,920,629; 5,926,548; 5,943,424; 5,949,045; 5,952,638; 5,963,648; 5,978,840; 5,983,208; 5,987,140; 6,002,767; 6,003,765; 6,021,399; 6,026,379; 6,029,150; 6,029,151; 6,047,067; 6,047,887; 6,055,508; 6,065,675; and 6,072,870, each of which is expressly incorporated herein by reference. See also, U.S. Pat. Nos. 6,243,684; 6,230,197; 6,229,888; 6,226,360; 6,226,287; 6,212,178; 6,208,970; 6,205,207; 6,201,950; 6,192,413; 6,192,121; 6,185,283; 6,178,240; 6,173,052; 6,170,011; RE37,001; 6,157,711; 6,154,535; 6,154,528; 6,151,387; 6,148,065; 6,144,737; 6,137,870; 6,137,862; 6,134,530; 6,130,937; 6,128,376; 6,125,178; 6,122,484; 6,122,364; 6,122,358; 6,115,693; 6,102,970; 6,098,069; 6,097,806; 6,084,943; 6,070,142; 6,067,348; 6,064,973; 6,064,731; 6,064,730; 6,058,435; 6,055,307; 6,052,453; 6,049,599; 6,044,368; 6,044,149; 6,044,135; 6,041,118; 6,041,116; 6,035,021; 6,031,899; 6,026,156; 6,026,149; 6,021,428; 6,021,190; 6,021,114; 6,018,579; 6,016,344;

6,014,439; 6,011,845; 6,009,149; 6,005,928; 6,005,534; 6,002,760; 5,995,948; RE36,416; 5,991,761; 5,991,604; 5,991,393; 5,987,116; 5,987,115; 5,982,857; 5,978,471; 5,978,467; 5,978,465; 5,974,135; 5,974,120; 5,970,132; 5,966,429; 5,963,635; 5,956,392; 5,949,863; 5,949,854; 5,949,852; 5,946,394; 5,946,388; 5,943,403; 5,940,813; 5,940,497; 5,940,493; 5,937,390; 5,937,055; 5,933,480; 5,930,339; 5,926,528; 5,924,016; 5,923,746; 5,918,213; 5,917,893; 5,914,951; 5,913,195; 5,912,947; 5,907,601; 5,905,979; 5,903,641; 5,901,209; 5,898,762; 5,898,759; 5,896,446; 5,894,505; 5,893,902; 5,878,126; 5,872,833; 5,867,572; 5,867,564; 5,867,559; 5,857,013; 5,854,832; 5,850,428; 5,848,143; 5,841,852; 5,838,779; 5,838,772; 5,835,572; 5,828,734; 5,828,731; 5,825,869; 5,822,410; 5,822,401; 5,822,400; 5,815,566; 5,815,554; 5,815,551; 5,812,642; 5,806,071; 5,799,077; 5,796,816; 5,796,791; 5,793,846; 5,787,159; 5,787,156; 5,774,537; 5,768,355; 5,761,285; 5,748,711; 5,742,675; 5,740,233; RE35,758; 5,729,600; 5,727,154; 5,724,418; 5,717,741; 5,703,935; 5,701,295; 5,699,418; 5,696,818; 5,696,809; 5,692,034; 5,692,033; 5,687,225; 5,684,863; 5,675,637; 5,661,283; 5,657,074; 5,655,014; 5,655,013; 5,652,788; 5,646,988; 5,646,986; 5,638,436; 5,636,268; 5,636,267; 5,633,917; 5,625,682; 5,625,676; 5,619,557; 5,610,978; 5,610,774; 5,600,710; 5,594,791; 5,594,790; 5,592,543; 5,590,171; 5,588,049; 5,586,179; 5,581,607; 5,581,604; 5,581,602; 5,579,383; 5,579,377; 5,577,112; 5,574,784; 5,572,586; 5,572,576; 5,570,419; 5,568,540; 5,561,711; 5,559,878; 5,559,867; 5,557,668; 5,555,295; 5,555,290; 5,546,456; 5,546,452; 5,544,232; 5,544,220; 5,537,470; 5,535,257; 5,533,109; 5,533,107; 5,533,103; 5,530,931; 5,528,666; 5,526,417; 5,524,140; 5,519,773; 5,517,566; 5,515,421; 5,511,112; 5,506,898; 5,502,762; 5,495,528; 5,495,523; 5,493,690; 5,485,506; 5,481,596; 5,479,501; 5,479,487; 5,467,391; 5,465,286; 5,459,781; 5,448,631; 5,448,624; 5,442,693; 5,436,967; 5,434,906; 5,432,835; 5,430,792; 5,425,093; 5,420,919; 5,420,852; 5,402,474; 5,400,393; 5,390,236; 5,381,470; 5,365,575; 5,359,645; 5,351,285; 5,341,414; 5,341,412; 5,333,190; 5,329,579; 5,327,490; 5,321,745; 5,319,703; 5,313,516; 5,311,577; 5,311,574; 5,309,505; 5,309,504; 5,297,195; 5,297,146; 5,289,530; 5,283,818; 5,276,732; 5,253,289; 5,251,252; 5,239,574; 5,224,153; 5,218,635; 5,214,688; 5,185,786; 5,168,517; 5,166,974; 5,164,981; 5,163,087; 5,163,083; 5,161,181; 5,128,984; 5,121,422; 5,103,449; 5,097,528; 5,081,711; 5,077,789; 5,073,929; 5,070,526; 5,070,525; 5,063,522; 5,048,075; 5,040,208; 5,020,097; 5,020,095; 5,016,270; 5,014,298; 5,007,078; 5,007,000; 4,998,272; 4,987,587; 4,979,171; 4,975,841; 4,958,371; 4,941,168; 4,935,956; 4,933,964; 4,930,150; 4,924,501; 4,894,857; 4,878,243; 4,866,754; 4,852,149; 4,807,279; 4,797,911; 4,768,221; 4,677,663; and 4,286,118, each of which is expressly incorporated herein by reference.

SUMMARY AND OBJECTS OF THE INVENTION

The present invention provides a method and apparatus for optimizing the targeting of a communication with a destination, based on characteristics of the source or communication, characteristics of the destination, and the costs and benefits involved for each, especially where a plurality of sources are seeking to contact a plurality of destinations, e.g., simultaneously or otherwise inconsistently.

The disclosure describes a number of embodiments of the invention. Language describing one embodiment or set of embodiments is not intended to, and does not, limit or constrain the scope of other embodiments of the invention.

The present invention provides, according to one embodiment, a system and method for intelligent communication routing within a low-level communication server system. Therefore, it allows replacement or supplementation of telephone numbers, IP addresses, e-mail addresses and the like, to identify targets accessible by the system with high-level definitions, which are contextually interpreted at the time of communications routing, to appropriately direct the communication. Therefore, the target of a communication is defined by an algorithm, rather than a predetermined address or simple rule, and the algorithm evaluated in real time for resolution of the target, to deliver the communication or establish a real or virtual channel.

According to another embodiment, the optimization and control is performed through a distributed architecture, and may be implemented at a high level.

Alternately, the intelligence of the server may be used to implement telephony or computer-telephony integration features, other than destination or target.

Therefore, according to the present invention, communications are, or may be, routed or other telecommunications features implemented, inferentially or intelligently, by a processor within the communications management architecture. For example, in a call center, the software system which handles virtual or real circuit switching and management resolves the destination using an algorithm or the like, rather than an unambiguous target.

An embodiment according to the present invention, the control over switching in a circuit switch is partitioned together with intelligent functions.

Intelligent functions include, for example, but are not limited to, optimizations, artificial neural network implementation, probabilistic and stochastic process calculations, fuzzy logic, Bayesian logic and hierarchal Markov models (HMMs), or the like.

A particularly preferred embodiment provides a skill-based call automatic call director for routing an incoming call in a call center to an appropriate or optimal agent. While skill-based routing technologies are known in the art, the intelligence for routing the call is separate from the voice routing call management system. Thus, the prior art provides a separate and distinct process, and generally a separate system or partition of a system, for evaluation of the skill based routing functionality. For example, while the low level voice channel switching is performed in a PBX, the high level policy management is often performed in a separate computer system, linked to the PBX through a packet switched network and/or bus data link.

The present invention, however, integrates evaluation of intelligent aspects of the control algorithm with the communications management. This integration therefore allows communications to be established based on an inferential description of a target, rather than a concrete description, and allows a plurality of considerations to be applied, rather than a single unambiguous decision rule.

An aspect of the present invention therefore proposes an architectural change in the computer telephony integrated (CTI) systems, wherein the CTI host takes on greater responsibilities, for example intelligent tasks, than in known systems. In this case, the host is, for example, a PC server having a main processor, for example one or more Intel Pentium 4 Xeon or AMD Athlon MP processors, and one or more voice channel processors, such as Dialogic D/320-PCI or D/160SC/LS, or PrimeNet MM PCI, or the like. In this type of system, the voice channel processor handles connections and switching, but does not implement control. The control information is provided by the main processor over, for example, a PCI bus, although some or all control information may also be relayed over a mezzanine bus. Because the actual voice channel processing is offloaded from the main processor, real time response with respect to voice information is not required. Therefore, the main processor may operate and be controlled by a standard operating system, in contrast to a real time operating system. While the control processor does operate under certain latency constraints, these are quite long as compared to the response latency required of the voice channel processors. This, in turn, allows the main processor(s) to undertake a plurality of tasks which are not deterministic, that is, the time required to complete processing of a task is unknown and is not necessarily completed within a time window. However, by using state of the art processors, such as a 3.06 GHz Pentium processor, the amount of processing which may be undertaken, meeting a reasonable expectation of processing latency, is substantial. Thus, operating under the same instance of the operating system, for example sharing the same message queue, as the interface between the main processor and the voice channel processor(s), the system according to the present invention may process advanced and complex algorithms for implementing intelligent control. This architecture reduces the required bandwidth for communications with an external high level management system, as well as the processing load thereon. Likewise, since significant decisions and resource allocations are made within the switching system, the need for high quality of service communications channels between the switching system and management system is also reduced.

In a voice communication system embedded in a traditional PBX-type system, the intelligent algorithm for controlling the voice channels preferably requires minimal access to a disk or mass-storage based database. That is, for any transaction to be processed, preferably either all information is available to the main processor at the commencement of the process, or an initial request is made at commencement of the process, with no additional requests necessary to complete the process, although a stored database may be updated at the conclusion of the process. For example, as a call is received, sufficient information is gathered to define the caller, either by identity or characteristics. This definition may then trigger an initial database lookup, for example to recall a user transaction file or a user profile. Preferably, therefore, a table or other data structure is stored in low-latency memory, for example, double data rate dynamic random access memory (DDR-RAM), which holds the principal parameters and information necessary for execution of the algorithm. Therefore, preferably agent and system status information is present and maintained locally, and need not be recalled for each transaction. Of course, in hardware environments where memory or storage resources are not highly constrained, these may be used as appropriate.

According to one embodiment of the invention, a process is provided for optimizing the selection of an agent within the voice channel switching system. This process is a multi step process. Only the later part of the process generally need be completed in a time-critical fashion, e.g., as a foreground task. The initial part(s) of the process may be implemented over an extended period of time, so long as the data available for transactions is sufficient current to avoid significant errors. It is particularly noted that the present invention is not limited to the routing of voice calls, and in fact may be used to control purely data communications. According to another embodiment of the invention, the processing of communications is generally not time-sensitive, and therefore delays of minutes or hours are tolerable. Indeed, on of the classifications of a communication used to target the communication may represent its time-sensitivity. For example, a real-time caller may have a non-time critical issue. The system may record and/or transcribe a message from the caller, which can then be processed in an email processing queue. Likewise, an email or SMS message may represent a requirement for real-time assistance, and therefore a long turnaround delay may be poorly tolerated; such a communication may be routed to a live agent for immediate handling, as appropriate.

According to one embodiment, a set of skills are first defined, which are generally independent skills, although high cross correlations between skills would not defeat the utility thereof. The skill definitions may be quite persistent, for example over a particular campaign, call center, or even multiple call centers and multiple campaigns. The skills generally are not subject to change after being defined, although through advanced processing or reprocessing of data, clusters in multidimensional space may be defined or revised, representing 'skills'. Likewise, a manual process may be employed to define the skill set. Since one purpose for defining these skill sets is to distinguish between agents, it is preferred that the skill definitions are defined to emphasize the relevant differences, that is, each parameter of a skill set correlates strongly with a discernable characteristic (or set of characteristics) of a call, and that as defined, there is a correlation between a value of that characteristic and success (however defined) in handling a call having the discernable characteristic or set of characteristics. While it is also possible to have a system in which agent characteristics are defined according to measurable criteria, whether or not these vary significantly among agents, and whether or not these correlate strongly with outcome, however in such a case the agent skill set vector would have to be processed for effective usage, and thus may result in inefficiencies in both data acquisition and optimization implementation. Of course, a first stage of agent skill set processing could be performed in advance of the optimization, to produce an intermediate data format having the desired characteristics.

It is also possible for a 'skill' to be arbitrarily defined, that is, a cluster of communications objects which have a common characteristic or set of characteristics are routed to a common destination soon after initial identification, even if that destination is arbitrarily selected.

Next, for any given task, the skills are typically weighted. (In the case of a single relevant skill, the optimization according to the present invention may have limited advantage, while with a plurality of relevant skills, the optimization has a more significant effect). That is, the importance of any skill with respect to the task is defined or predicted. This may also be a manual or automated process. In the case of an automated process for weighting the skills, past tasks similar in nature are analyzed to determine which skills were involved, and to what extent. Typically, since the skill set definitions are normative, the task-skill relationships are derived from data for various or all agents, and need not be limited to the data pertaining to a single or respective agent. The weighting may be adaptive, that is, the weighting need not be invariant, and may change over time based on a number of factors. The weightings may also be time dependent, for example following a diurnal variation.

Each agent may be assigned a metric with respect to each skill. As discussed above, the skill assignment may be arbitrary, as a means to ensure that a cluster of communications are handled together; however, once this decision is made, the allocation may be implemented by the 'skill' metric. This process may be manual or automated, however, a number of advantages accrue from an automated analysis or assignment of agent skill level. Typically, an initial skill level will be assigned manually or as a result of an off-line assessment. As the agent is presented with tasks, the proficiency of the agent is analyzed, and the results used to define skill-specific metrics. As stated above, since the skill definitions are normative, the skills of one agent are compared or comparable to skills of others. For example, the skill sets are assigned using a multivariate analysis technique, based on analysis of a plurality of transactions, predicting the best set of skills consistent with the results achieved. In this analysis, each skill metric may be associated with a reliability indicia; that is, in some instances, where the outcome of clearly determinable, and a skill as defined is highly correlated with the outcome, the reliability of the determined skill value for a statistically significant sample size is high. On the other hand, where a particular skill is relatively unrelated to the tasks included within the data analysis set, that is, the outcome factor is relatively uncorrelated with the value of the skill, the reliability of a determination of an agent skill will be low.

A related issue relates to inferring an agent skill level for a skill parameter where little or no data is available. For this task, collaborative filtering (also known as social filtering) may be appropriate. A collaborative filter seeks to infer characteristics of a person based on the characteristics of others having similar associated parameters for other factors. See references cited and incorporated by reference above. In this case, there is only a small analytic difference between a parameter for which data is available from a respective agent, but yields an unreliable measurement, and a parameter for which data is unavailable, but can be inferred with some reliability. Therefore, the skill determining process may employ both techniques in a composite; as more data becomes available relating to an actual skill level of an agent with respect to a skill parameter, reliance on inferred skill levels is reduced. It is therefore an aspect of one embodiment of the invention that a collaborative filter is used to infer agent skill levels where specific data is unavailable. It is also an aspect of an embodiment of the invention that in addition to a skill level metric, a reliability estimate for the measurement of the skill level metric is also made available.

In the case of arbitrarily assigned skills, these may also be assigned manually or automatically, based on various criteria.

It is noted that in defining a desired agent profile for a task, the skill metrics themselves are subject to unreliability. That is, the target skill levels themselves are but an estimate or prediction of the actual skills required. Therefore, it is also possible to estimate the reliability of the target skill level deemed desired. Where the target skill level is low or its estimate unreliable, two separate and distinct parameters, the selected agent may also have a low or unreliably determined skill level for that attribute. On the other hand, where a skill is reliably determined to be high, the agent skill profile should also be high and reliably determined.

In other instances, the metric of skill does not represent a quantitative metric, but rather a qualitative continuum. For example, the optimal speech cadence for each customer may differ. The metric, in this case, represents a speech cadence parameter for an agent. The idea is not to maximize the parameter, but rather to optimize it. Therefore, reliability in this instance does not equate to a reduction in estimated magnitude. It is also noted that a further ancillary parameter may be applied for each skill, that is, tolerance to mismatch. For example, while call received by a call center, for technical support, may seek an agent who is more knowledgeable than the caller is with respect to the problem, but not one who is so far advanced that a communication gap would be apparent. Thus, an optimum skill parameter as well as a range is defined. In like manner, other descriptors of a statistical function or distribution may be employed, for example, kurtosis and skew.

It is noted that there are a number of ways of scoring outcome of a call, and indeed, a number of parallel scoring systems may be employed, although they should be consistently applied; that is, if an agent is selected for handling a call based on one paradigm, care should be employed in scoring the agent or the call outcome using a different paradigm. Such cross analyses, however, may be useful in determining an optimum outcome analysis technique.

When a new matter is to be assigned to an agent, the pool of agents are analyzed to determine, based on the predefined skills, which is the best agent. Selecting the best agent for a task is dependent on a method of scoring outcome, as discussed above. In some instances, there is a relatively simple process. For example, agents entrusted to sell a single product can be scored based on number of units sold per unit time, or the time it takes to close a sale. However, where different products are for sale, optimization may look at different parameters, such as call duration, revenues per call or unit time, profit per call or unit time, or the like. As the variety of options for a user grows, so does the theoretical issues involved in scoring an agent.

It is also possible for agents to engage in an auction; that is, agents bid for a caller. In this case, an agent must be sufficiently competent to handle the call based on the information available, and agents with skills far in excess of those required may be excluded from the bidder pool. For example, agents may be compensated on a commission basis. The bidding may involve an agent bidding a commission rate (up to the maximum allowed). In this way, the employer gets the benefit of competition between agents. The bid, in this instance, may be a manual process entered into by the agent as a prior call is being concluded.

The bid may also be automatically generated at an agent station, based on both objective and subjective factors. See, WO 20050290297, expressly incorporated herein by reference, and Steven M. Hoffberg, 'Game Theory in the Control of Ad Hoc Networks', Wireless Systems Design 2004 (San Diego, March 8). That is, a bid may be automatically defined and submitted on behalf of an agent. The bid may be defined based on an economic or other criteria. In the case of subjective valuation and bidding, the system may produce objectively inefficient outcomes; however, this is not a defect in the system, since it is not being asked to objectively optimize the outcome. On the other hand, a bidder may be presented with information which represents an objective analysis, and thus permit a user to choose to accept an objectively optimized bid, or to choose a different bid. Ideally, the system is "strategyless", and thus the typically desired bid will be the objectively optimal one, but in various circumstances, a user may select a different bid, and therefore likely outcome. Rational basis for this different bid include incomplete information held by an automated processor, collusion, or other errors or factors which cause the subjective bid to rationally differ from that presented automatically. The optimization of agent selection may also be influenced (in either an automated or non-automated implementation) by other factors, such as training opportunities.

Therefore, in determining a cost benefit of selection of a particular agent, a training cost/benefit may also be included.

Thus, according to a simplistic analysis, the agent with the highest score is selected. This is only optimum if we assume that there is uniform incremental cost in selecting each agent, and that the system remains static as a result of the selection. On the other hand, if agent costs differ, or the system status is materially altered on the basis of the selection, or there are extrinsic factors, such as training, then the optimum may also differ. A number of factors may also influence optimality of selection. While most are merely business-based considerations, some may be politically incorrect (bad public policy), or even illegal. For example, an optimization may take into account discrimination on an illegal basis, resulting in harm to either callers or agents within a protected class. That is, a traditionally discriminated-against minority may be subjected to automated and institutionalized discrimination as a result of an algorithm which favors a discriminatory outcome. In fact, the discriminatory outcome may be both efficient and optimal, under an economic or game theory analysis. However, this may be undesired. One way to counteract this is to estimate the discriminatory impact of the algorithm as a whole and apply a global antidiscriminatory factor. While this has the effect of correcting the situation on an overall level, it results in significant inefficiencies, and may result in a redistribution in an 'unfair' manner. Further, the antidiscriminatory factor is itself a form of discrimination.

Another method for approaching this problem is to analyze the profile or skill vectors of the presumably discriminated-against agent or customer classes, and compare this to the corresponding vectors of non-discriminated-against class of agents or customers. Assuming that discrimination occurs on a class basis, then, a corrective factor may be used to normalize components of the vector to eliminate the discriminatory effect.

A further method of remediating the perceived discrimination is through training. In this case, the presumably objective outcome determinations are not adjusted, nor is the 'economic' model for optimal agent selection disturbed. Instead, a mismatch of the skill profile of an agent with the caller is used as an opportunity to modify behavior (presumably of the agent), such that the deficiency is corrected. While the discussion herein generally relates to a set of cooperative agents handling calls from non-cooperative clients, this is not a predicate for use or application of the system and method.

For example, a call center agent may have a characteristically ethnic accent. In one case, the agent accent may be matched with a corresponding caller accent, assuming that data shows this to be optimum. However, assuming that vocal ethnicity relates to socioeconomic status, the result may be that the value of the transaction (or other score value) is associated with this status. The goal would therefore be for the agent to retrain his or her accent, and indeed use a different accent based on an inferred optimal for the caller, or to overcome this impediment by scoring well in transactions involving those other than a 'corresponding' accent. Each of these is subject to modification through agent training. Therefore, it is apparent that the optimization may be influenced by economic and non-economic factors, and the optimization may include objective and subjective factors.

The system may also intelligently analyze and control other aspects of telecommunications besides call routing. For example, it is particularly advantageous to characterize the caller, especially while the call is in the queue. However, increasing the amount of information which must be communicated between the switch control and a high-level system is undesirable, thus limiting the ability to extract low-level information from the caller. Such information may include preferred language, a voice stress analysis, word cadence, accent, sex, the nature of the call (IVR and/or speech recognition), personality type, etc. In fact, much of this information may be obtained through interaction and/or analysis of the caller during the queue period. Further, in some instances, it may be possible to resolve the caller's issues without ever connecting to an agent, or at least to determine whether a personal or automated resolution is preferred. According to an aspect of the invention, the switch itself may control and analyze the interaction with the caller. Advantageously, the switch may further perform a sensitivity analysis to determine which factors relating to the call are most useful with respect to selecting an appropriate agent, and more particularly by limiting this analysis to the agents within the pool which are likely to be available. Further information characterizing the user may also be gathered to construct a more detailed user profile.

It is noted that, in some cases, a caller prefers to remain passive in the queue, while in other instances, the caller would prefer to actively assist in optimizing the experience. This does not necessarily correlate with a universal caller profile, nor the optimal selection of agent. This can be quickly ascertained, for example through IVR. It is further noted that an efficient analysis performed by the switch may differ from an efficient analysis performed or controlled by a high level system. For example, a high level system may employ speech recognition technology for each caller in a queue. The switch, on the other hand, would likely not be able to implement speech recognition for each caller in a large queue internally. Further, since the profile of the caller and the correspondence thereof to the agent skill profile, as well as the correlation to the outcome, is dependent on the selection of characteristics for analysis and outcome metric, the parameters of each, according to the present invention, will also likely differ.

Returning now to the problem of routing a call using an intelligent switch, the condition of optimality in the case of equal incremental cost, a stationary system condition as a result of the selection, and scalar skill parameters having a magnitude correlated to value, is denoted by the formula: $A_n = \max \Sigma(rs_i a_n s_i)$, which denotes that Agent 'n' is selected by maximizing the sum, for each of the required skills $s_i$, of the product of weighting for that skill $rs_i$, and the score for agent n $a_n s_i$.

As stated above, this optimization makes two very important, and not always applicable assumptions. First, more highly skilled agents often earn higher salaries. While, once scheduled, presumably the direct cost is fixed, over the long term, the pool of agents must be adjusted to the requirements, and therefore the selection of an 'expensive' agent leads to increased costs. On the other hand, by preferentially selecting the skilled agent over the unskilled agent, the job experience for the skilled agent may be diminished, leading to agent retention problems. Likewise, the unskilled agent is not necessarily presented with opportunities for live training. Thus, it is seen that the agent cost may therefore be a significant variable.

The formula is therefore modified with a cost function as follows:

$$A_n = \max[Ac_{n1} \Sigma(rs_i a_n s_i) + Ac_{n2}],$$

wherein $Ac_{n1}$ and $Ac_{n2}$ are agent cost factors for agent n. To determine the anticipated cost, one might, for example, divide the daily salary by the average number of calls per day handled by the agent. This, however, fails to account for the fact that the average length of a call may vary based on the type of call, which is information presumed available, since the skill set requirements are also based on a classification of the type of call. Further, an agent highly skilled in some areas may be relatively unskilled in others, making an average call duration or average productivity quite misleading. Another cost to be considered is training cost. Since this is generally considered desirable, the actual value may be negative, i.e., an unskilled trainee may be selected over a highly skilled agent, for a given call, even though the simple incremental agent costs might tend toward a different result. Likewise, selection of an agent for a certain call may be considered a reward or a punishment for good or bad performance, and this may also be allocated a cost function. The key here is that all of these disparate factors are normalized into a common metric, 'cost', which is then subject to numeric analysis. Finally, the optimization may itself evolve the skill sets and cost function, for example through training and reward/punishment. The cost of the 'connection' between a caller and an agent may also be considered, for example in a multi-location call center, or where agents are compensated on a per-call basis.

Another factor to be considered in many cases is anticipated outcome. In some instances, the outcome is irrelevant, and therefore productivity alone is the criterion. On the other hand, in many cases, the agents serve a business purpose, and call outcomes may be graded in terms of achieving business goals. In many instances, the business goal is simple an economic parameter, such as sales volume, profit, or the like, and may be directly computed within a cost function normalized in economic units. On the other hand, some business goals, such as customer satisfaction, must be converted and normalized into economic terms prior to use in an optimization. In any case, the expected outcome resulting from a particular agent may be added as a factor in the cost function.

Another factor to consider in making a selection of an agent in a multi-skill call center is the availability of agents for other calls, predicted or actual. Thus, while a selection of an agent for one matter may be optimal in a narrow context, the selected agent might be more valuable for another matter. Even if the other matter is predicted or statistical, in some instances it is preferred to assign more specialized agents to matters that they can handle, rather than assigning multitalented agents. This is represented as follows:

$$A_n = \max \left( \{[Ac_{n1}\Sigma(rs_i a_n s_i) + Ac_{n2}] + B_{cn}\} + Cc_n \right) + Dc_n ),$$

wherein Bc represents a term for the anticipated change in value of agent n as a result of the selection, Cc represents a term which indicates the anticipated value of the transaction resulting from the selection of agent n, and Dc represents the opportunity cost for allocating agent n to the particular call.

In the case of competing requests for allocation, a slightly different formulation of the problem may be stated. In that case, one might compare all of the cost functions for the matters in the queue with respect to each permissible pairing of agent and matter. Instead of selecting an optimal agent for a given matter, the system selects an optimal pairing of respective multiple agents with multiple matters. In the case of a call center, often the caller hold time is considered a basic criterion for selection. In order to weight this factor, for example, the cost function includes an allocation for caller hold time, and possibly a non-linear function is applied. Thus, a caller may be taken out of order for paring with an optimal agent. In some cases, the variance of a parameter is also considered, in addition to its mean value. More generally, each parameter may itself be a vector, representing different aspects.

It is noted that the various factors used in the system may be adaptive, that is, the predicted values and actual values are compared, and the formula or variables adjusted in a manner which is expected to improve the accuracy of the prediction. Since outcome is generally measured in the same metric as the cost function, the actual cost is stored along with the conditions of the predictive algorithm, and the parameters updated according to a particular paradigm, for example an artificial neural network or the like. Typically, there will be insufficient data points with respect to a system considered static to perform an algebraic optimization.

The present invention provides cost function optimization capabilities at a relatively low level within the call routing system. Thus, for example, prior systems provide relatively high level software, operating on massive customer relations management (CRM) database systems, to seek optimization. On the other hand, according to the present invention, the parameters are supplied in advance, generally in a batch format, to the low level routing and computer integrated telephony (CTI) software, which computes the cost functions. Call outcome data is generally available during and after a call to the high level software, which can then set or adjust values as necessary for the future. It is noted that, generally, the architecture according to the present invention would not generally provide agent scheduling information, since this represents a task separate from the call routing functions. Therefore, known systems which integrate both tasks are typically distinguished from the present invention. However, it would be possible as a separate process for this to be performed on the telephony server according to the present invention. More generally, the updating of agent skill tables or a database, and agent scheduling and call center management, are performed on high level systems which are discrete from the telephony server. These systems typically access large databases, generate reports, and integrate many different functions independent of the communications functions.

The advantage of a preferred architecture according to the present invention is that when a call is received, it can be routed in real time, rather than after a possibly significant delay. Further, this data processing partition reduces data communications bandwidth requirements and reduces transactional load on the CRM system. In addition, this architectural partition reduces the need for the CRM system to be involved in low level call management, and reduces the need for the CTI software to continually interact with the high level CRM software. This, in turn, potentially allows use of simple architecture CTI platforms using standard operating systems.

According to a preferred embodiment, the matter skill requirements, agent skill data, and other parameters, are provided to the CTI software, for example as an ASCII table. The CTI software may, for example, invoke a subprocess for each call received or in the queue, to determine the then-optimum agent selection, for a local optimization, i.e., a selection of the optimal agent without regard for the effect of this selection on other concurrent optimizations. In order to globally optimize, the processing is preferably unitary. As conditions change, for example, further calls are added to the queue, or calls are completed, the optimizations may be recomputed.

For example, in a call center with 500 agents, each classified with respect to 32 skills, with an average of 2000 calls in the queue, with about 50 agents available or anticipated to be available at any given time, the computational complexity for each optimization is on the order of $160 \times 10^6$ ($2000 \times 50 \times 50 \times 32$) multiplies, generally of 8 bit length. A 2 GHz Pentium 4 processor, for example, is capable of theoretical performance of about 2400 MFLOPS. Using a simplified calculation, this means that less than about 10% of the raw capacity of this processor would be required, and more powerful processors are being introduced regularly. For example, a 3.06 GHz Pentium 4 processor with 'hyperthreading' has recently been introduced. In fact, in real-world situations, the processor would likely not be able to achieve its benchmark performance, but it is seen that a single modern processor can handle, in near real time, the required processing. Coprocessing systems are available which increased the processing capability, especially with respect to independent tasks, while allowing all processes to be coordinated under a single operating system. For example, Microsoft Windows and Linux both support multiprocessing environments, in case increased processing capacity is required. On the other hand, if a high level CRM system is interrupted to process each call event to globally reoptimize agent selection, and communicate this with the CTI software, a significant communication and transaction burden would be encountered. Thus, the present invention proposes that the skill-based call routing algorithm be executed in conjunction with the low level CTI process, as an integral part of the call routing function. Likewise, other call-process related algorithms may be implemented, in addition to or instead of a call routing calculation.

Advantageously, for example in many non-adaptive systems, no high level CRM system is required, and the entire skill-based routing functionality may be implemented in the CTI system, saving significant hardware expense and software complexity. Thus, where the cost function is relatively simple to calculate, the skills required for the call and the skills of each respective agent well known and relatively constant, a simple database may be provided for the CTI platform to route calls intelligently.

Another aspect of the invention provides optimization of communications management based on adaptive parameters, e.g., not only on the existing skills of the respective agents, but rather also based on an anticipated or predicted change in the agent's skills as a result of handling the call. Likewise, when considering an overall cost function for optimizing call directing, any variety of factors may be considered within its context. Therefore, it an another object to provide a consolidated cost function for communications management, wherein pertinent factors or parameters are or may be expressed in common terms, allowing unified consideration. According to a preferred embodiment of the invention, this is handled at a low level within the communications management system, although various aspects may be handled in real time or otherwise at various levels of the communications management system.

In the case of real time communications, such as traditional voice telephony, the switching must by definition occur in real time, so must the resolution of the parties to the communication. Therefore, another aspect of the invention involves communications and coordination in real time of the various system components, including the low level system. Preferably, the data upon which an optimization is based is available locally to the low level system before a real time communication is received, so that external communications to resolve the target are minimized. In some cases, communications with other system components will still be required, but preferably these do not require essentially non-deterministic systems to respond prior to resolution.

Another aspect of the invention seeks to optimize long term call center operations, rather than immediate efficiency per se. Thus, at various times, the system performs functions which are different or even opposite the result expected to achieve highest short term efficiency. Preferably, however, during peak demand periods, the system assures high short term efficiency by switching or adapting mode of operation.

Therefore, according to the present invention, a number of additional factors are applicable, or the same factors analyzed in different ways, beyond those employed in existing optimizations. Since most call centers are operational for extended periods of time, by analyzing and optimizing significant cost factors beyond those contemplated by the prior art, a more global optimization may be achieved.

In a service environment, the goal is typically to satisfy the customer at lowest cost to the company. Often, this comes through making a reasonable offer of compromise quickly, which requires understanding the issues raised by the customer. Delay leads to three costs: the direct and indirect operations cost; the possibility of increased demands by the customer (e.g., impaired business marginal utility of the communication); and the customer satisfaction cost.

In technical support operations, the agent must understand the technical issues of the product or service. The agent must also understand the psychology of the user, who may be frustrated, angry, apologetic, or even lonely. The agent must often remotely diagnose the problem, or understand the information provided by the caller, and communicate a solution or resolution.

In some instances, these seemingly abstract concepts are represented in relatively basic terms at the communications server level. For example, the cadence of a speaker may be available by a simple analysis of a voice channel for silence and word rate. Stress may also represented in a spectral analysis of voice or in other known manner. Alcoholism or other impairment may be detected by word slurring, which may also be detected by certain signature patterns in the voice pattern.

It is noted that, in some instances, the skill related parameters are not independent. That is, there is a high cross correlation or other relationship between the parameters. In other instances, there are non-linearities in the process. A simple summing of magnitude times weight for these parameters may introduce errors. Therefore, a more complex algorithm may be employed, without departing from the spirit or scope of the present invention.

Likewise, for each caller profile class, a different optimization may be employed. There are some traits, such as alcoholism, which may alter the optimal selection of agent, all other thing being equal.

Therefore, communications routing on seemingly sophisticated or abstract concepts may be efficiently handled at a low level without interrupting the basic call processing functions or requiring non-standard hardware. In this sense, 'non-standard' refers to a general purpose type computing platform performing the communications routing functions. In fact, efficiency is generally enhanced according to the present invention by avoiding the need for remote communications of the call parameters and the resulting communications and processing latencies. Of course, in certain tightly coupled environments, the target resolution may be performed on a physically separate processor or system from the low level call processing, without deviating from the essential aspects of embodiments of the invention.

In many cases, the caller characteristics and issues will often have a significant effect on the duration of the call. While, in general, more skilled agents will have a higher productivity, in some cases, the caller restricts throughput. Therefore, even though the agent is capable of completing the call quickly, the caller may cause inordinate delays. According to the present invention, through a number of methods, the caller characteristics are determined or predicted, and an appropriate agent selected based on the anticipated dynamic of the call. Thus, for example, if the anticipated call duration for a successful outcome, based on the caller characteristics is a minimum of 5 minutes (depending on the agent), then an agent who is likely to complete the call in about 5 minutes may be selected as the optimum; agents who would be able to complete the call within 4 minutes, while technically more productive, may have little impact on the actual call duration, and thus would be inefficiently employed. Likewise, an agent anticipated to complete the call in 6 minutes might be deemed inefficient, depending on the availability of other agents and additional criteria. The call may be selected as a training exercise. In this case, an agent is selected for training whom would be expected to operate with a certain degree of inefficiency to complete the call. In some cases, unsupervised training is instituted. In other cases, a training agent (or automated system) is allowed to shadow the call, providing assistance, instruction and/or monitoring of the trainee agent during the call. In this case, it would be anticipated that the call duration would be greater than 5 minutes, due to the training nature of the call. Further, the required trainer assistance further reduces immediate efficiency. However, as the agents in the pool become more skilled, long term efficiency increases.

Preferably, these characteristics are extracted through an analysis, by the communications control system, of the available data, although where appropriate, reference to higher level systems may be performed. Thus, in an interactive voice (or key) response system, there may be sufficient time and resources available to query a high level system for data or request analysis relating to a call. However, in many instances, significant analysis may be performed using the computing resources and information available to the low level communication processing system. Even where the information is not available, a DNIS or other type of lookup may provide this information based on a relatively simple query.

More highly skilled agents are both worth more and generally command higher compensation. A program which trains agents internally is either required, due to lack of specific external training programs, or is cost effective, since new hires can be compensated at a lower rate than trained and experienced hires. Thus, for long-term operations, there is an incentive to train agents internally, rather than seeking to hire trained agents. Therefore, according to another aspect of the invention, such training, past present and/or future, is monetized and employed in optimization of a cost function.

Agents may receive additional compensation for training activities, either for their training activities, performance based compensation based on the improvement of their trainees, or both. Thus, there is an incentive for agents to become skilled and to assist in the training. As a result, the average skill level and uniformity in a call center will increase. However, since the optimal skill palette within a call center typically is a moving target, the training process will never cease.

Often, live interaction is an important component of training. Therefore, a significant component of the training encompasses interaction with callers in real-world situations. Training often involves presenting agents with new challenges and experiences in order to assure breadth of exposure.

According to prior skill-based routing schemes, an agent skill level is considered a static upper limit on capabilities, and the ACD avoids distributing calls to agents below a threshold. Agents may be called upon to serve requests within their acknowledged skill set. Likewise, this allows a simple and discrete boundary condition to be respected in the optimization according to the present invention.

On the other hand, according to some embodiments of the present invention, each call is considered a potential training exercise, in order to expand the capabilities of the agent, and therefore the boundary is not concretely applied. Therefore, to the extent that the nature of the call can be determined in advance, the incentive according to this scheme is to route the call to an agent who is barely capable of handling the call, and to avoid routing only to the best available agents. This strategy has other implications. Because agents are challenged continually, there is reduced incentive for an agent to limit his skills to avoid the 'tougher' assignments. Further, a self-monitoring scheme may be implemented to determine the status of an agent's skill with each call. For example, agent performance is typically determined on a call-throughput basis, since call centers are managed on a man-hour requirement basis and agents compensated on a per-hour basis. Therefore, based on a presumed agent skill set and an estimation of the skills required for a given call, a call duration may be predicted. The actual duration is then compared with the predicted duration, providing a performance metric for the agent.

This scheme also allows determination of the pertinent factors for call duration, both based on the information about the call or caller and the skill set of the agent. Thus, a variety of low-level data may be collected about a volume of calls, which may be statistically or otherwise analyzed to determine significant relations. For example, an artificial neural network or fuzzy-neural network may be implemented based on the data, which may then be automatically analyzed based on the independent criteria, e.g., call duration, cost function, or the like.

It is noted that, during peak demand periods, reduced productivity due to training exercises is preferably minimized. Thus, as demand increases, high skill set agents are preferably reassigned from training to most-efficient operational status, while lower skill set agents are assigned to calls well within their capabilities. Thus, during such peak demand periods, the staffing requirement will generally be no worse than traditional call centers. On the other hand, since training is integrated with operations, over a period of time, the average skill of all agents will increase. Thus, more skilled agents will be available at peak periods, reducing overall staffing requirements over a long term due to an expected decrease in average call duration and increase in agent productivity.

According to this embodiment of the invention, it is less critical to perform the call routing resolution in the low level system, since the real time criteria is not particularly limited by processing and communication latencies. On the other hand, corresponding skill routing functions may be performed by the communications processing system for both outbound and inbound communications, thus permitting a simplification of the external supporting systems.

An embodiment of the present invention provides an Internet Protocol based communications architecture, permitting geographically dispersed physical communications locations to act as a single coordinated entity. In order to centrally manage a queue, the various pieces of information must be available for processing. As noted above, an interactive optimization may require a real time comparison of all available agents. In this architecture, in cases of an ad hoc organization or peak demand periods, freelance agents may be called upon dynamically as required. Thus, if a peak demand period is much shorter than an agent shift, off-site freelance agents may be dynamically called upon, for example through the Internet, ISDN, POTS, DSL, Cable modem, or a VPN, to handle calls. In this case, the optimal training of such off-site or freelance agents will generally differ from those who are in-house agents. For example, if freelance agents are called upon only during peak demand periods, these agents will be trained specifically for the skills in short supply during such periods, or for generic skills which are commonly required.

In order to gage the skill set required of an agent for a call, a number of methods may be employed. Using a menu or hierarchal menu, a series of questions may be asked of callers in the queue to determine the identity of the caller and the nature of the call. Likewise, ANI/DNIS information, IP address or the like, or other communications channel identifier may be employed to identify the calling telephone communications channel. This information may directly indicate the characteristics or desired characteristics of the communication, or be used to call an external database record associated with the identity of the caller or communications channel. While it is possible to associate such a database closely with the low level communications processing system, this is not generally done, since it may impair the deterministic characteristics of the communications processing system. Rather, if such information is required by the low level communications system for resolution, and cannot be stored locally in a data table, it is preferred that it be available through a closely coupled, but independent system. As discussed above, it is preferred that a call entering the queue require no more than a single database query and receipt of response prior to action, although other non-time critical access may occur both before and after action. The prior art, on the other hand, generally provides such information through independent and generally high level systems. High level systems are generally characterized by general purpose interfaces, broad range of functionality, and often a communications protocol having a rich and complex grammar. On the other hand, tightly coupled systems can often forgo extensibility and interoperability in favor of efficiency.

In many instances, call centers are implemented to provide support for computer systems. It is known to provide a message automatically generated by a computer to identify and report the status of the computer at a given time, and possibly the nature of a computer problem. One aspect of the present invention allows this message to be associated with a direct semantic communication session with the user, for example to predefine the nature of the call and possibly the skill set required to address the issues presented. Thus, for example, a caller may be prompted to specify information of particular relevance in the routing process, while not being prompted for information irrelevant to the selection. For example, if only one agent is available, the entire prompting process may be bypassed. If two agents are available, their profiles may be analyzed, and only the most critical distinctions probed. This entire process may be handled in the low level communications processing system, without substantial loss of efficiency or throughput in that system, and with substantial gains in overall architectural efficiency.

Often, a highly skilled agent will serve as mentor for the trainee, and 'shadow' the call. Thus, the routing of a call may depend on availability of both trainee and skilled instructor. This dual-availability checking and pairing may be performed in the low level system.

Another aspect of call center efficiency impacted by this scheme is agent motivation. Because an agent with lower skill levels will be given assignments considered challenging, while more skilled agents given training assignments which may be considered desirable, there is an incentive for agents to progress, and likewise no incentive to avoid progressing. Thus, an agent will have no incentive to intentionally or subliminally perform poorly to avoid future difficult skill-based assignments. These factors may be accommodated in a cost function calculation, for example with an update of the agent vector after each call based on call characteristic vector, call outcome and duration, chronological parameters, and the like.

In operation, the system works as follows. Prior to call setup, the nature of the call is predicted or its requirements estimated, as well as the prospective issues to be encountered. This may be performed in standard manner, for example in an inbound call based on the number dialed, based on the ANI/DNIS of the caller (with possible database past history lookup), selections made through automated menus, voice messages, or other triage techniques. In the case of outbound calls, a database of past history, demographic information (both particular to the callee and for the region of the call), and nature of the call may all be used to determine the projected agent skill set required for the call. Alternately, only parameters available locally to the communications control system are employed, which, for example, may exclude a past history database lookup. Collaborative filtering may be used to assist in inferring a profile of a remote user.

It is noted that, after initial call setup, the actual skill set required may become apparent, and the call may be rerouted to another agent. For example, this may be performed at a high level, thus permitting correction of errors or inappropriate selections made by the low level system.

Once the predicted skill sets are determined, these are then compared against a database of available agents and their respective skill sets. A weighting is applied based on perceived importance of selection criteria, and the requirements correlated with the available agent skill sets.

When the call center is operating below peak capacity, marginally acceptable agents may be selected to receive the call, possibly with a highly acceptable agent available if necessary for transfer or handoff or to monitor the call. When the call center is operating near peak capacity, the agents are assigned to minimize the anticipated man-hour burden (throughput) and/or wait time. Thus, peak throughput operation generally requires that agents operate within their proven skill sets, and that training be minimized.

Each call is associated with a skill expression that identifies the skills that are relevant to efficient handling of the call. As previously noted, the preferred embodiment is one in which more than one relevant skill is identified, so that all of the factors that determine a 'best' agent for handling a call can be considered. This is expressed, for example, as a call characteristic vector. The relevant skills required may be determined using different techniques.

The skill expression of a call includes the required skills and skill levels for efficiently handling the call. In one embodiment, the skills may be divided into two categories: mandatory and optional skills. Mandatory skills are those skills that an agent must possess in order to handle the call, even if the call remains in queue for an extended period of time. For example, language proficiency is often a mandatory skill for handling a call. Optional skills are those that are considered in the selection of the appropriate agent, but not critical. In operation, these mandatory skills are expressed as a high relevance rating with respect to a call characteristic having a non-linear (e.g., binary or sigmoid) characteristic. Therefore, in the absence of exceptional circumstances, other factors for qualified agents will determine resolution. Alternately, the mandatory skills may be specified as a pre-filter, with optional skills and cost function expressed through linear-type equations.

It is noted that the peak/non-peak considerations may be applied on a call-by-call basis. Thus, certain callers may be privileged to have a shorter anticipated wait and greater efficiency service than others. Thus, these callers may be treated preferentially, without altering the essential aspects of the invention.

The present invention may also generate a set of reports directed to management of the call center. Typically, the communications server generates a call log, or a statistically processed log, for analysis by a higher level system, and does not generate complete, formatted reports itself. The quality of service reports are generated to indicate the effectiveness of the call-management method and system. An agent summary report is organized according to the activities of particular individuals, i.e. agents. A skill summary report organizes the data by skill expressions, rather than by agents. This report may list the number of calls requiring selected skill expressions and the average time spent on those calls. Other known report types are also possible. An important report type is the improvement in call center efficiency over time, i.e., decreased wait time, increased throughput, increased customer satisfaction, etc. Thus, each agent should demonstrate improved skills over time. Peak throughput should meet or exceed reasonable expectations based on a statically skill-routed call center. Other metrics may also be evaluated. Such reports are typically not generated from low level communications systems, and are considered an inventive feature.

It is therefore an object of the invention to provide a communications control system comprising an input for receiving a call classification vector, a table of agent characteristic vectors, and a processor, for (a) determining, with respect to the received call classification, an optimum agent selection based on at least a correspondence of said call classification vector and said table of agent characteristic vectors, and (b) controlling a call routing of the information representing said received call in dependence thereon. It is a further object of the invention to provide a system wherein the process maintains a table of skill weights with respect to the call classification, and applies said weights to determine an optimum agent selection.

Another object of the invention is to provide a communications control system for handling real time communications, wherein an integral system resolves a communications target based on an optimizing algorithm and establishes a communications channel with the resolved communications target.

A further object of the invention provides a communications method comprising receiving a call, classifying the call to determine characteristics thereof, receiving a table representing characteristics of potential targets, determining an optimum target based on the characteristics of both the call and the potential targets, and routing the received call to the optimum target, the determining step and the routing step being performed by a common platform.

A still further object of the invention provides a communications control software system, comprising a multi-threaded operating system, providing support for applications and for passing messages between concurrently executing applications, a communications control server application executing under said multithreaded operating system, for controlling real time communications, and at least one dynamically linkable application, executing under said multithreaded operating system, communicating with said communications control server application to receive call characteristic data and transmit a resolved communications target.

Another object of the invention provides a method of determining an optimum communications target in real time, comprising receiving a communication having an indeterminate target, selecting an optimum target, and establishing a channel for the communication with the optimum target, wherein said selecting and establishing steps are performed on a consolidated platform.

It is a further object of the invention to provide a communications processing system for directly establishing and controlling communications channels, receiving information regarding characteristics of a preferred target of a communication, comparing the characteristics with a plurality of available targets using an optimizing algorithm, and establishing the communication with the target in dependence thereon.

It is another object of the invention to provide a method of selecting a call handling agent to handle a call, comprising the steps of identifying at least one characteristic of a call to be handled; determining a call center load, and routing the call to an agent in dependence on the characteristic, call center load, and agent characteristics.

A further object of the invention provides a method optimizing an association of a communication with an agent in a communications center, comprising the steps of determining a characteristic of a communication; accessing a skill profile of a set of agents; cost-optimizing the matching of the communication with an agent based on the respective skill profile, and routing the call to a selected agent based on said cost-optimization with a common system with said optimizing.

An object of the invention also includes providing a method for matching a communication with a communication handler, comprising the steps of predicting a set of issues to be handled during the communication; accessing a profile record for each of a plurality of communications handlers; analyzing the profile records with respect to the anticipated issues of the communication to determine a minimal capability; selecting an optimum communication handler; and controlling the communication, all controlled within a common process.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

The present invention improves efficiency, and facilitates use of communications resources which are special purpose, especially with respect to cost, specialization, and/or skill set, within an automated process.

BRIEF DESCRIPTION OF THE DRAWINGS

For a more complete understanding of the present invention and the advantages thereof, reference should be made to the following Detailed Description taken in connection with the accompanying drawings in which:

FIGS. 3, 4, 5, and 6 show tables representing analysis of 5 agents with 10 skill scores;

FIG. 7 shows a combinatorial analysis of agents versus callers with respect to the data of FIG. 5;

FIG. 8 shows a table representing analysis of 5 agents, 5 rule vectors, and 10 skill scores; and FIG. 9 shows a combinatorial analysis of agents versus callers with respect to the data of FIG. 8.

DETAILED DESCRIPTION OF THE PREFERRED EMBODIMENTS

The Detailed description of the invention is intended to describe relatively complete embodiments of the invention, through disclosure of details and reference to the drawings. The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been completely described in detail so as not to obscure the invention. However, many such elements are described in the cited references which are incorporated herein by reference, or as are known in the art.

For each agent, a profile is created based on manual inputs, such as language proficiency, formal education and training, position, and the like, as well as automatically, based on actual performance metrics and analysis, and used to create a skills inventory table. This process is generally performed in a high level system, such as a customer relations management system or human resources management system. A profile thus represents a synopsis of the skills and characteristics that an agent possesses, although it may not exist in a human readable or human comprehensible form.

Preferably, the profile includes a number of vectors representing different attributes, which are preferably independent, but need not be. The profile relates to both the level of ability, i.e. expertise, in each skill vector, as well as the performance of the agent, which may be a distinct criterion, with respect to that skill. In other words, an agent may be quite knowledgeable with respect to a product line, but nevertheless relatively slow to service callers. The profile, or an adjunct database file, may also include a level of preference that call management has for the agent to handle transactions that require particular skills versus transactions that require other skills, or other extrinsic considerations.

This table or set of tables is communicated to the communications server. Typically, the communications server does not create or modify the agent skills table, with the possible exception of updating parameters based on immediate performance. For example, parameters such as immediate past average call duration, spoken cadence, and other statistical parameters of a call-in-progress or immediately past concluded will be available to the communications server. These parameters, which may vary over the course of a single shift, may be used to adaptively tune the profile of the agent in real time. Typically, however, long term agent performance is managed at higher levels.

Figure 1:
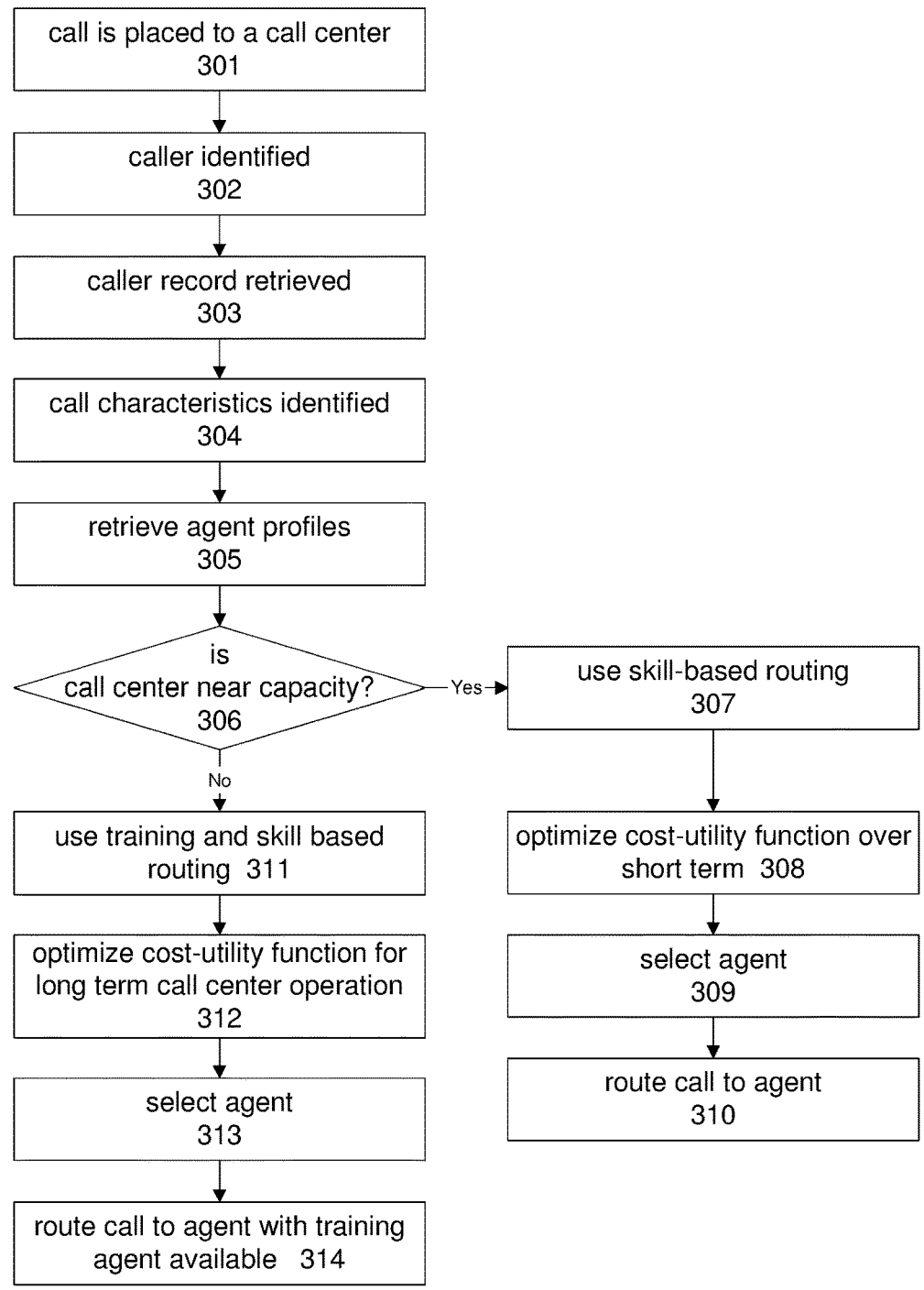
FIGS. 1 and 2 are flow charts showing a skill routing method according to the present invention.
Figure 2:
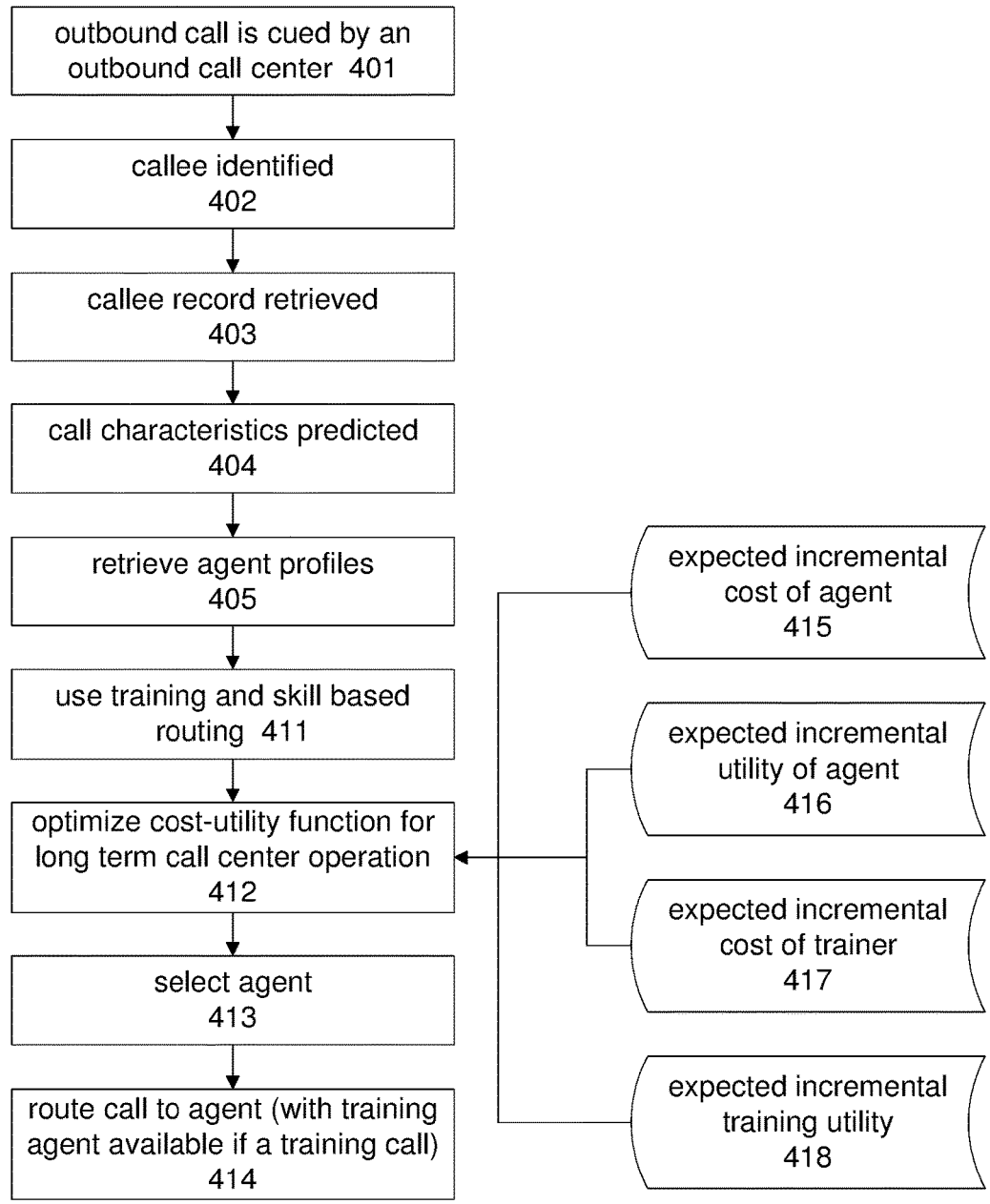

FIG. 1 shows a flow chard of an incoming call routing algorithm according to a preferred embodiment of the present invention. A call is placed by a caller to a call center 301. The call is directed, through the public switched telephone network, although, calls or communications may also be received through other channels, such as the Internet, private branch exchange, intranet VOIP, etc. The source address of the call, for example the calling telephone number, IP address, or other identifier, is received to identify the caller 302. While the call is in the waiting queue, this identifier is then used to call up an associated database record 303, providing, for example, a prior history of interaction, a user record, or the like. The call waiting queue may be managed directly by the telephony server. In this case, since the caller is waiting, variable latencies due to communications with a separate call management system would generally not interfere with call processing, and therefore may be tolerated. In other instances, an interactive voice response (IVR) system may be employed to gather information from the caller during the wait period.

In some instances, there will be no associated record, or in others, the identification may be ambiguous or incorrect. For example, a call from a PBX wherein an unambiguous caller extension is not provided outside the network, a call from a pay phone, or the like. Therefore, the identity of the caller is then confirmed using voice or promoted DTMF codes, which may include an account number, transaction identifier, or the like, based on the single or ambiguous records.

During the identity confirmation process, the caller is also directed to provide certain details relating to the purpose of the call. For example, the maybe directed to 'press one for sales, two for service, three for technical support, four for returns, and five for other'. Each selected choice, for example, could include a further menu, or an interactive voice response, or an option to record information.

The call-related information is then coded as a call characteristic vector 304. This call characteristic is either generated within, or transmitted to, the communications server system.

Each agent has a skill profile vector. This vector is developed based on various efficiency or productivity criteria. For example, in a sales position, productivity may be defined as sales volume or gross profits per call or per call minute, customer loyalty of past customers, or other appropriate metrics. In a service call, efficiency may be defined in terms of minutes per call, customer loyalty after the call, customer satisfaction during the call, successful resolution of the problem, or other metrics. These metrics may be absolute values, or normalized for the agent population, or both. The skill profile vector is stored in a table, and the profiles, which may be updated dynamically, of available or soon to be available agents, are accessed from the table (database) 305.

Typically, the table 305 is provided or updated by a high level call center management system to the communications server system as the staffing assignments change, for example once or more per shift. Intra-shift management, such as scheduling breaks, may be performed at a low or high level.

The optimization entails analysis of various information, which may include the caller characteristics, the call incident characterization, availability of agents, the agent profile(s), and/or various routing principles. According to the present invention, the necessary information is made directly available to the communications server, which performs an optimization to determine a 'best' target, e.g., agent selection, for the caller.

For example, if peak instantaneous efficiency is desired, for example when the call center is near capacity 306, more advanced optimizations may be bypassed and a traditional skill based call routing algorithm 307 implemented, which optimizes a short term cost-utility function of the call center 308. An agent who can 'optimally' handle the call is then selected 309, and the call routed to that agent 310. The global (e.g., call center) factors may be accounted as a separate set of parameters.

Thus, in order to immediately optimize the call routing, the general principle is to route the call such that the sum of the utility functions of the calls be maximized while the cost of handling those calls be minimized. Other types of optimizations may, of course, be applied.

According to one optional aspect of the invention, the various routing principles discussed above explicitly value training as a utility of handling a call 311, and thus a long-term optimization is implemented 312. The utility of caller satisfaction is also weighted, and thus the agent selected is generally minimally capable of handling the call. Thus, while the caller may be somewhat burdened by assignment to a trainee agent, the call center utility is maximized over the long term, and call center agents will generally increase in skill rapidly.

In order for the communications server system to be able to include these advanced factors, they must be expressed in a normalized format, such as a cost factor.

As for the cost side of the optimization, the cost of running a call center generally is dependent on required shift staffing, since other costs are generally constant. Accordingly, a preferred type of training algorithm serves to minimize sub-locally optimal call routing during peak load periods, and thus would be expected to have no worse cost performance than traditional call centers. However, as the call center load is reduced, the call routing algorithm routes calls to trainee agents with respect to the call characteristics. This poses two costs. First, since the trainee is less skilled than a fully trained agent, the utility of the call will be reduced. Second, call center agent training generally requires a trainer be available to monitor and coach the trainee. While the trainer may be an active call center agent, and therefore part of the fixed overhead, there will be a marginal cost since the trainer agent might be assuming other responsibilities instead of training. For example, agents not consumed with inbound call handling may engage in outbound call campaigns.

It is clearly apparent that the communications server system will have direct access to call center load data, both in terms of availability of agents and queue parameters.

Thus, in a training scheme, an optimization is performed, using as at least one factor the value of training an agent with respect to that call 312, and an appropriate trainee agent selected 313.

In order to provide proper training, the trainer and trainee must both be available, and the call routed to both 314. Generally, the trainee has primary responsibility for the call, and the trainer has no direct communication with the caller. Therefore, the trainer may join the call after commencement, or leave before closing. However, routing a call which requires two agents to be simultaneously available poses some difficulties. In general, the trainer is an agent capable of handling the entire call alone, while the trainee may not be. Therefore, the trainer is a more important participant, and the initial principle in routing the training call is to ensure that a trainer is available. The trainer may then await availability of an appropriate trainee, or if none is imminently available, handle the call himself or herself.

On the other hand, where a specific training campaign is in place, and a high utility associated with agent training, then the availability of a specific trainee or class of trainees for a call having defined characteristics is particularly important. In that case, when an appropriate trainee is available, the call held in that agent's cue, and the call possibly commenced, awaiting a training agent's availability.

If the training is highly structured, it is also possible to assign the trainer and trainee agents in pairs, so that the two are always available for calls together.

The system according top the present invention may also provide reinforcement for various training. Thus, if a subset of agents receive classroom training on a topic, the server may target those agents with calls relating to that topic. For example, the topic may represent a parameter of a call characterization vector. In order to target certain agents for calls having particular characteristics, a negative cost may be applied, thus increasing the probability that the agent will be selected, as compared with an agent having a positive cost. By using a single cost function, rather than specific override, the system becomes resilient, since this allocation is not treated as an exception, and therefore other parameters may be simultaneously evaluated. For example, if a caller must communicate in a foreign language, and the agent does not speak that foreign language, then the system would not target the call to that agent, even if other factors weigh in favor of such targeting.

The same techniques are available for outbound campaigns and/or mixed call centers. In this case, the cost of training is more pronounced, since agents idle for inbound tasks are generally assigned to outbound tasks, and thus the allocation of trainer agents and trainee agents generally results in both longer call duration and double the number of agents assigned per call. This cost may again be balanced by avoiding training during peak utility outbound calling hours and peak inbound calling hours; however, training opportunities should not be avoided absolutely.

According to one embodiment of the invention, at the conclusion of a call, the caller is prompted through an IVR to immediately assess the interaction, allowing a subjective scoring of the interaction by the caller without delay. This information can then be used to update the stored profile parameters for both caller and agent, as well as to provide feedback to the agent and/or trainer. Under some circumstances, this may also allow immediate rectification of an unsatisfactory result.

Example 1

Each agent is classified with respect to 10 skills, and each skill can have a weight of 0 to 127. The skill weights may be entered manually by a supervisor, developed adaptively, or provided by other means. These are sent as a parameter file to the communications server.

A rule vector specifies a normalized contribution of each skill to apply to the total. This rule vector, for example, represents the call characteristic vector. Thus, attributes of the call and the status of the system are analyzed to generate this rule vector. There can be more than one rule vector defined in a project (split), or a rule can be setup in a per call basis. Generally, routing with predefined rules is much more efficient than routing with rules in a per call bases. When a call needs to be routed to an agent, the rule vector is applied to the skills of the available agents and a score is derived for each agent. The agent with the highest score is assigned the call.

As shown in FIG. 3, Agent 1 would be selected, since this is the highest score.

In this example, it is presumed that all selections have the same cost, and therefore the utility only varies. Thus, the agent with the highest utility function is the optimal selection.

Example 2

The conditions below are the same as in Example 1, except two new factors are provided, Ac1 and Ac2. The Preliminary Score is calculated as the sum of the products of the Rule Vector and the Agent Vector. The Final Score is calculated as (Ac1×sum)+Ac2.

In this case, Ac1 represents an agent-skill weighting cost function, while Ac2 represents an agent cost function. Since we select the maximum value, more expensive agents have correspondingly lower cost values.

As can be seen, in FIG. 4, Agent 5 is now optimum.

Example 3

In this example, a limiting criterion is imposed, that is, only agents with a skill score within a bound are eligible for selection. While this may be implemented in a number of ways, possibly the simplest is to define the range, which will typically be a lower skill limit only, below which an agent is excluded from selection, as a preliminary test for 'availability'.

As shown in FIG. 5, the screening criteria may be lower, upper or range limits. In this case, the screening process excludes agents 2, 3, and 5, leaving agents 1 and 4 available. Of these two choices, agent 1 has the higher score and would be targeted.

Example 4

In this example, the optimization seeks to optimize the placement of 5 incoming calls to 5 agents. As shown, each caller is represented by a different call vector, and each agent by a distinct skill vector. The optimization therefore seeks the maximum utility from the respective possible pairings.

Using a combinatorial analysis, the maximum value is 62.42, which represents the selection of agent 1/caller 1; agent 2/caller 5; agent 3/caller 4; agent 4, caller 2; and agent 5, caller 3. See FIGS. 6 and 7.

Example 5

Similarly to Example 4, it is also possible to include an agent cost analysis, to provide an optimum cost-utility function. As in Example 2, the cost factors (CF) are reciprocal, since we select the largest value as the optimum. Likewise, time factors (TF) are also reciprocal, since we seek to minimize the time spent per call. In this case, the cost analysis employs three additional parameters: the agent cost, a value representing the cost of the agent per unit time; a value representing an anticipated duration of the call based on the characteristics of the caller; and a value representing the anticipated duration of the call based on characteristics of the agent.

As can be seen in FIGS. 8 and 9, the maximum value is 314.78, which corresponds to a selection of:

Agent 1/Call 5; Agent 2/Call 1; Agent 3/Call 4; Agent 4/Call 2; and Agent 5/Call 3.

Therefore, it is seen that the optimum agent/caller selection is sensitive to these cost factors.

It is also seen that, while the analysis can become quite complex, the formulae may be limited to evaluation of simple arithmetic functions, principally addition and multiplication, with few divisions required. Thus, these calculations may be executed efficiently in a general purpose computing environment.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

Example 6

Geographic information may be used as a basis for communications routing. Mobile phones are or will be capable of geolocation, meaning that the location of the handset may be automatically determined in real time and communicated. Likewise, a location of landlines can typically be determined. There are a number of instances where this information may then advantageously be used to route calls. For example, a call to a national pizza delivery chain toll free number or central facility may be automatically routed to a geographically proximate local franchisee, or, if a number are available, to one of a qualified group. It is noted that while the communications are preferably voice communications, other type of communications may be supported.

However, it is also possible to perform evaluation of more complex algorithms in order to determine a set of communications partners. For example, a geographic factor, a past history, and/or user profile may be available to describe the caller. This information may provide, for example, a preferred language, a contact report (identifying likely issues), demographic information, and user personality (as determined from a prior communication). Likewise, an interactive voice or keypad response system can glean further information to determine the issues involved in the call. Using this information, a vector may be provided describing the caller and the likely issues of the call, which may then be used to optimize a targeting of the call to available recipients. The maintenance of vectors to describe available call targets is described above.

In cases where multiple recipients are available and have, within a reasonable range, equivalent or super-threshold qualifications or suitability to receive the call, it may be appropriate for the potential recipients to compete for the call. That is, the optimization of targeting (e.g., pairing of a caller and callee) includes an economic component, optionally with a non-economic component. For example, the potential recipients each submit a bid for the call, with the call being routed to the auction winner (which may be a payment to or from the recipient, depending on the circumstances of the auction) at, for example, a first or second price, according to the auction rules.

In a typical case, the routing server has a direct and prearranged financial arrangement with the bidders, and the auction process does not directly involve the caller. On the other hand, other cases allow the caller to be involved in the auction as a 'buyer' or 'seller', with the communications router serving only in the capacity of auctioneer, and not a principal to the auction.

In cases where the potential recipients do not all have equivalent qualifications, a normalization function may be applied to correct the bids. For example, a potential recipient with a 60% match with the required qualification profile might have to bid 50% more than a potential recipient with a 90% match, assuming that the matching function linearly corresponds with an economic factor; otherwise, a non-linear normalization may be applied. This is equivalent to providing that the value applied to determine the auction winner includes a component representing an economic value and a component representing a non-economic value, e.g., a match or optimality score for the call, which is determined for each bidder to determine the winner. The bidder in this case may either have knowledge of the match score, or may bid blind.

In a commission based system, for example, an agent with a higher sales average performance might have to bid a lower amount than an agent with lower performance, the difference being an amount which tends to equalize (but not necessarily completely equalize) the anticipated payoff from the call, thus incentivizing higher sales performance. In any case, the communications router (or a separate system which communicates with the communications router in some embodiments) evaluates the bids including both economic and non-economic components, determines the winning bidder, and determines the communications path(s).

In another embodiment, a group of agents within a call center have performance goals for a shift, with possible gradation between agents of the goals based on compensation, seniority, etc. The agents are within a queue, in which the default is a sequential selection of available agents. However, an agent may seek to take a break, and therefore bids for a lower position within the queue. Likewise, an agent may find him or herself behind in performance, and wish to bid for higher placement within the queue. As discussed above, the bid cost or perturbation effect may be normalized based on a variety of factors and schemes, including the optimality of matching. In this scheme, the auction may be economic or non-economic. In a non-economic scheme, each agent is provided with a set of bid units, for example 100 per shift. The bid units may then be applied to advance within the queue, or even traded with another agent (although this possibility leaves open the issue of undesired indirect real economic effects, since the trade may involve extrinsic value).

Another possibility is the ad hoc formation of chat groups. In this case, the composition of the group is optimized based on the respective profile vectors of the members. In some cases, the ideal or optimum is minimum variance of the vectors, but in other cases optimality may require complementary components. Assuming multiple chat groups and multiple callers, there may be a market economy for matching a caller with a group. In such a scenario, a VCG type auction may be conducted, with the composition of each group allocated based on an optimization of bid values. An example of this is a sports chat line. A number of fans and sports celebrities contact a call center and are identified and a profile applied. Using market principles, the groups are formed to maximize the utility aggregate functions. Thus, a group of 'high rollers' may gain the benefit of a superstar, while neophytes may only communicate with a rookie, with the set of groups optimized to achieve maximum utility.

An automated chat system may also be used for dating services, adult theme entertainment, business services, consumer services, or the like. In these systems, the communications router typically taxes some of the economic surplus generated by the system, in a real economic form, while benefiting the various classes of user.

It is noted that the auction may involve transfer of real economic benefits, or a synthetic economy constructed within a closed system. For example, micropayment technologies may be employed to authorize and convey the value between entities, even through an open network, without having to trust all entities within the chain of custody.

The bidding may be a volitional real time event, allowing those involved to make decisions on the spot; but more typically, a bidder will define a personal value function, which is then used in an automated auction process. The bidder will therefore provide an indirect control over the bidding on his or her behalf, for example using feedback to tune the attributed value function to a desired value. In action types where broadcast of a true value is a dominant strategy, the function itself may be presented as a bid (assuming that the auctioneer has sufficient information to evaluate the function), otherwise, it may be evaluated under the circumstances and a normalized value transmitted. The auctioneer is, in this case, the communications arbitrator or switch. In a successive price auction, the value function itself is preserved, although the dropout pattern may be noted, allowing an estimation of the value function of competitors.

It should be clear that there are many possible scenarios which allow callers and/or potential recipients to compete for a connection, and therefore a large variety of auction types may be implemented accordingly.

The present system differs from a known telecommunications auction in that, for example, it is sensitive to user characteristics, and does not treat each communications line as a simple commodity.

Example 7

The system and method according to the present invention is not limited to voice communications, or even human-to-human communications. Rather, it permits a cost-benefit optimization in various communications environments where predetermined (i.e., before the communication is established) characteristics of a both a source and a destination make arbitrary targeting or association inefficient. The present invention therefore exploits this available information to optimize a cost-benefit or cost-effectiveness of the association, as compared to the cost-benefit or cost-effectiveness of competing allocations.

For example, a proxy server or load balancing server may seek to formulate communications based on a set of rules or correspondence between parameters. These communications can be human-to-human, human-to-machine, machine-to-human, machine-to-machine, or multiparty (e.g., >2 parties) communications. In one example, a "dating" or "contact" site is established which permits communications, which may remain anonymous, allowing an inferential targeting of a communication based on a "best fit", "optimal fit", "cost efficient", or other criteria. The communications may involve selection of a best target, best available target, best target with compensation for anticipated availability, optimal target, most cost effective target, or other criteria. On the other hand, where multiple communications are to be simultaneously considered, the desired result may not be the optimal target for each source, but rather the highest efficiency or cost-effectiveness on a community basis. Where more than two parties are included in a communication, a combinatorial optimization, such as a Vickrey-Clarke-Groves (VCG) optimization may take place, using automated approximations of value functions or permitting a "bidding" by each participant of either its price or payment, depending on whether it anticipates a gain or loss as a result of involvement. If only two parties are involved, a bidding may still occur, and thus a VCG auction may be implemented in all cases, even if the result is somewhat trivialized in certain cases. It is noted that, while an economic or cost optimization may be used as an underlying theory for linking communications, it is not necessary in all cases to employ currency, or an exchange of currency, as a basis for implementing the result. It is therefore understood that the present invention is not limited in the type of the valuation criteria, or indeed the nature of the characteristics to be evaluated. Rather, an aspect of this embodiment of the invention is that there is at least one non-economic parameter which must be normalized with other parameters which may require the same or different normalization (e.g., into a dimensionless or "economic" fungible quantity) in order to control the communications.

Preferably, this determination is performed as an integral function of the router, that is, the routing function is defined by the predetermined information available about the source and available targets, rather than by explicit addresses. While ultimately, the communication may be defined by explicit addresses or identifications, use of descriptive information or implicit targeting information earlier in the process permits more intelligent and flexible decisions, and thus allows the system to produce acceptable or more optimal results in a broader range of circumstances.

In determining the pairing (or in some cases, associating of larger groups), it is preferred that each communicating unit have a characteristic vector, providing sufficient information regarding the value, cost or price of the communication, and the benefit or requirements of the communication. Typically, the benefit or requirements will not be a single parameter, but rather will represent a multi-parametric matrix (i.e., vector). Even if the benefit or requirements is expressed in a single parameter, typically there will be a statistical error associated with that parameter itself, thus yielding a potentially complex analysis of seemingly simple data, such as a data set represented by a single descriptor. Expressed mathematically, the input vector A may be interpreted as the vector B for targeting $$A = \begin{Bmatrix} 0 & 0 & 0 \\ 0 & 1 & 0 \\ 0 & 0 & 0 \end{Bmatrix},$$

$$B = \begin{Bmatrix} \pm 0.10 & \pm 0.05 & \pm 0.10 \\ \pm 0.01 & 1.00 \pm 0.20 & \pm 0.05 \\ \pm 0.15 & \pm 0.20 & \pm 0.20 \end{Bmatrix};$$

The meaning of these vectors is that vector A is sparsely populated, with only $A_{2,2}$ having a non-zero value. On the other hand, in the vector B, each value is associated with its own probability distribution, and cannot necessarily be ignored. Indeed, in some cases, the value is non-parametric, and incapable of a null attribute.

In a cost-effectiveness optimization, the benefit or result must be expressed in dimensionless (cost) terms, using a net valuation function. Typically, the initial data will not be expressed as cost, and indeed may be subject to a dynamic translation or market exchange rate. When there are a plurality of attributes, each must be evaluated for its contribution to the cost function. The net value, under the conditions of evaluation, is then compared with other valuations, typically under those same conditions of evaluation, though in some cases, slightly different conditions may apply to each evaluation because of passage of time or other factors. The set of allocations which maximizes the net value to the community is the one which represents the cost-benefit optimum.

Thus, another aspect of the present invention provides comparison of vectors which change over time, and which are subject to different base times and/or different predicted change over time. The vectors are corrected by predicting a state at a relevant time, using at least one of a tendency of the vector to change, or a population statistic which predicts changes given an initial state, or a combination of both techniques. Likewise, there may be a blend between population basis and individual basis as information regarding the individual element which is described by the vector and information about the population accumulates. Note that, as information about the individual accumulates, its association with a subpopulation may increase or decrease, and thus the population basis need not be considered a static benchmark.

In another example, a system is provided which allocates limited resources, such as cache memory, persistent storage, logistical support, and bandwidth to a set of 'users'. Each respective resource has an associated cost, which may be static or dynamic in nature. In a particular circumstance encompassed by the present invention, the grouping of the resources is not independent, and thus the system cannot simply allocate each type of resource independently. Rather, the resources are allocated in blocks or units, each having a set of resources of the various types.

Likewise, each user has a set of requirements or characteristics of various types, and a cost, value or satisfaction function. For example, a given user requires various portions of the types of limited resources. Typically, the aggregate demand (at zero cost) for the resources will exceed the supply, thus making them 'limited'. In some cases, especially where resources have an incremental cost or utility, additional resources or types of blocks or units may be recruited or retired in dependence on the 'market' value.

The user may itself be an automated system, and indeed may also have resources allocated on a cost-efficient basis.

Returning now to a discussion of the targeting vector, this vector is defined in advance of the communication or portion of a sub-communication, and is therefore intended to be predictive of the cost and benefits of the resulting communication. Since this prediction may be inaccurate, or simple subject to probabilistic expression, in some cases the association of the source and destination will be dependent on not only the mean value of a characteristic, but also its probabilistic expression or distribution. Therefore, even in cases where the mean values permit an efficient match, the probability of an actual mismatch, and the associated costs if this were to occur, should also be considered, in formulating the optimum outcome. Expressed mathematically, let us assume that the outcome of a transaction is expressed as a binary satisfaction value.

If there is a 90% chance of satisfaction with cost 1, and a 10% chance of satisfaction with cost 20 with one possible pairing, the net cost is 2.9. If, in another possible pairing, there is a 95% chance of satisfaction with cost 2, and a 5% chance of satisfaction with cost 15, the net cost is 2.65. Thus, in this simple example, the later has the lower anticipated cost, even though in many cases, the actual cost of the first allocation will be lower. It is therefore useful to understand and correctly model these types of statistical processes, since they can affect outcome, and lead to paradoxical losses in efficiency.

When the satisfaction function and/or valuation function are continuous functions, the result is analogous, but the evaluation somewhat more complex. Likewise, the satisfaction functions may be interdependent and in the case of human users, typically subjective. However, to the extent it can be modeled, it is subject to a cost optimization.

It is generally a premise of this type of optimization that perfection or complete satisfaction is neither obtainable or even desired. Thus, this type of optimization generally provides little benefit where resources are essentially unlimited or independently allocated. Likewise, where all requests or targets are symmetric, or modeled as being so, gains will also be limited. The present invention therefore exploits information relating to the differences between association of partners or groups, in conjunction with evaluable cost-benefit functions, to generate an optimum allocation.

Example 8

The present invention may be used to target communications of various types, wherein the targeting information is inferential and context-dependent, and therefore the actual recipient of the communication may remain indeterminate until the time for resolution. Therefore, the targeting information need not be a correspondence of "skills" and "likely subject". Rather, the method would provide utility for resolving various ambiguities or indeterminateness.

One example is email, fax, instant messaging, or other correspondence to a generic address, which must then be handled by a selected person or agent. While availability of a target is generally an issue, in non-interactive voice communications, real time availability need not be a critical concern.

One characteristic of the invention is that an optimization, often of an NP-complete type, is required to determine the best allocation with respect to a "cost function", and the optimum condition cannot reasonably be determined by a single mathematical function involving the input data.

In many communications environments, including voice, email, instant messaging, fax, etc., a particular problem involves unsolicited communications, which may be simply time consuming (e.g., "spam"), or possibly malicious (e.g., "virus", "phishing", etc.). Various methods are available to score communications for their likely characteristics. However, such undesired communications are variant, and tend to evolve, and may be quite similar to desirable communications. For even a single recipient, a set of roles or contexts may be defined. If incoming communications are classified according to a correspondence to these roles or contexts, possibly with an adaptive bias. Instead of simply scoring the communication to make a binary "undesired"/"desired" decision, the classifier seeks a best fit, in a competitive environment. A number of different biases may be applied. For example, a predetermined proportion, number or limit of distribution may be estimated in advance. In most cases, a classification is exclusive, though communications may also be multiply classified. In general, classifications are made statistically or probabilistically.

For example, 100 email communications may be received by a single email account for processing. A set of rules may permit definitive processing of, e.g., 50% of the communications, such as white lists, black lists, banned words/phrases, spam signatures, authentication technologies, etc. On the other hand, the remaining 50% of the communications require an "intelligent" classification. For example, while most people consider emails that include the words "mortgage", "cialis" or "teens" to be spam, there are persons, roles or contexts in which such words are not definitive clues as to appropriateness. Therefore, simply banning these words may lead to errors; likewise, relying on the presence of these words to effectively filter will also lead to errors, since typographic illusions are often used to convey the meaning without using the literal string as a cue. An internist may indeed receive a number of desired communications which discuss drugs. A home buyer may need a mortgage, or have solicited communications from a mortgage broker. A high school student may regularly have communications which include the word "teens". Therefore, the role and/or context of the user is a relevant factor.

The classifications themselves may be predetermined or variant or adaptive in class definition and number. After classification, these may be aggregated, or remain separate.

Instead of requiring a resolution of the targeting/classification problem for each email, instead, an algorithm may be provided to operate on a group of communications, with the result being a best classification as a competitive process between the communications and the targets. That is, the typical problem with spam is not that a communication itself is malicious (though this is also a potential problem), but rather that the numerosity of the communications is overwhelming. Therefore, the process proposed by the present invention permits limited leakage of communications, at a manageable number. The steps taken by the user after receipt of the communications may also be used to provide feedback to the classifier, and therefore such feedback typically requires acquisition of data relating to marginal objects. For example, if a user processes are part of a normal workflow all of the objects passed, this leads to an inferred relaxation of a restriction, since no object which is treated as irrelevant has passed; if there is a strong correlation, e.g., $r>0.95$ between the treatment of an object by the user and the treatment predicted based on the analyzed characteristics of the object, then the restrictions can be tightened in accordance with the analyzed characteristics.

In other cases, the purpose of the system is not to implement an exclusionary filter, but rather to triage the objects according to a predicted classification. Each classification may be assigned a separate queue, which in a large organization may each be managed and handled by separate agents. Thus, a "content vector" describing the object, and a "skill vector" describing the available targets, may be employed, optionally along with an "availability vector" relating, for example, to queue length and a "cost vector" relating to comparative costs and/or benefits. The various vectors are used in a multifactorial optimization, which in the case of queued objects, may reallocate objects previously queued to a "better" position. While the optimization may be performed incrementally for each object, in fact a batch implementation may be useful where response times are slow. For example, if the normal latency for dealing with an object is 1 hour, optimizations every 15-30 minutes would be reasonable.

Where a plurality of vectors relating to different and "orthogonal" attributes are employed, it is quite useful to perform a cost optimization, wherein the optimization outcome is based on a normalized metric, such as currency. As is known, a cost function need not be normalized in a financial sense, but the various alternates should all be comparable.

In some instances, the actual cost may be compared with a predicted cost, and the difference (error) used to tune the cost prediction algorithm for improved future performance. In other cases, the ultimate cost may have little to do with the prediction or the information available at the time of prediction, and therefore this tuning process may be inefficient or counterproductive.

Likewise, the actual processing of the objects may be used to provide data for the future allocation of resources; that is, if the available resources lead to a predicted higher overall cost than an alternate resource allocation, steps can be taken to change the allocation in the future. Preferably, the cost function is audited, and long-term performance monitored to ensure that the system does not oscillate or exhibit highly chaotic behavior independent of the objects received, and is stable. Likewise, in some cases, it is also important to analyze the characteristics of objects over time to ensure that the system itself does not cause undesired changes in the objects. For example, if objects having certain characteristics are treated more favorably than others, the objects themselves may evolve to display those more-favorably treated characteristics, without actually changing the underlying nature of the process actually required to deal with the object. This may lead to unfair discrimination, increasing costs, and system instability.

It is therefore seen that the present invention provides a system and method for optimally targeting or matching a set of communications in a system. This system and method is not limited to voice and email communications, and may encompass a broad range of elements to be matched.

The present invention is useful for routing of communications in general, and for optimizing call centers as a particular example of this process. The invention may also be used to optimize handling of Internet communications within an infrastructure where communications may be handled by a plurality of servers, some having different characteristics from other.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A system for assigning communications, comprising a processor and a memory, configured to associate respective communications with respective resources, wherein the memory has stored therein instructions that, when executed by the processor, cause the processor to:
   receive a plurality of respective communications;
   identify a plurality of resources available for association with a respective communication and capable of handling the respective communication, each available resource having a limited quantitative capacity for association with multiple communications, and an availability state;
   calculate a respective score associated with each available resource dependent on the availability state of a respective available resource;
   estimate an expected economic value to be obtained by associating each respective communication with each respective available resource, dependent on at least the score and a respective communication-content dependent value function of an outcome of a respective communication associated with a respective available resource; and
   assign each of the plurality of respective communications to one of the plurality of resources based on at least the estimated expected economic value to be obtained by associating each respective communication with each respective resource.

2. The system according to claim 1, wherein the expected economic value comprises an expected revenue resulting from assigning each respective communication with each respective available resource.

3. The system according to claim 1, wherein the expected economic value comprises an expected profit from assigning each respective communication with each respective available resource.

4. The system according to claim 1, wherein the expected economic value comprises at least one of a cost-benefit and a cost-effectiveness of an association of a respective communication.

5. The system according to claim 1, wherein the availability state is selectively dependent on an estimated wait time before a respective communication is associated with a respective available resource.

6. The system according to claim 1, wherein the plurality of communications each comprise a bidirectional telephone communication.

7. The system according to claim 1, wherein the plurality of resources each comprise a respective call center agent.

8. The system according to claim 1, wherein the estimated economic value to be obtained by associating each respective communication with each respective available resource is determined based on a testing of each possible set of concurrent association of respective communications with respective available resources, consistent with the limited capacity for association with communications of each respective available resource.

9. The system according to claim 1, wherein the association of respective communications to respective available resources results in a persistent change in the expected economic value of a future association of the respective communications to the respective available resources.

10. The system according to claim 9, wherein the assignment of each of the plurality of respective communications to one of the plurality of resources is further based on at least one of a predicted oscillation and a predicted chaotic behavior of the expected economic value of a future association of the respective communications with a respective available resources.

11. A method for assigning communications, comprising:
    receiving a plurality of respective communications for association with a respective resource selected from a plurality of resources;
    identifying a plurality of resources available for association with a respective communication and capable of handling the respective communication, each available resource having a limited quantitative capacity for association with multiple communications and an availability state;
    calculating a respective score associated with each available resource dependent on the availability state of a respective available resource;

estimating an expected economic value to be obtained by associating each respective communication with each respective available resource, dependent on at least the score and a respective communication-content dependent value function of an outcome of a respective communication associated with a respective available resource; and assigning each of the plurality of respective communications to one of the plurality of resources based on at least the estimated expected economic value to be obtained by associating each respective communication with each respective resource.

12. The method according to claim 11, wherein the expected economic value comprises at least one of an expected revenue resulting from association of the respective communication, an expected profit resulting from association of the respective communication, an expected cost-benefit resulting from association of the respective communication, and an expected cost-effectiveness resulting from association of the respective communication.

13. The method according to claim 11, wherein the availability state score is selectively dependent on an estimated wait time before a respective communication is associated with a respective available resource.

14. The method according to claim 11, wherein the plurality of communications each comprise a bidirectional telephone communication.

15. The method according to claim 11, wherein the plurality of resources each comprise a respective call center agent.

16. The method according to claim 11, wherein the estimated economic value to be obtained by associating each respective communication with each respective available resource is determined based on a testing of each possible set of concurrent associations of respective communications with respective available resources, consistent with the limited capacity for association with communications of each respective available resource.

17. The method according to claim 11, wherein associating of respective communications to respective available resources results in a persistent change in the expected economic value of a future association of the respective communications to respective available resource.

18. The method according to claim 17, wherein the assigning of each of the plurality of respective communications to one of the plurality of resources is further based on at least one of a predicted oscillation and a predicted chaotic behavior of the expected economic value of a future association of the respective communications with a respective available resource.

19. A method for controlling communications routing, comprising:

receiving information a representing a plurality of communications, a plurality of the communications being concurrently queued for routing, each respective communication involving a respective task dependent on the communication;

identifying a plurality of communication targets available or imminently available for handling a respective communication of the plurality of communications and capable of performing the respective task dependent on the communication, the respective communication targets having a limited quantitative capacity for handling multiple respective tasks;

determining a latency for each of the plurality of communication targets with respect to a respective task to be handled;

estimating an economic value for routing each respective communication to a respective one of a plurality of alternate communication targets, dependent on at least the latency, a consumption of the limited capacity for handling respective tasks, and a communication-content dependent benefit expected to result as an outcome from handling the respective task;

selecting an optimal routing of each of the plurality of communications to a respective alternate communication target dependent on at least a comparison of the estimated economic value for each possible routing of each respective communication to the plurality of alternate communication targets; and communicating the optimal routing to a communication routing device.

20. The method according to claim 19, wherein the estimated economic value is determined based on a combinatorial analysis, and is adaptive with respect to a predicted persistent change in the expected economic value of a future routing of at least one respective communication to a respective alternate communication target.

* * * * *